United States Patent
Akutsu et al.

(10) Patent No.: US 9,726,890 B2
(45) Date of Patent: Aug. 8, 2017

(54) LIGHT BEAM EXPANDING DEVICE, IMAGE DISPLAY DEVICE, AND OPTICAL DEVICE

(71) Applicant: Sony Corporation, Tokyo (JP)

(72) Inventors: Katsuyuki Akutsu, Kanagawa (JP); Nobuaki Kuribara, Saitama (JP); Teppei Imamura, Tokyo (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 14/797,663

(22) Filed: Jul. 13, 2015

(65) Prior Publication Data

US 2015/0362735 A1 Dec. 17, 2015

Related U.S. Application Data

(63) Continuation of application No. 13/677,410, filed on Nov. 15, 2012, now Pat. No. 9,164,221.

(30) Foreign Application Priority Data

Nov. 22, 2011 (JP) .................................. 2011-254853

(51) Int. Cl.
*G02F 1/03* (2006.01)
*G02F 1/07* (2006.01)
(Continued)

(52) U.S. Cl.
CPC .......... *G02B 27/0172* (2013.01); *G02B 5/09* (2013.01); *G02B 5/1842* (2013.01); *G02B 6/0031* (2013.01); *G02B 6/0055* (2013.01); *G02B 27/1086* (2013.01); *G02B 27/14* (2013.01); *G02B 27/4216* (2013.01);
(Continued)

(58) Field of Classification Search
USPC ....... 359/237, 242, 265, 267, 290, 291, 292, 359/295, 298
See application file for complete search history.

(56) References Cited

U.S. PATENT DOCUMENTS 8,411,134 B2 4/2013 Tomita
8,797,433 B2 8/2014 Kaizu et al.
(Continued)

FOREIGN PATENT DOCUMENTS

CN 1523430 A 8/2004
CN 101276062 A 10/2008
(Continued)

*Primary Examiner* — Brandi Thomas
(74) *Attorney, Agent, or Firm* — Wolf, Greenfield & Sacks, P.C.

(57) ABSTRACT

An image display device includes an image generating device, a light guide unit, and a light beam expanding device. The light guide unit includes a light guide plate, a first deflector, and a second deflector. The light beam expanding device expands a light beam incident from the image generating device along the Z direction and outputs the light beam to the light guide unit when the incident direction of light incident on the light guide plate is defined as the X direction and the propagation direction of light in the light guide plate is defined as the Y direction. The light beam expanding device is composed of a first reflective mirror on which light from the image generating device is incident and a second reflective mirror on which light from the first reflective mirror is incident and that outputs light to the light guide unit.

15 Claims, 39 Drawing Sheets

(51) Int. Cl.

| | | |
|---|---|---|
| *G02B 26/00* | (2006.01) | |
| *G02B 27/01* | (2006.01) | |
| *F21V 8/00* | (2006.01) | |
| *G02B 27/14* | (2006.01) | |
| *G02B 5/09* | (2006.01) | |
| *G02B 5/18* | (2006.01) | |
| *G02B 27/10* | (2006.01) | |
| *G02B 27/42* | (2006.01) | |
| *G03H 1/02* | (2006.01) | |

(52) U.S. Cl.
CPC ......... *G03H 1/0248* (2013.01); *G02B 6/0015* (2013.01); *G02B 6/0035* (2013.01); *G02B 2027/011* (2013.01); *G02B 2027/0174* (2013.01)

(56) References Cited

U.S. PATENT DOCUMENTS

| | | | |
|---|---|---|---|
| 8,861,090 B2 | 10/2014 | Mukawa | |
| 8,907,865 B2 | 12/2014 | Miyawaki et al. | |
| 8,976,453 B2 | 3/2015 | Akutsu et al. | |
| 8,998,315 B2 | 3/2015 | Mukawa et al. | |
| 9,164,221 B2 | 10/2015 | Akutsu et al. | |
| 9,201,242 B2 | 12/2015 | Miyawaki et al. | |
| 2010/0027289 A1* | 2/2010 | Aiki | G02B 6/0011 362/558 |
| 2010/0128107 A1 | 5/2010 | Tomita | |
| 2011/0019250 A1* | 1/2011 | Aiki | G02B 5/32 359/15 |
| 2011/0241975 A1 | 10/2011 | Mukawa et al. | |
| 2011/0248904 A1 | 10/2011 | Miyawaki et al. | |
| 2012/0044571 A1 | 2/2012 | Mukawa | |
| 2012/0218426 A1 | 8/2012 | Kaizu et al. | |
| 2013/0128611 A1 | 5/2013 | Akutsu et al. | |
| 2013/0135749 A1 | 5/2013 | Akutsu et al. | |
| 2013/0242555 A1 | 9/2013 | Mukawa | |
| 2013/0300766 A1 | 11/2013 | Mukawa | |
| 2014/0334010 A1 | 11/2014 | Mukawa | |
| 2014/0340286 A1 | 11/2014 | Machida et al. | |
| 2014/0340550 A1 | 11/2014 | Kaizu et al. | |
| 2014/0347252 A1 | 11/2014 | Miyawaki et al. | |
| 2015/0109679 A1 | 4/2015 | Mukawa et al. | |
| 2015/0138647 A1 | 5/2015 | Akutsu et al. | |
| 2015/0226970 A1 | 8/2015 | Mukawa | |
| 2015/0229897 A1 | 8/2015 | Mukawa | |
| 2015/0235620 A1 | 8/2015 | Takahota et al. | |
| 2015/0260995 A1 | 9/2015 | Mukawa | |
| 2015/0269784 A1 | 9/2015 | Miyawaki et al. | |
| 2015/0277125 A1 | 10/2015 | Hirano et al. | |
| 2015/0277126 A1 | 10/2015 | Hirano et al. | |
| 2015/0338660 A1 | 11/2015 | Mukawa | |
| 2015/0346494 A1 | 12/2015 | Tanaka et al. | |
| 2015/0370075 A1 | 12/2015 | Ato et al. | |
| 2016/0041394 A1 | 2/2016 | Tanaka et al. | |
| 2016/0062123 A1 | 3/2016 | Tanaka et al. | |
| 2016/0097931 A1 | 4/2016 | Takahota et al. | |
| 2016/0147069 A1 | 5/2016 | Tanaka et al. | |

FOREIGN PATENT DOCUMENTS

| | | |
|---|---|---|
| CN | 101963703 A | 2/2011 |
| JP | 2001-311906 A | 11/2001 |
| JP | 2003-302597 A | 10/2003 |
| JP | 2005-521099 A | 7/2005 |
| JP | 2006-162767 A | 6/2006 |
| JP | 2007-12530 A | 1/2007 |
| JP | 2007-94175 A | 4/2007 |

\* cited by examiner

LIGHT BEAM EXPANDING DEVICE, IMAGE DISPLAY DEVICE, AND OPTICAL DEVICE

CROSS REFERENCE TO RELATED APPLICATIONS

This is a continuation of U.S. application Ser. No. 13/677,410, filed Nov. 15, 2012, and now pending, which claims the priority benefit of Japanese Patent Application No. JP 2011-254853 filed in the Japanese Patent Office on Nov. 22, 2011, the entire content of which are hereby incorporated by reference.

BACKGROUND

The present disclosure relates to a light beam expanding device, an optical device in which the light beam expanding device is incorporated, and an image display device in which the optical device is incorporated.

A virtual image display device (image display device) for causing a viewer to view a two-dimensional image formed by an image forming device as a magnified virtual image by a virtual image optical system is well known from e.g. JP-T-2005-521099 and Japanese Patent Laid-open No. 2006-162767.

As shown in a conceptual diagram of FIG. 37, this image display device 1000 includes an image forming device 1011 having plural pixels arranged in a two-dimensional matrix manner, a collimating optical system 1012 that turns light output from the pixels of the image forming device 1011 to collimated light, and a light guide unit 1030 on which the light turned to the collimated light by the collimating optical system 1012 is incident. The incident light is guided and output by the light guide unit 1030. The light guide unit 1030 includes a light guide plate 1031. The incident light is propagated inside the light guide plate 1031 by total reflection and then output therefrom. The light guide unit 1030 also includes a first deflector 1040 (for example, formed of one layer of a light reflective film) that reflects the light incident on the light guide plate 1031 in such a manner that the light incident on the light guide plate 1031 may be totally reflected inside the light guide plate 1031. The light guide unit 1030 further includes a second deflector 1050 (for example, formed of a light reflective multilayer film having a multilayer-stacked structure) that outputs the light propagated inside the light guide plate 1031 by total reflection from the light guide plate 1031. If e.g. a head mounted display (HMD) is configured by such an image display device 1000, reduction in the weight and size of the device can be achieved.

Besides, a virtual image display device (image display device) using a hologram diffraction grating for causing a viewer to view a two-dimensional image formed by an image forming device as a magnified virtual image by a virtual image optical system is well known from e.g. Japanese Patent Laid-open No. 2007-094175 and Japanese Patent Laid-open No. 2007-012530.

As shown in conceptual diagrams of FIG. 38 and FIG. 39, this image display device 1100 basically includes an image forming device 1111 that displays an image, a collimating optical system 1112, and a virtual image optical system (light guide unit 1130) on which light displayed on the image forming device 1111 is incident. The light guide unit 1130 guides the incident light to a pupil 41 of the viewer. The light guide unit 1130 includes a light guide plate 1131 and a first diffraction grating member 1140 and a second diffraction grating member 1150 that are formed of reflective volume hologram diffraction gratings provided on the light guide plate 1131. Light output from the respective pixels of the image forming device 1111 is incident on the collimating optical system 1112 and collimated light is generated by the collimating optical system 1112 to be incident on the light guide plate 1131. The collimated light is incident on a first surface 1132 of the light guide plate 1131 and output therefrom. The first diffraction grating member 1140 and the second diffraction grating member 1150 are attached to a second surface 1133 of the light guide plate 1131 which is in parallel to the first surface 1132 of the light guide plate 1131.

SUMMARY

The image display light output from the image forming device 1111 is turned to a collimated light flux group in which the angles of view (i.e. exit angles of light output from the respective pixels of the image forming device 1111) are different from each other by the collimating optical system 1112 in the XY plane shown in FIG. 38. This collimated light flux group is turned to a light flux group in which the angles of view are different from each other in the XZ plane perpendicular to the XY plane and is incident on the light guide plate 1131. In FIG. 38, representative collimated light flux in the XY plane is shown by collimated light flux $r_1$ (represented by the solid line), $r_2$ (represented by the one-dot chain line), and $r_3$ (represented by the dotted line). In FIG. 39, representative collimated light flux in the XZ plane is shown by collimated light flux $R_1$ (represented by the solid line), $R_2$ (represented by the one-dot chain line), and $R_3$ (represented by the dotted line).

In the image display device 1100 shown in the diagram, the left-right (horizontal) direction is defined as the Y direction and the upper-lower (vertical) direction is defined as the Z direction. That is, image display light to display video, various kinds of information, etc. is guided toward the pupil 41 of the viewer from the lateral side to be incident on the pupil 41. In the case of applying the image display device 1100 to a head mounted display (HMD), favorable viewing of the external world is enabled by disposing the image forming device and so forth not above the pupil 41 but on the lateral side thereof in this manner.

Meanwhile, in such a configuration, the propagation distance of the light guided inside the light guide plate 1131 is comparatively long and therefore the following problems arise.

In the above-described configuration, the image display light incident from the first surface 1132 of the light guide plate 1131 is incident on the first diffraction grating member 1140 formed of a reflective volume hologram diffraction grating disposed on the second surface 1133 at a position opposed to the first surface 1132. Suppose that this reflective volume hologram diffraction grating has an even interference pattern pitch on the hologram surface irrespective of the position.

In the light subjected to diffraction reflection by the first diffraction grating member 1140, the light fluxes $r_1$, $r_2$, and $r_3$ are guided inside the light guide plate 1131 as collimated light flux with repetition of total reflection between the first surface 1132 and the second surface 1133 regarding the X direction component of the XY plane, and travel in the Y direction toward the second diffraction grating member 1150 formed of the reflective volume hologram diffraction grating provided at the other end of the light guide plate 1131. The light guide plate 1131 is thin and the optical path along which the light travels in the light guide plate 1131 is comparatively long as described above. Therefore, as shown in FIG. 38, the number of times of total reflection until the light reaches the second diffraction grating member 1150 differs depending on the horizontal angle of view. Accordingly, among the collimated light $r_1$, $r_2$, and $r_3$ incident on the light guide plate 1131, the collimated light $r_3$ incident with an inclination toward the second diffraction grating member 1150 (i.e. the horizontal angle of view is positive) has a smaller number of times of reflection than the collimated light $r_1$ incident on the light guide plate 1131 with an angle in the direction opposite to that of the collimated light $r_3$ (i.e. the horizontal angle of view is negative). That is, because the interference pattern pitch of the hologram surface of the first diffraction grating member 1140 is an equal interval, the exit angle of the diffraction reflection by the first diffraction grating member 1140 is larger in the collimated light $r_3$, whose horizontal angle of view is positive, than in the collimated light $r_1$, whose horizontal angle of view is negative. Then, the collimated light that has the respective angles of view and is incident on the second diffraction grating member 1150 deviates from the total reflection condition due to diffraction reflection to be output from the light guide plate 1131 and be incident on the pupil 41 of the viewer.

As just described, in the traveling direction of the collimated light flux, the number of times of reflection in the light guide plate 1131 differs depending on the horizontal angle of view. That is, the optical path length differs. However, because all of the propagating light flux is collimated light flux, the light flux group travels in such a manner as to be, so to speak, folded. In this light flux group, light flux that is so reflected as to be folded back at the position straddling the edge part of the first diffraction grating member 1140 and the second surface 1133 exists as is apparent when reverse ray tracing is performed in the configuration shown in FIG. 14 of Japanese Patent Laid-open No. 2007-012530. If reverse ray tracing is performed, part of this light flux (i.e. part reflected by the second surface 1133) repeats reflection to be diffracted at a different position on the first diffraction grating member 1140 and reach the collimating optical system 1112. On the other hand, the remaining light flux is diffracted at the end part of the first diffraction grating member 1140 to directly reach the collimating optical system 1112. That is, although this light flux is collimated light flux that is output from the same pixel and has the same angle of view, light flux that is subjected to diffraction reflection at a different part of the first diffraction grating member 1140 and propagates after being combined in the light guide plate 1131 exists.

From the above, the width of the necessary light flux in the Y direction in such an optical system, i.e. the aperture stop width in the Y direction, is determined by the end point at which the light flux is folded. In the light guide plate 1131, the position of the first diffraction grating member 1140, which makes diffraction reflection of the collimated light flux group that is output from the collimating optical system 1112 and is incident on the light guide plate 1131, is the aperture stop position in the Y direction.

The incident light $R_1$, $R_2$, and $R_3$ having different angles of view in the XZ plane reach the exit part in such a manner that the X direction component repeats reflection in the light guide plate 1131 but the Z direction component is not reflected. That is, the light output from the collimating optical system 1112 is incident from the first surface 1132 after being converged in the XZ plane and travels in the Y direction in the light guide plate 1131. The light flux travels with reflection between the first surface 1132 and the second surface 1133 of the light guide plate 1131 in such a manner as to be narrowed in the Z direction. Then, the light flux reaches the second diffraction grating member 1150 and is subjected to diffraction reflection by the second diffraction grating member 1150 to be output and be incident on the pupil 41 of the viewer. As just described, in this image display device 1100, the width of the necessary light flux in the Z direction, i.e. the aperture stop width in the Z direction, is determined by the position of the viewer pupil 41.

The aperture stop position in the Z direction is the position of the viewer pupil 41. Therefore, the distance from the collimating optical system 1112 to the aperture stop position in the Z direction is the sum of the distance of the propagation with repetition of internal total reflection in the light guide plate 1131 and the distance from the light guide plate 1131 to the pupil 41 of the viewer. Thus, this distance is comparatively long. On the other hand, the aperture stop position in the Y direction is the position of the first diffraction grating member 1140 disposed on the light guide plate 1131 and therefore the aperture stop width in the Y direction can be set smaller than the aperture stop width in the Z direction. Because the aperture stop width is large in the Z direction as above, the diameter of the collimating optical system 1112 in the Z direction needs to be set larger than that in the Y direction.

If the diameter of the aperture stop in the Z direction is set large in the image forming devices 1011 and 1111, the light ray angle of the peripheral angle of view becomes large in the image output from the image forming devices 1011 and 1111. As a result, the display contrast in a liquid crystal display device or the like used in the image forming devices 1011 and 1111 is lowered, which causes the deterioration of the image quality.

The above-described problems similarly arise also in the image display device 1000 shown in FIG. 37.

There is a need for the present disclosure to provide an image display device that is for causing a viewer to view a two-dimensional image formed by an image forming device as a magnified virtual image by a virtual image optical system and is free from the need to increase the diameter of the lens included in the image forming device, an optical device suitable to be incorporated in this image display device, and a light beam expanding device suitable to be incorporated in e.g. this optical device.

According to an embodiment of the present disclosure, there is provided an image display device including (A) an image generating device, (B) a light guide unit on which light from the image generating device is incident, the light guide unit guiding light and outputting light toward a pupil of a viewer, the light guide unit including (B-1) a light guide plate from which incident light is output after being propagated inside by total reflection, (B-2) a first deflector that is disposed in or on the light guide plate and deflects light incident on the light guide plate in such a manner that the light incident on the light guide plate is totally reflected inside the light guide plate, and (B-3) a second deflector that is disposed in or on the light guide plate and deflects light propagated inside the light guide plate by total reflection a plurality of times in order to output the light propagated inside the light guide plate by total reflection from the light guide plate, and (C) a light beam expanding device configured to expand a light beam incident from the image generating device along the Z direction and output the light beam to the light guide unit when the incident direction of light incident on the light guide plate is defined as the X direction and the propagation direction of light in the light guide plate is defined as the Y direction, wherein the light beam expanding device is composed of a first reflective mirror on which light from the image generating device is incident and a second reflective mirror on which light from the first reflective mirror is incident and that outputs light to the light guide unit. The term "total reflection" means internal total reflection or total reflection inside the light guide plate. This is the same also in the following.

According to another embodiment of the present disclosure, there is provided an optical device including a light guide unit configured to include
a light guide plate from which light incident from a light source is output after being propagated inside by total reflection,
a first deflector that is disposed in or on the light guide plate and deflects light incident on the light guide plate in such a manner that the light incident on the light guide plate is totally reflected inside the light guide plate, and
a second deflector that is disposed in or on the light guide plate and deflects light propagated inside the light guide plate by total reflection a plurality of times in order to output the light propagated inside the light guide plate by total reflection from the light guide plate, and
a light beam expanding device configured to expand a light beam incident from the light source along the Z direction and output the light beam to the light guide unit when the incident direction of light incident on the light guide plate is defined as the X direction and the propagation direction of light in the light guide plate is defined as the Y direction,
wherein, the light beam expanding device is composed of a first reflective mirror on which light from the light source is incident and a second reflective mirror on which light from the first reflective mirror is incident and that outputs light to the light guide unit.

According to further another embodiment of the present disclosure, there is provided a light beam expanding device including a first reflective mirror configured to be disposed between a light source and an irradiated surface. Light from the light source is incident on the first reflective mirror. The light beam expanding device further includes a second reflective mirror on which light from the first reflective mirror is incident. The second reflective mirror outputs light to the irradiated surface.

Furthermore, in the image display device, the optical device, and the light beam expanding device according to the embodiments of the present disclosure, a light reflective surface of the first reflective mirror is composed of 1A-th inclined surfaces and 1B-th inclined surfaces that are juxtaposed alternately and continuously and has a saw-tooth shape as a sectional shape, a light reflective surface of the second reflective mirror is composed of 2A-th inclined surfaces and 2B-th inclined surfaces that are juxtaposed alternately and continuously and has a saw-tooth shape as a sectional shape, a top side and a bottom side of the 1A-th inclined surface are parallel to each other and extend along the Z direction, an angle ($\theta_1$) formed by a bottom part of the 1A-th inclined surface and a bottom part of the 1B-th inclined surface is 90 degrees, a top side and a bottom side of the 2A-th inclined surface are parallel to each other and extend along the Y direction, and an angle ($\theta_2$) formed by a bottom part of the 2A-th inclined surface and a bottom part of the 2B-th inclined surface is 90 degrees.

In the image display device, the optical device, and the light beam expanding device according to the embodiments of the present disclosure, the light beam expanding device that makes a light beam (light flux) be incident on the light guide unit in the state in which the light beam is expanded along the Z direction whereas it is not expanded along the Y direction is provided. Therefore, the need to set a large diameter as the diameter of the aperture stop in the Z direction in the image generating device is eliminated and the diameter of the lens that should be included in the image generating device does not need to be set large. Thus, reduction in the size and weight of the image display device can be achieved. In addition, the lowering of the display contrast and the deterioration of the image quality are also absent.

DETAILED DESCRIPTION OF THE PREFERRED EMBODIMENTS

Figure 1A:
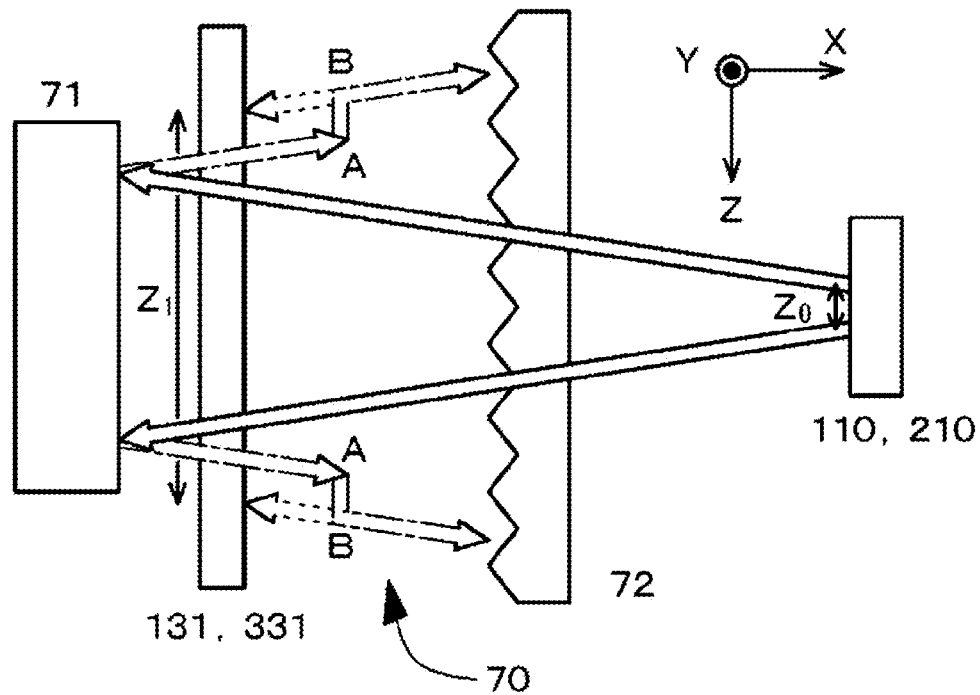
FIGS. 1A and 1B are a conceptual diagram when a light beam expanding device of embodiment example 1 is viewed from the Y direction and a conceptual diagram when it is viewed from the Z direction, respectively.

The present disclosure will be described below based on embodiment examples with reference to the drawings. However, the present disclosure is not limited to the embodiment examples and various numeric values and materials in the embodiment examples are examples. The description will be made in the following order.

1. Overall Description of Light Beam Expanding Device, Optical Device, and Image Display Device of Embodiments of Present Disclosure
2. Embodiment Example 1 (light beam expanding device, image display device, and optical device)
3. Embodiment Example 2 (modification of image display device of embodiment example 1)
4. Embodiment Example 3 (another modification of image display device of embodiment example 1)
5. Embodiment Example 4 (further another modification of image display device of embodiment example 1)
6. Embodiment Example 5 (head mounted display)
7. Embodiment Example 6 (modification of head mounted display) and Others

[Overall Description of Light Beam Expanding Device, Optical Device, and Image Display Device of Embodiments of Present Disclosure]

A light beam expanding device, an optical device, and an image display device of embodiments of the present disclosure can have a form in which at least one planar reflective member is provided between an image generating device and a first reflective mirror or between a light source and the first reflective mirror, at least one planar reflective member is provided between the first reflective mirror and a second reflective mirror, and one planar reflective member provided between the image generating device and the first reflective mirror or between the light source and the first reflective mirror serves also as one planar reflective member provided between the first reflective mirror and the second reflective mirror. By employing such a form, the optical path is set to a kind of folded state and compactification of the light beam expanding device, the optical device, and the image display device of the embodiments of the present disclosure can be achieved. A form in which one planar reflective member provided between the image generating device and the first reflective mirror or between the light source and the first reflective mirror and one planar reflective member provided between the first reflective mirror and the second reflective mirror are located in the same plane is also encompassed in the form in which one planar reflective member provided between the image generating device and the first reflective mirror or between the light source and the first reflective mirror serves also as one planar reflective member provided between the first reflective mirror and the second reflective mirror.

The light beam expanding device, the optical device, and the image display device of the embodiments of the present disclosure including the above-described preferred form can have a configuration in which the trajectory of light incident on the first reflective mirror from the image generating device (or light source) and the trajectory of light output from the first reflective mirror are parallel to each other when being projected onto a 1A-th virtual plane that is a virtual plane perpendicular to the Z direction, the trajectory of the light incident on the first reflective mirror from the image generating device (or light source) and the trajectory of the light output from the first reflective mirror are symmetric with each other about the 1A-th virtual plane when being projected onto a 1B-th virtual plane that is a virtual plane perpendicular to the normal to the first reflective mirror, the trajectory of light incident on the second reflective mirror from the first reflective mirror and the trajectory of light output from the second reflective mirror are parallel to each other when being projected onto a 2A-th virtual plane that is a virtual plane perpendicular to the Y direction, and the trajectory of the light incident on the second reflective mirror from the first reflective mirror and the trajectory of the light output from the second reflective mirror are symmetric with each other about the 2A-th virtual plane when being projected onto a 2B-th virtual plane that is a virtual plane perpendicular to the normal to the second reflective mirror. In this case, it is preferable to employ a configuration in which the optical path length of light that is output from the center of the image generating device (or light source) and is incident on the first reflective mirror is equal to the optical path length of light that is light originally output from the center of the image generating device (or light source) and is output from the first reflective mirror and is incident on the second reflective mirror to be output from the second reflective mirror and be incident on a light guide unit (or irradiated surface). Furthermore, it is preferable to employ a configuration in which the size, along the Y direction, of a light beam output from the image generating device (or light source) is equal to the size, along the Y direction, of a light beam incident on the light guide unit (or irradiated surface). Moreover, in the above-described preferred configuration, it is possible to employ a configuration in which the size, along the Z direction, of a light beam incident on the light guide unit (or irradiated surface) is larger than the size, along the Z direction, of a light beam output from the image generating device (or light source). Moreover, it is possible to employ a configuration in which the size, along the Z direction, of a light beam output from the light guide unit is equal to the size, along the Z direction, of the light beam output from the image generating device (or light source).

The image display device of the embodiment of the present disclosure including the above-described preferred form and configuration can have a configuration in which the image generating device includes (A-1) an image forming device having a plurality of pixels arranged in a two-dimensional matrix manner, and (A-2) a collimating optical system that turns light output from the pixels of the image forming device to collimated light, and light from the collimating optical system is incident on the first reflective mirror. Such an image generating device will be referred to as the "image generating device of the first form" for convenience.

Alternatively, the image display device of the embodiment of the present disclosure including the above-described preferred form and configuration can have a configuration in which the image generating device includes (A-1) a light source, (A-2) a collimating optical system that turns light output from the light source to collimated light, (A-3) a scanning unit that scans collimated light output from the collimating optical system, and (A-4) a relay optical system that relays collimated light scanned by the scanning unit, and light from the relay optical system is incident on the first reflective mirror. Such an image generating device will be referred to as the "image generating device of the second form" for convenience.

Furthermore, the image display device and the optical device of the embodiments of the present disclosure including the above-described preferred form and configuration can have a configuration in which a first deflector and a second deflector are formed of diffraction grating elements. Moreover, it is possible to employ a configuration in which the diffraction grating elements are formed of reflective diffraction grating elements and furthermore employ a configuration in which they are formed of reflective volume hologram diffraction gratings. Alternatively, it is possible to employ a configuration in which they are formed of transmissive diffraction grating elements or a configuration in which one of the diffraction grating elements is formed of a reflective diffraction grating element and the other of the diffraction grating elements is formed of a transmissive diffraction grating element. The direction along which the interference pattern is arranged in the diffraction grating, i.e. the diffraction direction, is the Y direction and the interference pattern extends along the Z direction.

Furthermore, the image display device and the optical device of the embodiments of the present disclosure including the above-described preferred form and configuration can have a configuration in which the first deflector reflects light incident on the light guide plate and the second deflector transmits and reflects light propagated inside the light guide plate by total reflection a plurality of times. Moreover, in this case, it is possible to employ a configuration in which the first deflector functions as a reflective mirror and the second deflector functions as a semi-transmissive mirror.

In the light beam expanding device, the optical device, and the image display device of the embodiments of the present disclosure including the above-described preferred form and configuration (hereinafter, they will be often referred to simply as the "present disclosure" collectively), the axis line parallel to the X direction will be often referred to as the "X axis" for convenience and the axis line parallel to the Y direction will be often referred to as the "Y axis" for convenience. In addition, the axis line parallel to the Z direction will be often referred to as the "Z axis" for convenience. In the light beam expanding device, the X direction (X axis), the Y direction (Y axis), and the Z direction (Z axis) may be decided on the basis of the X direction, the Y direction, and the Z direction in the light guide plate. Specifically, if the incident direction of light when the light is incident on the light beam expanding device from a certain direction and is output from the light beam expanding device to be incident on the light guide plate is an "A direction," the direction in which the light is incident on the light beam expanding device, the direction of the light inside the light beam expanding device, and the direction of the light output from the light beam expanding device are the "A direction."

In the present disclosure, the sectional shape of the light reflective surface of the first reflective mirror is the shape when it is assumed that the light reflective surface of the first reflective mirror is cut by the 1A-th virtual plane, and the sectional shape of the light reflective surface of the second reflective mirror is the shape when it is assumed that the light reflective surface of the second reflective mirror is cut by the 2A-th virtual plane. The first reflective mirror and the second reflective mirror are referred to also as the reversal mirror. The angle ($\theta_1$') formed by the top part of a 1A-th inclined surface and the top part of a 1B-th inclined surface is 90 degrees or an acute angle or an obtuse angle, and the angle ($\theta_2$') formed by the top part of a 2A-th inclined surface and the top part of a 2B-th inclined surface is 90 degrees or an acute angle or an obtuse angle. Specifically, the shape of the virtual triangle (included in the 1A-th virtual plane) formed by the top side of the 1A-th inclined surface (referred to as the "1A-th inclined surface-A"), the top side of the 1A-th inclined surface adjacent to this 1A-th inclined surface-A (referred to as the "1A-th inclined surface-B"), and the bottom side of the 1A-inclined surface-A is an isosceles right triangle in which the lengths of adjacent sides are equal to each other or a right triangle in which the lengths of adjacent sides are different from each other. This virtual triangle will be referred to as the "first virtual right triangle" for convenience. Furthermore, the shape of the virtual triangle (included in the 2A-th virtual plane) formed by the top side of the 2A-th inclined surface (referred to as the "2A-th inclined surface-A"), the top side of the 2A-th inclined surface adjacent to this 2A-th inclined surface-A (referred to as the "2A-th inclined surface-B"), and the bottom side of the 2A-inclined surface-A is an isosceles right triangle in which the lengths of adjacent sides are equal to each other or a right triangle in which the lengths of adjacent sides are different from each other. This virtual triangle will be referred to as the "second virtual right triangle" for convenience.

That is, in the first reflective mirror, the first virtual right triangles having the same shape may be lined along the Y direction or the first virtual right triangles having different shapes may be lined along the Y direction. Specifically, in the former case, a configuration in which the first virtual right triangles (virtual isosceles right triangles or right triangles) are lined can be employed. On the other hand, in the latter case, e.g. the following configuration can be employed. Specifically, the first virtual right triangles (isosceles right triangles) are lined in the center area of the light reflective surface, and the first virtual right triangles (scalene right triangles) are lined on the right side of the center area of the light reflective surface. Furthermore, on the left side of the center area of the light reflective surface, the first virtual right triangles (scalene right triangles) symmetric with those on the right side of the center area of the light reflective surface are lined. It is preferable that, in one first virtual right triangle, the longer side of the adjacent sides is located closer to the center area of the light reflective surface.

Similarly, in the second reflective mirror, the second virtual right triangles having the same shape may be lined along the Z direction or the second virtual right triangles having different shapes may be lined along the Z direction. Specifically, in the former case, e.g. a configuration in which the second virtual right triangles (isosceles right triangles or right triangles) are lined can be employed. On the other hand, in the latter case, e.g. the following configuration can be employed. Specifically, the second virtual right triangles (isosceles right triangles) are lined in the center area of the light reflective surface, and the second virtual right triangles (scalene right triangles) are lined on the right side of the center area of the light reflective surface. Furthermore, on the left side of the center area of the light reflective surface, the second virtual right triangles (scalene right triangles) symmetric with those on the right side of the center area of the light reflective surface are lined. Also in this case, it is preferable that, in one second virtual right triangle, the longer side of the adjacent sides is located closer to the center area of the light reflective surface.

When it is assumed that the light reflective surface of the first reflective mirror is cut by the 1A-th virtual plane, in a pair of the 1A-th inclined surface and the 1B-th inclined surface, the angle formed by the bottom part of the 1A-th inclined surface and the bottom part of the 1B-th inclined surface is the angle ($\theta_1$) and the angle formed by the top part of the 1A-th inclined surface and the top part of the 1B-th inclined surface is the angle ($\theta_1$'). Similarly, when it is assumed that the light reflective surface of the second reflective mirror is cut by the 2A-th virtual plane, in a pair of the 2A-th inclined surface and the 2B-th inclined surface, the angle formed by the bottom part of the 2A-th inclined surface and the bottom part of the 2B-th inclined surface is the angle ($\theta_2$) and the angle formed by the top part of the 2A-th inclined surface and the top part of the 2B-th inclined surface is the angle ($\theta_2$').

Light incident on the first reflective mirror collides with the 1A-th inclined surface to be reflected by the 1A-th inclined surface. Then, the reflected light collides with the 1B-th inclined surface opposed to this 1A-th inclined surface to be reflected by the 1B-th inclined surface and be output from the first reflective mirror. Alternatively, light incident on the first reflective mirror collides with the 1B-th inclined surface to be reflected by the 1B-th inclined surface. Then, the reflected light collides with the 1A-th inclined surface opposed to this 1B-th inclined surface to be reflected by the 1A-th inclined surface and be output from the first reflective mirror. Similarly, light incident on the second reflective mirror collides with the 2A-th inclined surface to be reflected by the 2A-th inclined surface. Then, the reflected light collides with the 2B-th inclined surface opposed to this 2A-th inclined surface to be reflected by the 2B-th inclined surface and be output from the second reflective mirror. Alternatively, light incident on the second reflective mirror collides with the 2B-th inclined surface to be reflected by the 2B-th inclined surface. Then, the reflected light collides with the 2A-th inclined surface opposed to this 2B-th inclined surface to be reflected by the 2A-th inclined surface and be output from the second reflective mirror.

Examples of the image forming device in the image generating device of the first form include an image forming device composed of a reflective spatial light modulating device and a light source; an image forming device composed of a transmissive spatial light modulating device and a light source; and an image forming device composed of light emitting elements such as organic electro luminescence (EL) elements, inorganic EL elements, or light emitting diodes (LEDs). It is preferable to employ the image forming device composed of a reflective spatial light modulating device and a light source particularly. As the spatial light modulating device, a light valve is available. Specifically, e.g. a transmissive or reflective liquid crystal display device such as an LCOS (liquid crystal on silicon) and a digital micro-mirror device (DMD) are available. As the light source, a light emitting element is available. Furthermore, it is possible to employ a configuration in which the reflective spatial light modulating device is composed of a liquid crystal display device and a polarization beam splitter that reflects part of light from the light source to guide the reflected light to the liquid crystal display device and allows the passage of part of light reflected by the liquid crystal display device to guide the passing light to the collimating optical system. As the light emitting element to configure the light source, red light emitting element, green light emitting element, blue light emitting element, and white light emitting element are available. Examples of the light emitting element include semiconductor laser element, solid-state laser, and LED. The number of pixels may be decided based on the specifications required for the image display device. Examples of the specific value of the number of pixels include 320×240, 432×240, 640×480, 854×480, 1024×768, and 1920×1080. The collimating optical system has a function to convert position information of the pixels to angle information in the optical system of the light guide unit. Examples of the collimating optical system include an optical system that is obtained by using any of convex lens, concave lens, free-form-surface prism, and hologram lens alone or in combination and has positive optical power as a whole.

As the light source in the image generating device of the second form, a light emitting element is available. Specifically, red light emitting element, green light emitting element, blue light emitting element, and white light emitting element are available. Examples of the light emitting element include semiconductor laser element, solid-state laser, and LED. The number of pixels (virtual pixels) in the image display device of the second form may also be decided based on the specifications required for the image display device. Examples of the specific value of the number of pixels (virtual pixels) include 320×240, 432×240, 640×480, 854×480, 1024×768, and 1920×1080. If the light source is configured by red light emitting element, green light emitting element, and blue light emitting element, it is preferable to perform color synthesis by using a cross prism for example. As the scanning unit, a unit that performs horizontal scanning and vertical scanning of light output from the light source is available. Specifically, e.g. MEMS (micro electro mechanical systems) having a micro-mirror rotatable in the two-dimensional direction and a galvanomirror are available. The relay optical system may be configured by a known relay optical system.

For example, the following configurations can be employed besides the image forming device composed of a light emitting element and a light valve and the combination of a backlight that emits white light as a whole as the light source and a liquid crystal display device having red light emitting pixels, green light emitting pixels, and blue light emitting pixels.

[Image Forming Device-A]

An image forming device-A includes (α) a first image forming device formed of a first light emitting panel in which first light emitting elements that emit blue light are arranged in a two-dimensional matrix manner, (β) a second image forming device formed of a second light emitting panel in which second light emitting elements that emit green light are arranged in a two-dimensional matrix manner, (γ) a third image forming device formed of a third light emitting panel in which third light emitting elements that emit red light are arranged in a two-dimensional matrix manner, and (δ) a unit (e.g. dichroic prism, and this is the same also in the following description) for integrating light output from the first image forming device, the second image forming device, and the third image forming device onto one optical path, and the image forming device-A controls the emission/non-emission state of each of the first light emitting elements, the second light emitting elements, and the third light emitting elements.

[Image Forming Device-B]

An image forming device-B includes (α) a first image forming device composed of first light emitting elements that emit blue light and a first light passage control device [it is a kind of light valve and is formed of e.g. liquid crystal display device, digital micro-mirror device (DMD), or LCOS, and this is the same also in the following description] for controlling the passage/non-passage of light output from the first light emitting elements to emit blue light, (β) a second image forming device composed of second light emitting elements that emit green light and a second light passage control device (light valve) for controlling the passage/non-passage of light output from the second light emitting elements to emit green light, (γ) a third image forming device composed of third light emitting elements that emit red light and a third light passage control device (light valve) for controlling the passage/non-passage of light output from the third light emitting elements to emit red light, and (δ) a unit for integrating light that has passed through the first light passage control device, the second light passage control device, and the third light passage control device onto one optical path, and the image forming device-B displays an image by controlling the passage/non-passage of light output from these light emitting elements by the light passage control devices. As a unit (light leading member) for leading light output from the first light emitting elements, the second light emitting elements, and the third light emitting elements to the light passage control devices, light guide member, microlens array, mirror, reflective plate, and collecting lens can be employed as an example.

[Image Forming Device-C]

An image forming device-C includes (α) a first image forming panel in which first light emitting elements that emit blue light are arranged in a two-dimensional matrix manner and a blue light passage control device (light valve) for controlling the passage/non-passage of light output from the first light emitting panel, (β) a second image forming device composed of a second light emitting panel in which second light emitting elements that emit green light are arranged in a two-dimensional matrix manner and a green light passage control device (light valve) for controlling the passage/non-passage of light output from the second light emitting panel, (γ) a third image forming device composed of a third light emitting panel in which third light emitting elements that emit red light are arranged in a two-dimensional matrix manner and a red light passage control device (light valve) for controlling the passage/non-passage of light output from the third light emitting panel, and (δ) a unit for integrating light that has passed through the blue light passage control device, the green light passage control device, and the red light passage control device onto one optical path, and the image forming device-C displays an image by controlling the passage/non-passage of light output from these first light emitting panel, second light emitting panel, and third light emitting panel by the light passage control devices (light valves).

[Image Forming Device-D]

An image forming device-D is an image forming device of a field sequential system for color displaying, and includes (α) a first image forming device including first light emitting elements that emit blue light, (β) a second image forming device including second light emitting elements that emit green light, (γ) a third image forming device including third light emitting elements that emit red light, (δ) a unit for integrating light output from the first image forming device, the second image forming device, and the third image forming device onto one optical path, and (ε) a light passage control device (light valve) for controlling the passage/non-passage of light output from the unit for integrating light onto one optical path, and the image forming device-D displays an image by controlling the passage/non-passage of light output from these light emitting elements by the light passage control device.

[Image Forming Device-E]

An image forming device-E is also an image forming device of a field sequential system for color displaying, and includes (α) a first image forming device formed of a first light emitting panel in which first light emitting elements that emit blue light are arranged in a two-dimensional matrix manner, (β) a second image forming device formed of a second light emitting panel in which second light emitting elements that emit green light are arranged in a two-dimensional matrix manner, (γ) a third image forming device formed of a third light emitting panel in which third light emitting elements that emit red light are arranged in a two-dimensional matrix manner, (δ) a unit for integrating light output from each of the first image forming device, the second image forming device, and the third image forming device onto one optical path, and (ε) a light passage control device (light valve) for controlling the passage/non-passage of light output from the unit for integrating light onto one optical path, and the image forming device-E displays an image by controlling the passage/non-passage of light output from these light emitting panels by the light passage control device.

[Image Forming Device-F]

An image forming device-F is an image forming device of a passive matrix type or an active matrix type for color displaying and displays an image by controlling the emission/non-emission state of each of first light emitting elements, second light emitting elements, and third light emitting elements.

[Image Forming Device-G]

An image forming device-G is an image forming device of a field sequential system for color displaying and includes a light passage control device (light valve) for controlling the passage/non-passage of output light from light emitting element units arranged in a two-dimensional matrix manner. The image forming device-G displays an image by carrying out time-sharing control of the emission/non-emission state of each of first light emitting elements, second light emitting elements, and third light emitting elements in the light emitting element units and controlling the passage/non-passage of light output from the first light emitting elements, the second light emitting elements, and the third light emitting elements by the light passage control device.

In a preferred configuration of the image generating device of the first form or the second form, the first deflector functions as a reflective mirror and the second deflector functions as a semi-transmissive mirror as described above. In such a form, the first deflector is composed of e.g. the metal including the alloy and can be formed of a light reflective film (a kind of mirror) that reflects light incident on the light guide plate or a diffraction grating (e.g. hologram diffraction grating film) that diffracts light incident on the light guide plate. Furthermore, the second deflector can be formed of e.g. a dielectric multilayer film, a half mirror, a polarization beam splitter, or a hologram diffraction grating film. The first deflector and the second deflector are disposed inside the light guide plate (incorporated into the inside of the light guide plate). By the first deflector, collimated light incident on the light guide plate is so reflected or diffracted that the collimated light incident on the light guide plate is totally reflected inside the light guide plate. By the second deflector, the collimated light propagated inside the light guide plate by total reflection is reflected or diffracted plural times to be output from the light guide plate as the collimated light. On the light reflective surface of the reflective mirror configuring the light beam expanding device, e.g. a light reflective layer composed of the metal including the alloy is formed.

Alternatively, in a preferred configuration of the image generating device of the first form or the second form, the first deflector and the second deflector are formed of e.g. reflective diffraction grating elements, specifically e.g. reflective volume hologram diffraction gratings, as described above. The first deflector formed of the reflective volume hologram diffraction grating will be often referred to as the "first diffraction grating member" for convenience, and the second deflector formed of the reflective volume hologram diffraction grating will be often referred to as the "second diffraction grating member" for convenience.

The following configuration can be employed. Specifically, in order to cover diffraction reflection of P kinds of light having different P kinds (e.g. P=3, three kinds of red, green, and blue) of wavelength bands (or wavelengths), the first diffraction grating member or the second diffraction grating member may have a configuration obtained by stacking P diffraction grating layers formed of reflective volume hologram diffraction gratings. In each diffraction grating layer, an interference pattern corresponding to one kind of wavelength band (or wavelength) is formed. Alternatively, it is also possible to employ a configuration in which P kinds of interference patterns are formed in the first diffraction grating member or the second diffraction grating member formed of one diffraction grating layer in order to cover diffraction reflection of P kinds of light having different P kinds of wavelength bands (or wavelengths). Alternatively, it is possible to employ a configuration in which the angle of view is trisected for example and the first diffraction grating member or the second diffraction grating member is obtained by stacking diffraction grating layers corresponding to the respective angles of view. Employing any of these configurations allows increase in the diffraction efficiency, increase in the diffraction acceptance angle, and optimization of the diffraction angle when light having the respective wavelength bands (or wavelengths) is subjected to diffraction reflection by the first diffraction grating member or the second diffraction grating member.

As the material to configure the first diffraction grating member and the second diffraction grating member, a photopolymer material is available. The constituent material and basic structure of the first diffraction grating member and the second diffraction grating member formed of the reflective volume hologram diffraction gratings may be the same as those of the reflective volume hologram diffraction grating of the related art. The reflective volume hologram diffraction grating means a hologram diffraction grating that makes diffraction reflection of only +1st-order diffraction light. In the diffraction grating member, an interference pattern is formed across the range from the inside thereof to the surface. The forming method of this interference pattern itself may be an existing forming method. Specifically, for example, a member (e.g. photopolymer material) to configure the diffraction grating member is irradiated with object light from a first predetermined direction on one side. Simultaneously, the member to configure the diffraction grating member is irradiated with reference light from a second predetermined direction on the other side. Thereby, an interference pattern formed by the object light and the reference light is recorded in the inside of the member to configure the diffraction grating member. By properly selecting the first predetermined direction, the second predetermined direction, and the wavelengths of the object light and the reference light, a desired pitch of the interference pattern in the surface of the diffraction grating member and a desired inclination angle (slant angle) of the interference pattern can be obtained. The inclination angle of the interference pattern means the angle formed by the surface of the diffraction grating member (or diffraction grating layer) and the interference pattern. If the first diffraction grating member and the second diffraction grating member are configured by a stacking structure of P diffraction grating layers formed of reflective volume hologram diffraction gratings, this stacking structure of the diffraction grating layers may be obtained as follows. Specifically, P diffraction grating layers are each individually fabricated and then P diffraction grating layers are stacked (bonded) by using e.g. an ultraviolet-curable adhesive. Alternatively, P diffraction grating layers may be fabricated by fabricating one diffraction grating layer by using a photopolymer material having adherence and then sequentially attaching the photopolymer material having adherence thereon to fabricate diffraction grating layers.

In the image generating device of the first form or the second form, light turned to plural collimated light beams by the collimating optical system or the relay optical system is made incident on the light guide plate. This requirement for the incident light to be collimated light is based on that light wave surface information when these light beams are incident on the light guide plate needs to be stored also after the light beams are output from the light guide plate via the first deflector and the second deflector. To generate plural collimated light beams, specifically, the light exit part of the image forming device is located at the place (position) corresponding to the focal length in the collimating optical system or the relay optical system for example. The collimating optical system has a function to convert position information of the pixels to angle information in the optical system of the optical device.

In the image display device, the light guide plate has two parallel surfaces (first surface and second surface) extending in parallel to the direction (Y direction) of light propagation by internal total reflection in the light guide plate. When the surface of the light guide plate on which light is incident is defined as the light guide plate incidence surface and the surface of the light guide plate from which light is output is defined as the light guide plate exit surface, the light guide plate incidence surface and the light guide plate exit surface may be configured by the first surface. Alternatively, the light guide plate incidence surface may be configured by the first surface and the light guide plate exit surface may be configured by the second surface.

As the material to form the light guide plate, glass including quartz glass and optical glass such as BK7 and plastic materials (e.g. PMMA, polycarbonate resin, acrylic resin, amorphous polypropylene resin, styrene resin including AS resin) are available. The shape of the light guide plate is not limited to a flat plate shape and may be a curved shape.

By the image display device of the present disclosure, for example, a head mounted display (HMD) can be configured. Furthermore, reduction in the weight and size of the device can be achieved and a feeling of discomfort when the device is mounted can be greatly reduced. Moreover, it is also possible to reduce the manufacturing cost.

The head mounted display includes (A) a glasses-type frame mounted on the head of a viewer, and (B) the image display device of the present disclosure.

The head mounted display may include one image display device of the present disclosure (single-eye type) or include two image display devices (both-eyes type).

The frame is composed of a front part disposed in front of the viewer, two temple parts freely rotatably attached to both ends of the front part with the intermediary of hinges, and end parts attached to the tip parts of the respective temple parts. Furthermore, the frame has nose pads. When the whole of the head mounted display is viewed, the assembly of the frame and the nose pads has substantially the same structure as that of normal glasses except for that rims are absent. The frame can be formed from the same materials as those to form normal glasses, such as metal, alloy, plastic, and combination of them. The nose pads can also have known configuration and structure.

In terms of the design of the head mounted display and easiness of mounting of the head mounted display, it is preferable to employ a form in which a wiring line (signal line, power supply line, etc.) from one or two image generating devices extends from the tip part of the end part to the external via the inside of the temple part and the end part and is connected to an external circuit (control circuit). Furthermore, it is more preferable that each image generating device has a headphone part and a headphone part wiring line from each image generating device extends from the tip part of the end part to the headphone part via the inside of the temple part and the end part. As the headphone part, e.g. a headphone part of an inner ear type and a headphone part of a canal type are available. More specifically, it is preferable to employ a form in which the headphone part wiring line extends from the tip part of the end part to the headphone part in such a manner as to go around the back side of the auricle (auditory capsule).

The head mounted display can have a form in which an imaging device is attached to the center part of the front part. Specifically, the imaging device is composed of e.g. a solid-state imaging element formed of a CCD (charge coupled device) or CMOS (complementary metal oxide semiconductor) sensor and a lens. A wiring line from the imaging device may be made to pass through the back surface of the front part to be connected to one image display device for example.

Moreover, the wiring line may be included in the wiring line extending from the image generating device.

If the head mounted display is the both-eyes type, it is preferable to employ the following configuration.

The light guide units are disposed closer to the center of the face of the viewer than the image generating devices as a whole, the head mounted display further has a connecting member to connect two image display devices, the connecting member is attached to the viewer-facing side of the center part of the frame located between two pupils of the viewer, and the projected image of the connecting member is included in the projected image of the frame.

By employing a structure in which the connecting member is attached to the center part of the frame located between two pupils of the viewer in this manner, i.e. unless the head mounted display has a structure in which the image display devices are not attached directly to the frame, the following advantage is achieved. Specifically, when the viewer wears the frame on the head, even when the temple parts become a state of being expanded toward the outside and the frame is deformed as a result, the displacement (position change) of the image generating devices or the light guide units due to this deformation of the frame does not occur or is extremely slight even if it occurs. Therefore, change in the vergence angle between left and right images can be surely prevented. In addition, the rigidity of the front part of the frame does not need to be enhanced. Thus, increase in the weight of the frame, the lowering of design, and increase in the cost are not caused. Furthermore, because the image display devices are not attached directly to the glasses-type frame, the design, color, etc. of the frame can be freely selected depending on the preference of the viewer. Furthermore, restrictions on the design of the frame are also less and flexibility in terms of the design is high. In addition, the connecting member is disposed between the viewer and the frame and the projected image of the connecting member is included in the projected image of the frame. In other words, the connecting member is hidden by the frame when the head mounted display is viewed from the front of the viewer. Therefore, high design quality can be given to the head mounted display.

It is preferable to employ a configuration in which the connecting member is attached to the viewer-facing side of the center part of the front part located between two pupils of the viewer (equivalent to the bridge part in normal glasses).

Two image display devices are connected by the connecting member. Specifically, it is possible to employ a form in which the image generating devices are attached to the respective end parts of the connecting member in such a manner that the attachment state can be adjusted. In this case, it is preferable to employ a configuration in which the respective image generating devices are located closer to the outside than the pupils of the viewer. Moreover, in such a configuration, it is preferable to satisfy the following conditions: $0.01 \times L \leq \alpha \leq 0.30 \times L$, preferably $0.05 \times L \leq \alpha \leq 0.25 \times L$, $0.35 \times L \leq \beta \leq 0.65 \times L$, preferably $0.45 \times L \leq \beta \leq 0.55 \times L$, and $0.70 \times L \leq \gamma \leq 0.99 \times L$, preferably $0.75 \times L \leq \gamma \leq 0.95 \times L$. In these expressions, the respective parameters are defined as follows: $\alpha$ is the distance between the attachment part center of one image generating device and one end part (one lug, hinge) of the frame; $\beta$ is the distance from the center of the connecting member to one end part (one lug) of the frame; $\gamma$ is the distance between the attachment part center of the other image generating device and one end part (one lug) of the frame; and L is the length of the frame. The image generating devices are attached to the respective end parts of the connecting member in the following manner. Specifically, for example, penetrating holes are made at three places at each end part of the connecting member and screwing parts corresponding to the penetrating holes are made in the image generating devices. Furthermore, screws are made to pass through the respective penetrating holes and are screwed into the screwing parts made in the image generating devices. A spring is inserted between the screw and the screwing part. Due to this, the attachment state of the image generating device (inclination of the image generating device relative to the connecting member) can be adjusted based on the fastening state of the screw.

The attachment part center of the image generating device refers to the point of bisection, along the axis line direction of the frame, of the overlapping part between the projected image of the frame and the projected image of the image generating device obtained when the image generating device and the frame are projected onto a virtual plane in the state in which the image generating device is attached to the connecting member. Furthermore, the center of the connecting member refers to the point of bisection, along the axis line direction of the frame, of the contact part of the connecting member with the frame in the state in which the connecting member is attached to the frame. The length of the frame refers to the length of the projected image of the frame if the frame is curved. The projection direction is the direction perpendicular to the face of the viewer.

Besides, although two image display devices are connected by the connecting member, specifically it is also possible to employ a form in which the connecting member connects two light guide units. In some cases, two light guide units are monolithically fabricated. In such a case, the connecting member is attached to this monolithically-fabricated light guide unit. This form is also encompassed in the form in which the connecting member connects two light guide units. When the distance between the center of one image generating device and one end part of the frame is defined as $\alpha'$ and the distance between the center of the other image generating device and one end part of the frame is defined as $\gamma'$, it is preferable that the values of $\alpha'$ and $\gamma'$ be also set similar to the values of the above-described $\alpha$ and $\gamma$. The center of the image generating device refers to the point of bisection, along the axis line direction of the frame, of the overlapping part between the projected image of the frame and the projected image of the image generating device obtained when the image generating device and the frame are projected onto a virtual plane in the state in which the image generating device is attached to the light guide unit.

The shape of the connecting member is arbitrary as long as the projected image of the connecting member is included in the projected image of the frame. Examples of the shape include a bar shape and an elongated plate shape. As the material to form the connecting member, metal, alloy, plastic, and combination of them are available.

[Embodiment Example 1]

Embodiment example 1 relates to a light beam expanding device, an image display device, and an optical device of an embodiment of the present disclosure.

Figure 1B:
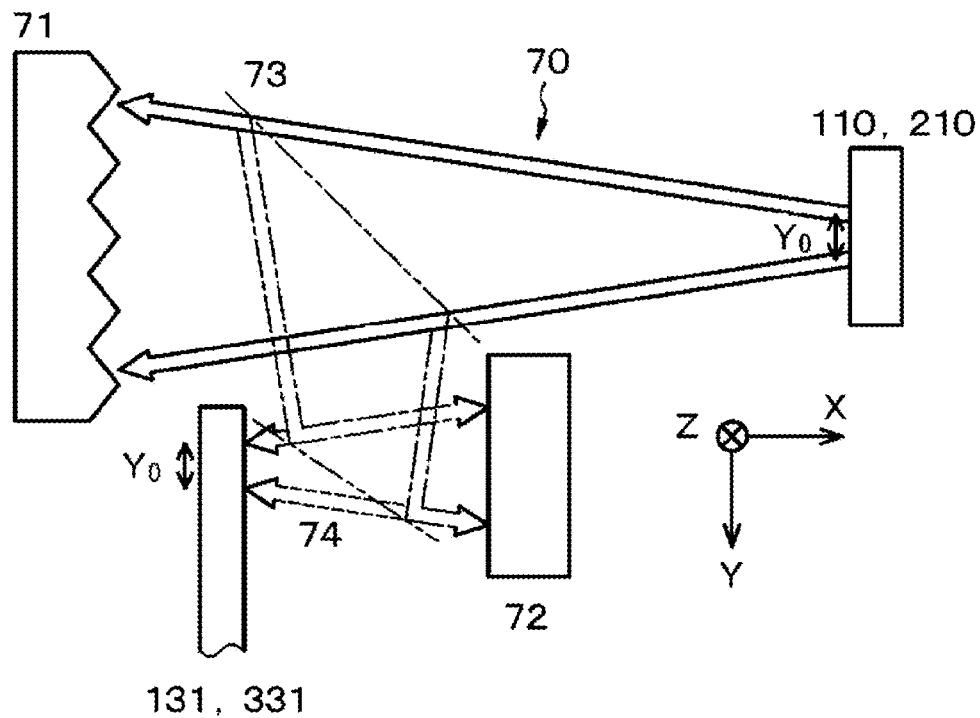
Figure 2A:
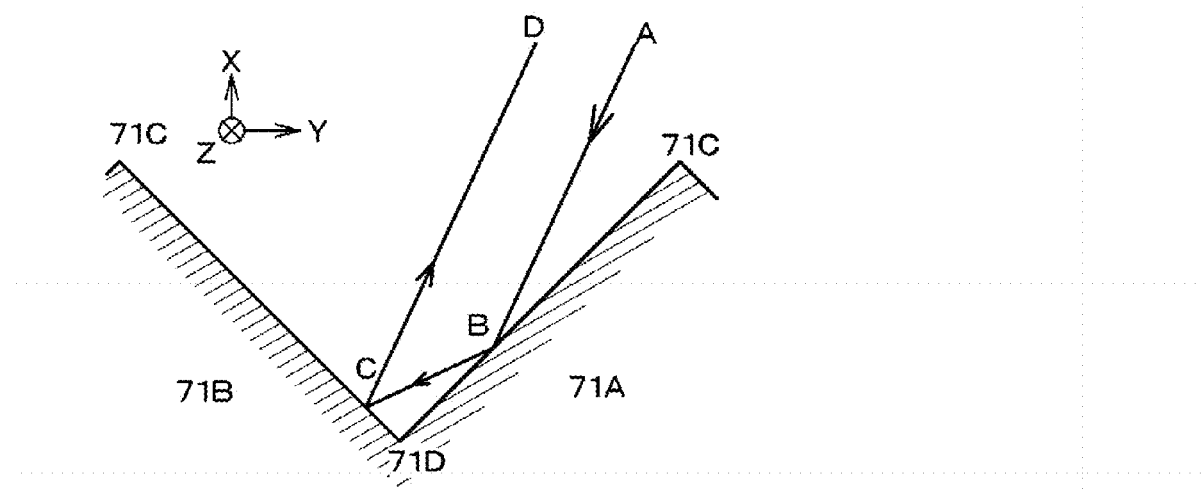
FIGS. 2A to 2C are a schematic partial sectional view of a first reflective mirror, a schematic partial plan view of the first reflective mirror, and a schematic partial side view of the first reflective mirror (showing only the behavior of light), respectively.
Figure 2B:
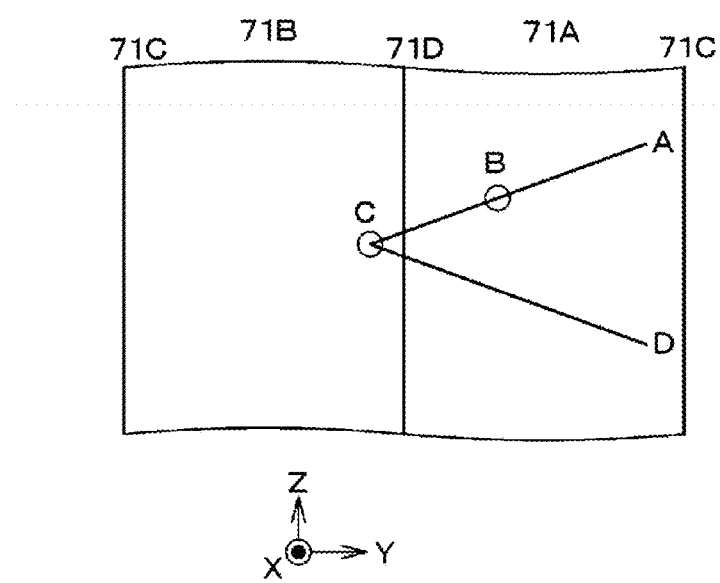
Figure 2C:
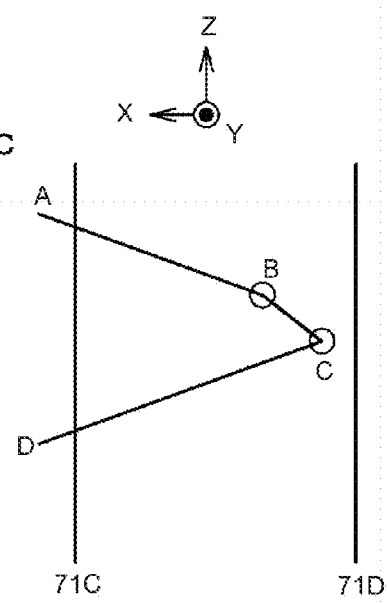
Figure 3A:
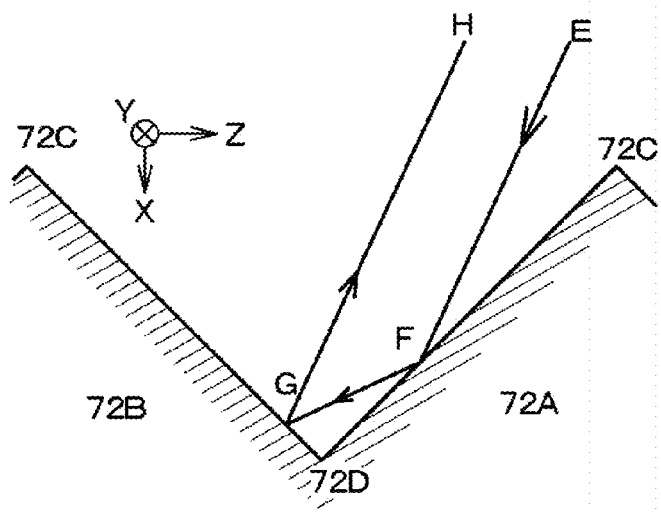
FIGS. 3A to 3C are a schematic partial sectional view of a second reflective mirror, a schematic partial plan view of the second reflective mirror, and a schematic partial side view of the second reflective mirror (showing only the behavior of light), respectively.
Figure 3B:
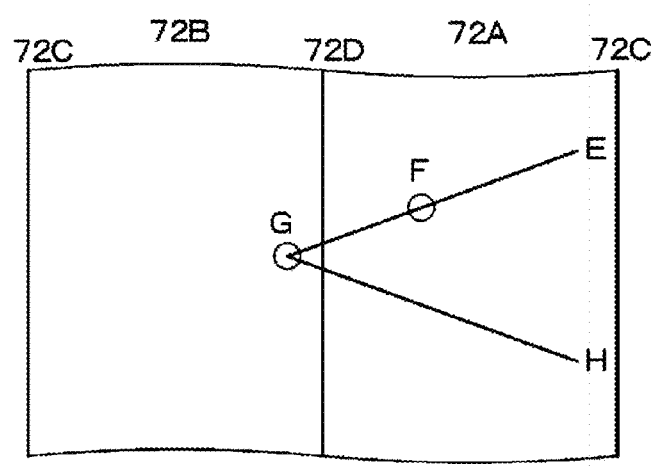
Figure 3C:
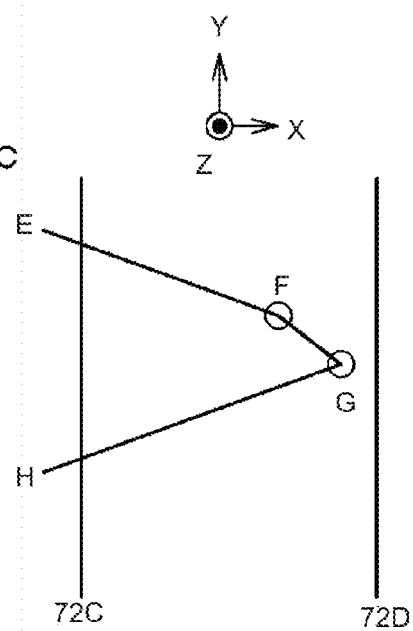
Figure 4A:
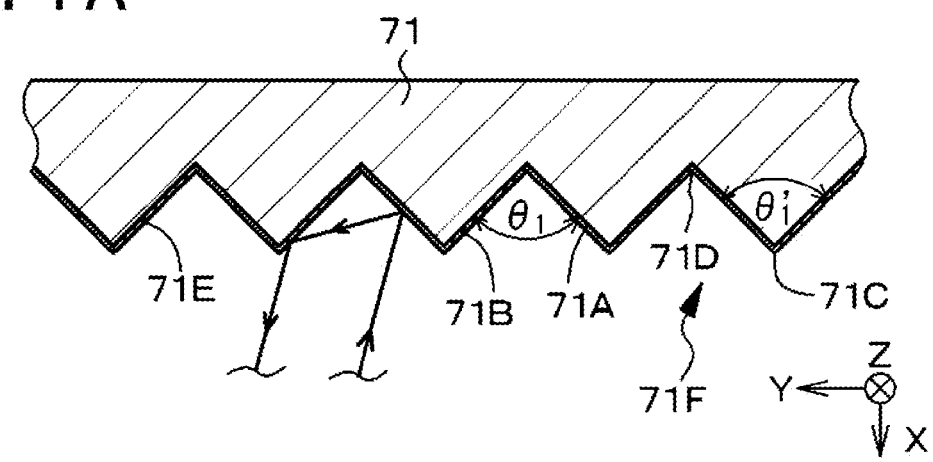
FIGS. 4A and 4B are schematic partial sectional views of the first reflective mirror and the second reflective mirror, respectively.
Figure 4B:
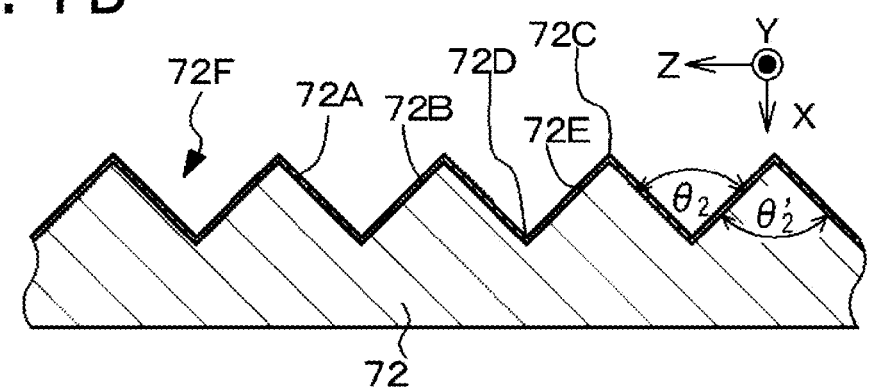
Figure 5:
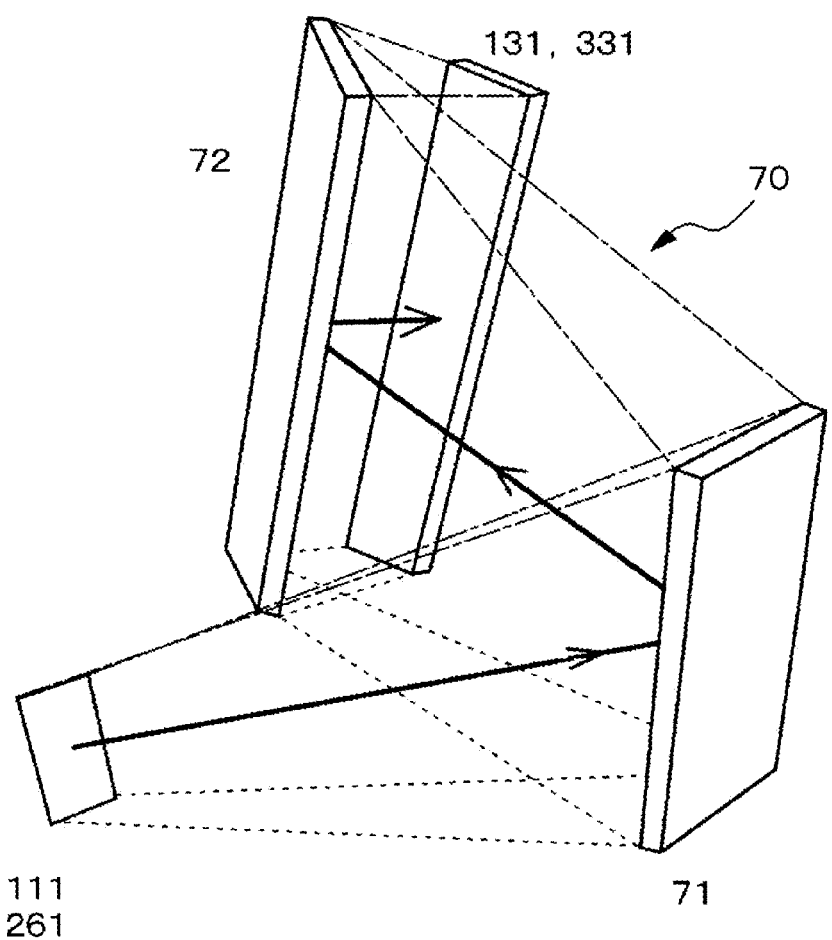
FIG. 5 is a schematic diagram when the light beam expanding device of embodiment example 1 is viewed from a certain direction.
Figure 6:
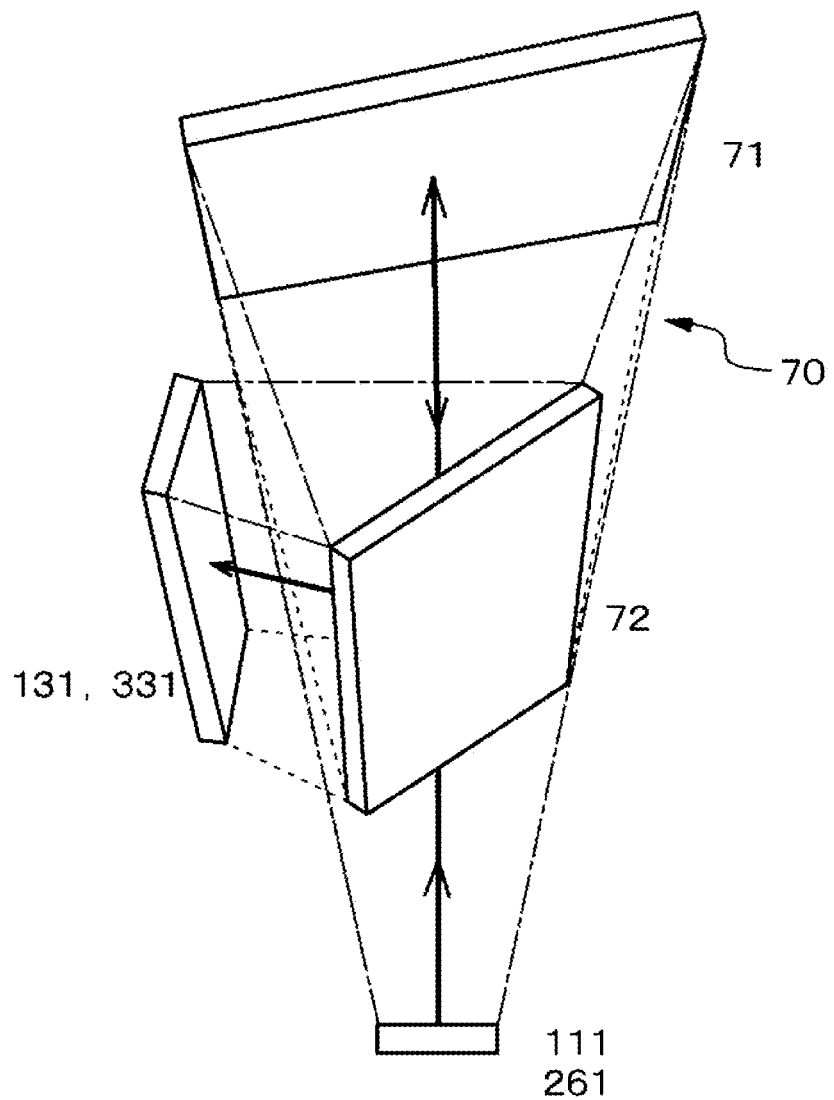
FIG. 6 is a schematic diagram when the light beam expanding device of embodiment example 1 is viewed from another direction.
Figure 7:
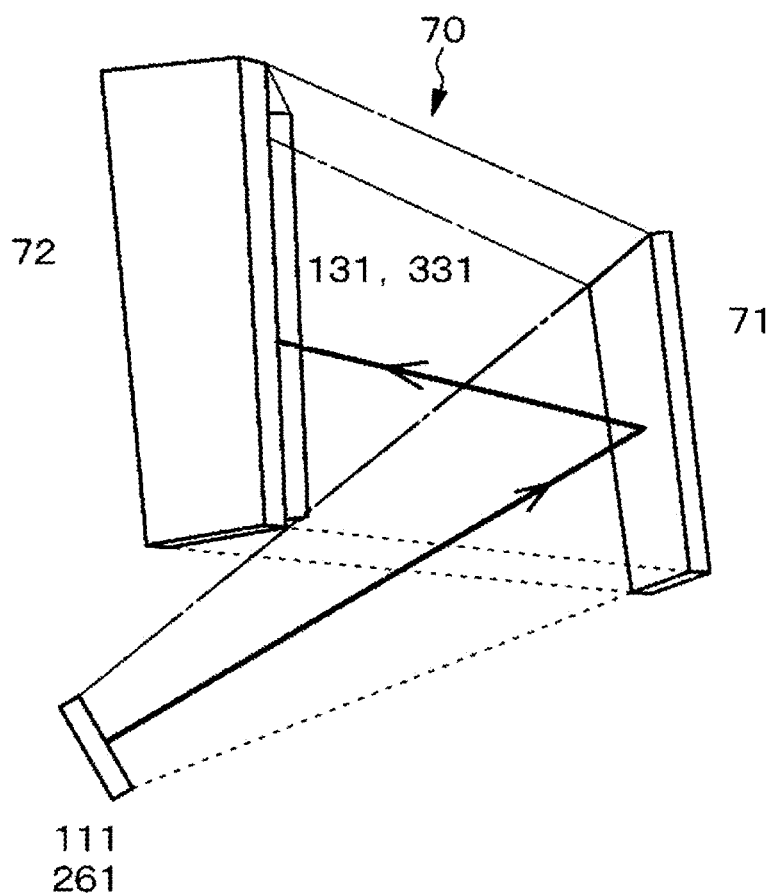
FIG. 7 is a schematic diagram when the light beam expanding device of embodiment example 1 is viewed from further another direction.
Figure 8:
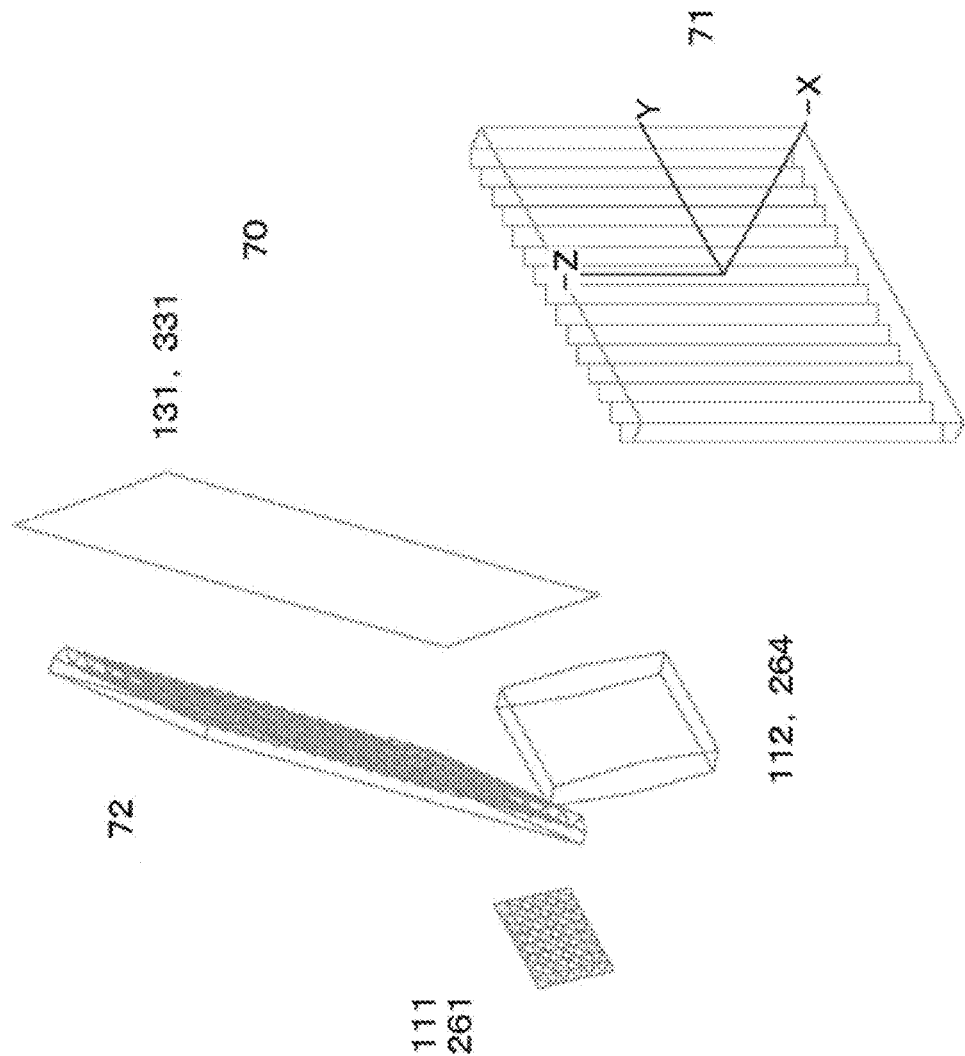
FIG. 8 is a diagram stereoscopically showing the positional relationship among an image forming device, the first reflective mirror, the second reflective mirror, and a light guide plate in an image display device of embodiment example 1.
Figure 9:
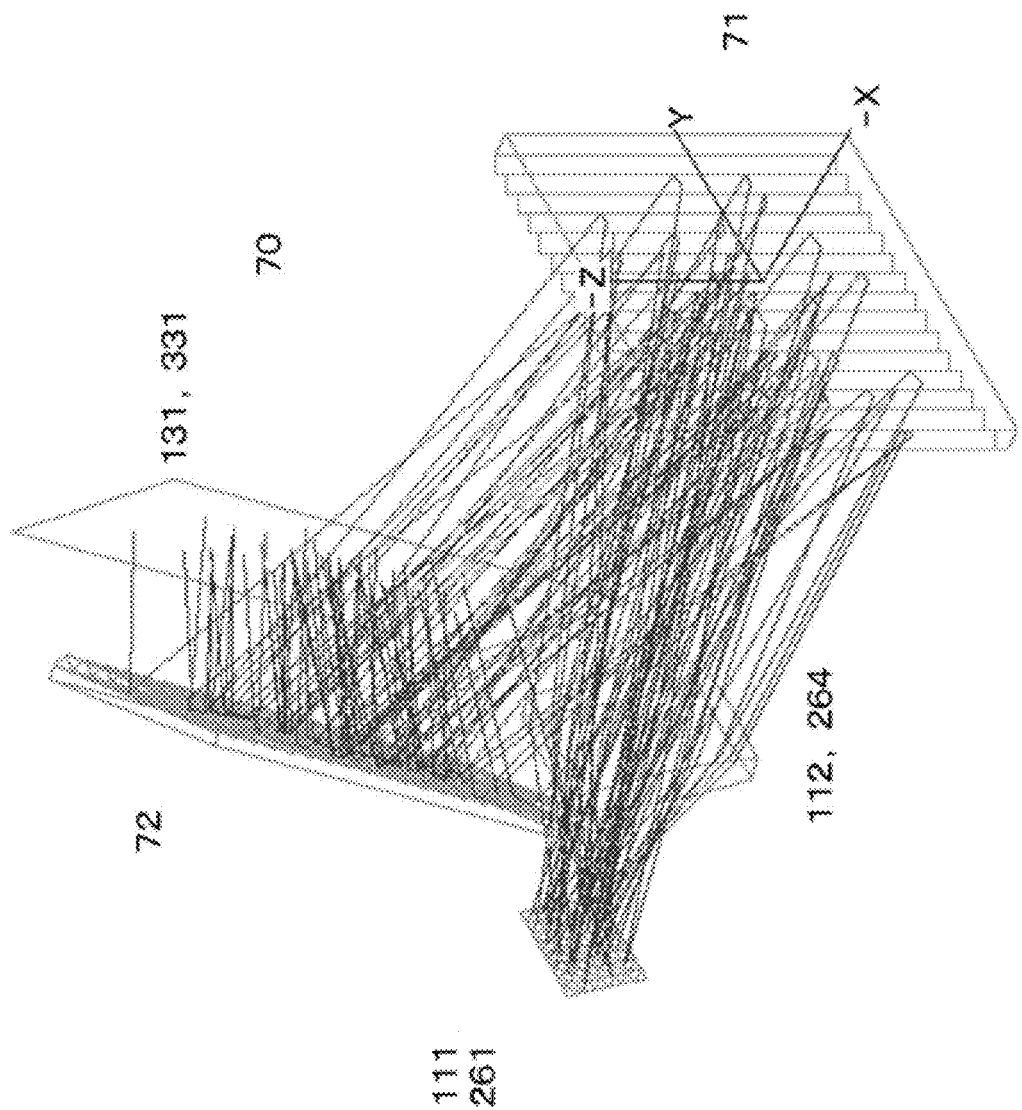
FIG. 9 is a diagram showing the behavior of light in the light beam expanding device of embodiment example 1.
Figure 10:
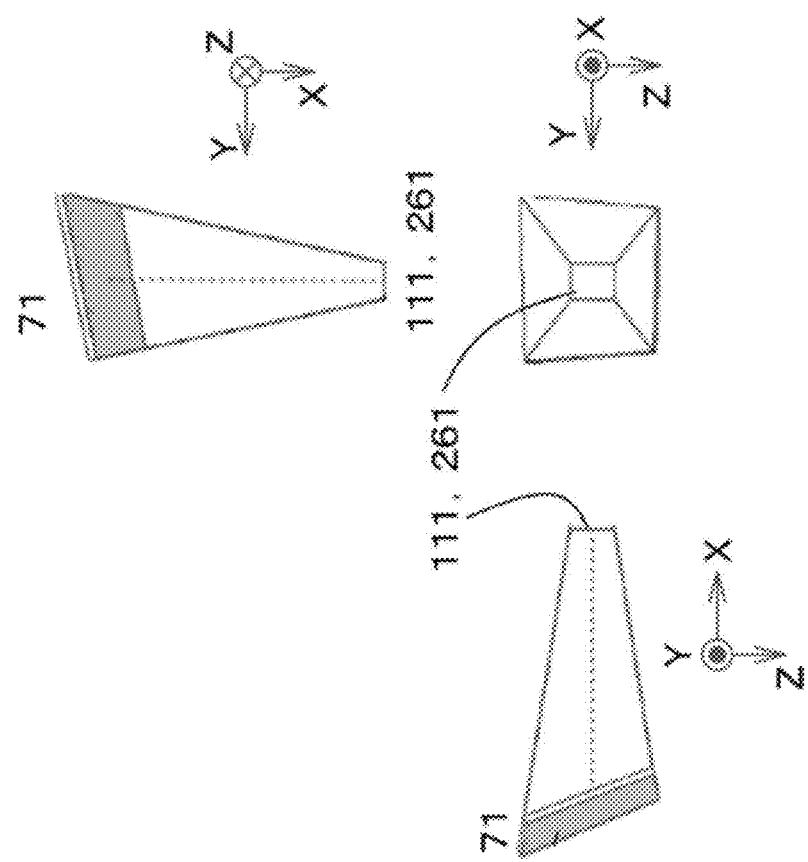
FIG. 10 is a diagram schematically showing the positional relationship between the image forming device or a light source and the first reflective mirror in the image display device of embodiment example 1.
Figure 11:
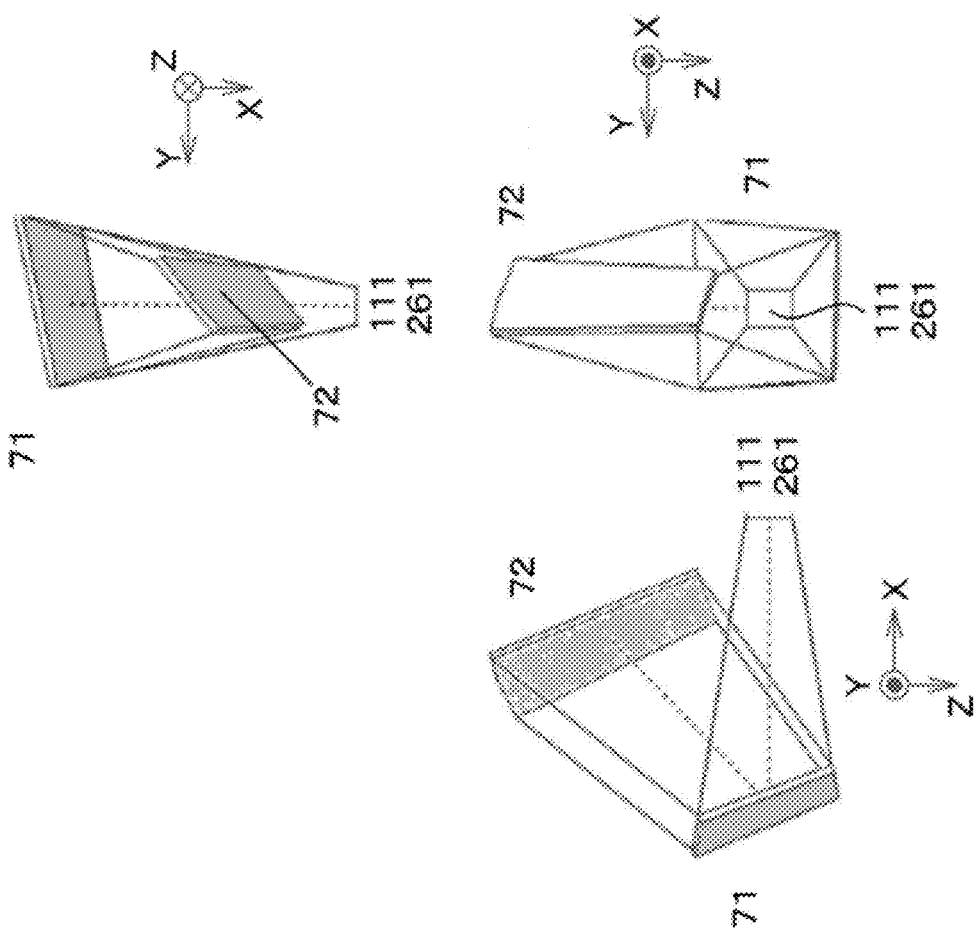
FIG. 11 is a diagram schematically showing the positional relationship among the image forming device or the light source, the first reflective mirror, and the second reflective mirror in the image display device of embodiment example 1.
Figure 12:
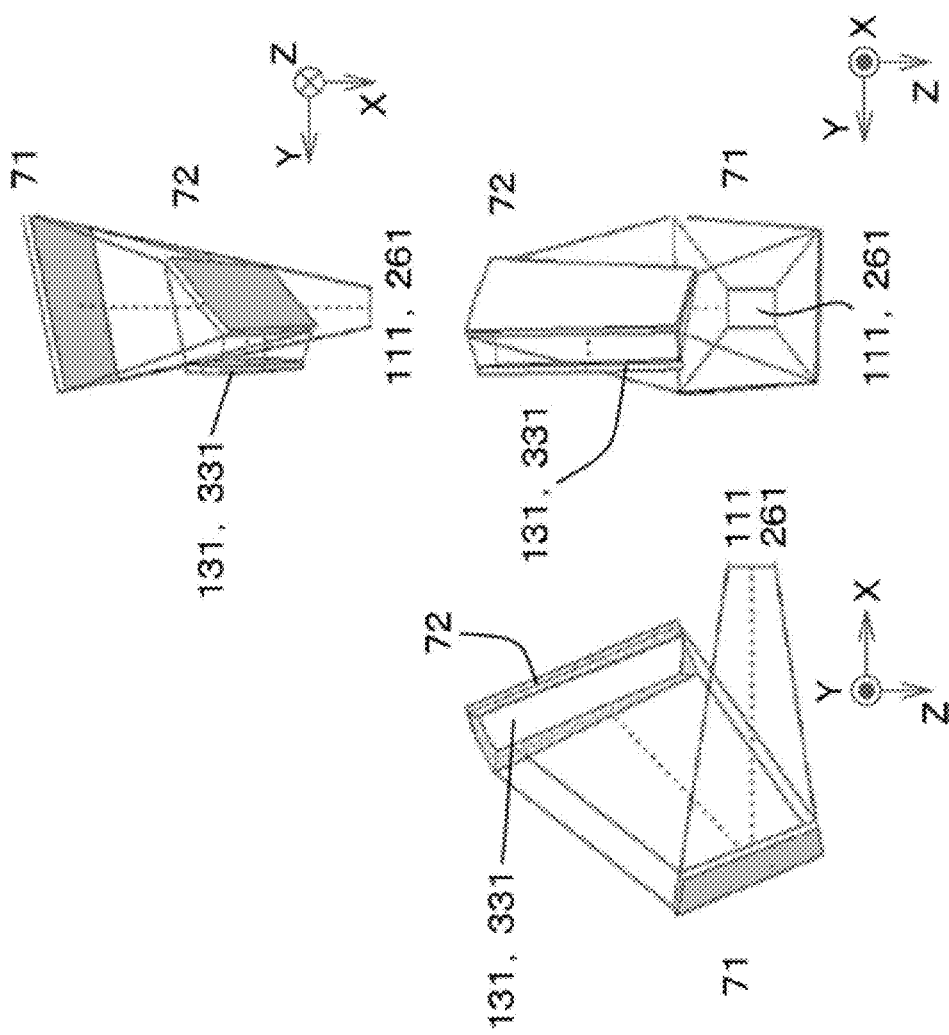
FIG. 12 is a diagram schematically showing the positional relationship among the image forming device or the light source, the first reflective mirror, the second reflective mirror, and the light guide plate in the image display device of embodiment example 1.
Figure 13:
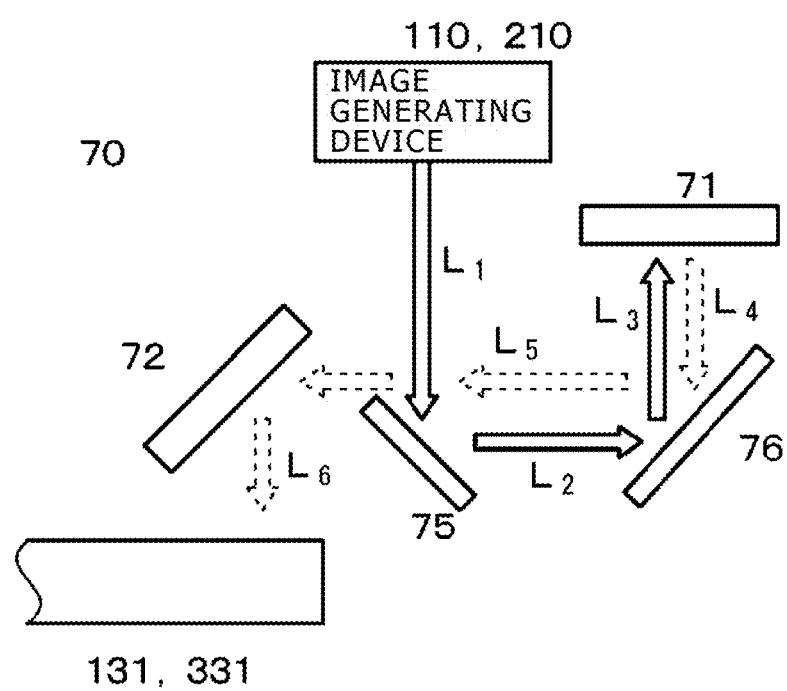
FIG. 13 is a diagram conceptually showing the positional relationship among an image generating device, the first reflective mirror, the second reflective mirror, and the light guide plate in a modification example of the image display device of embodiment example 1.
Figure 14:
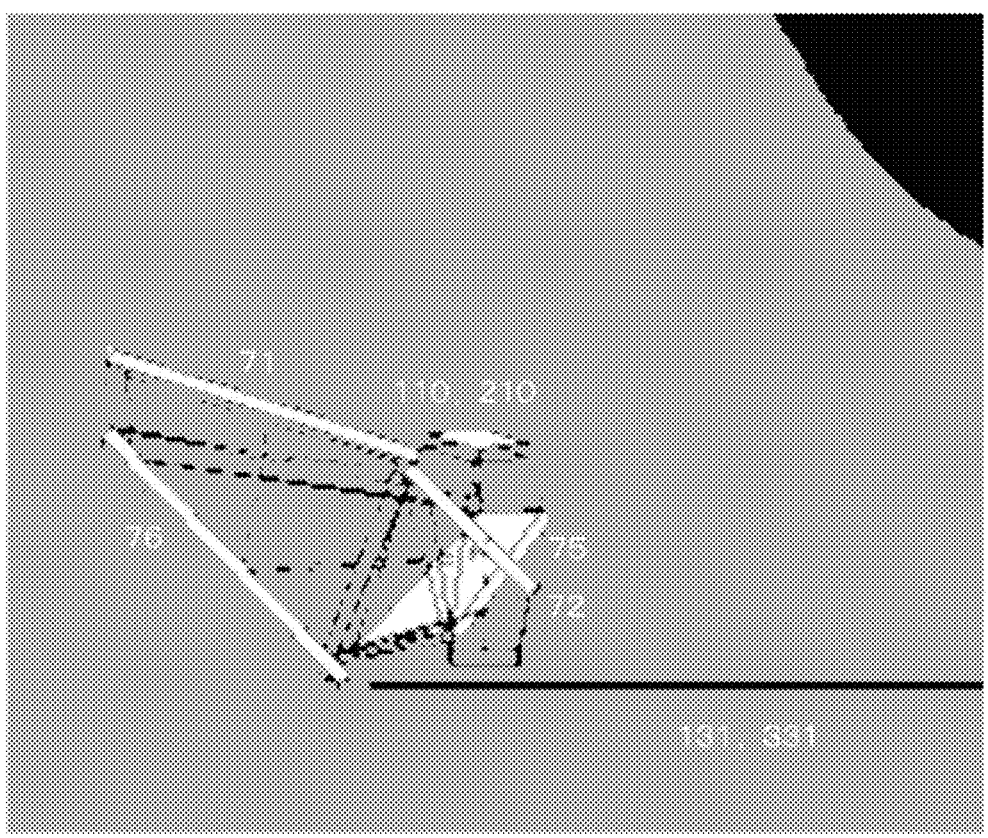
FIG. 14 is a diagram specifically showing the positional relationship among the image generating device, the first reflective mirror, and the second reflective mirror in the modification example of the image display device of embodiment example 1.
Figure 15:
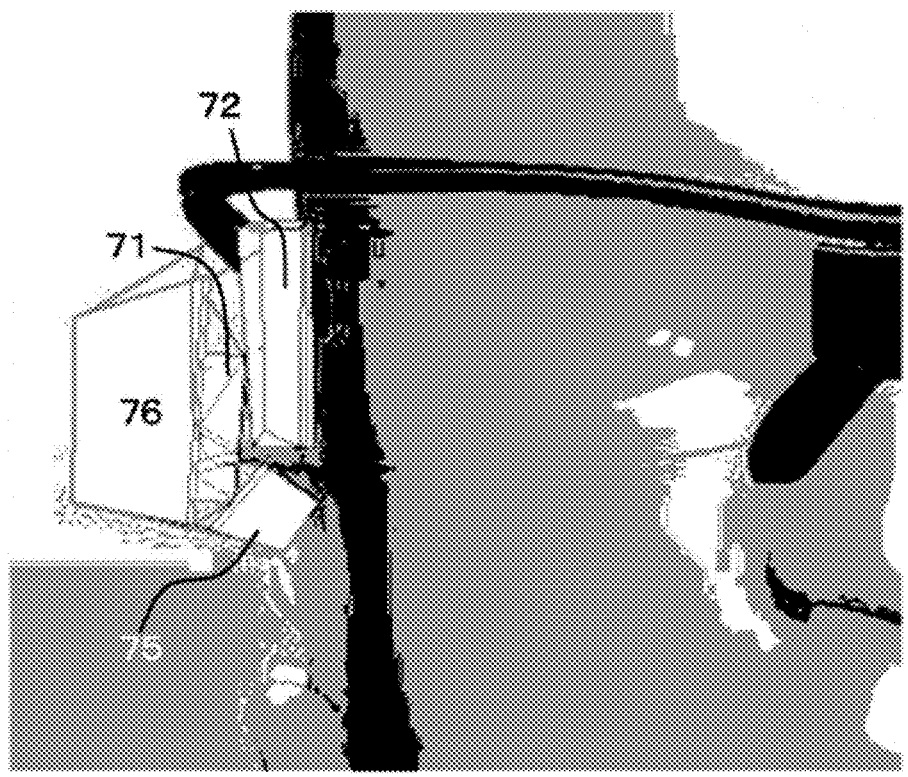
FIG. 15 is a diagram that specifically shows the positional relationship among the image generating device, the first reflective mirror, and the second reflective mirror in the modification example of the image display device of embodiment example 1, and is viewed from an angle different from that of FIG. 14.
Figure 16:
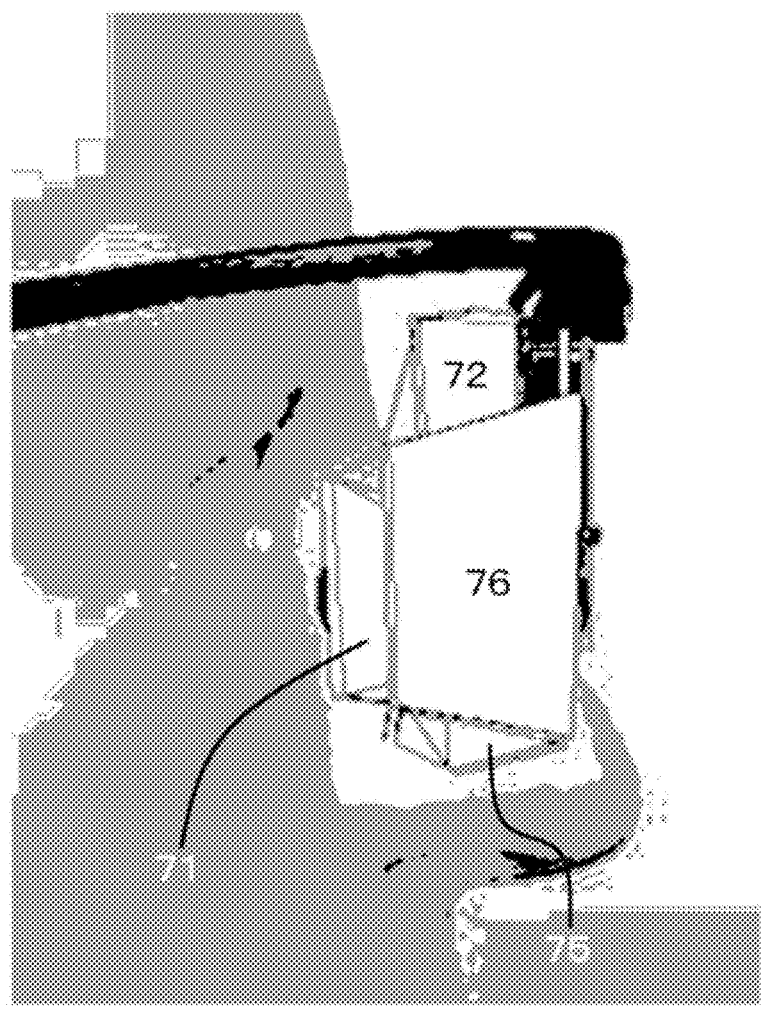
FIG. 16 is a diagram that specifically shows the positional relationship among the image generating device, the first reflective mirror, and the second reflective mirror in the modification example of the image display device of embodiment example 1, and is viewed from an angle different from that of FIG. 14.
Figure 17:
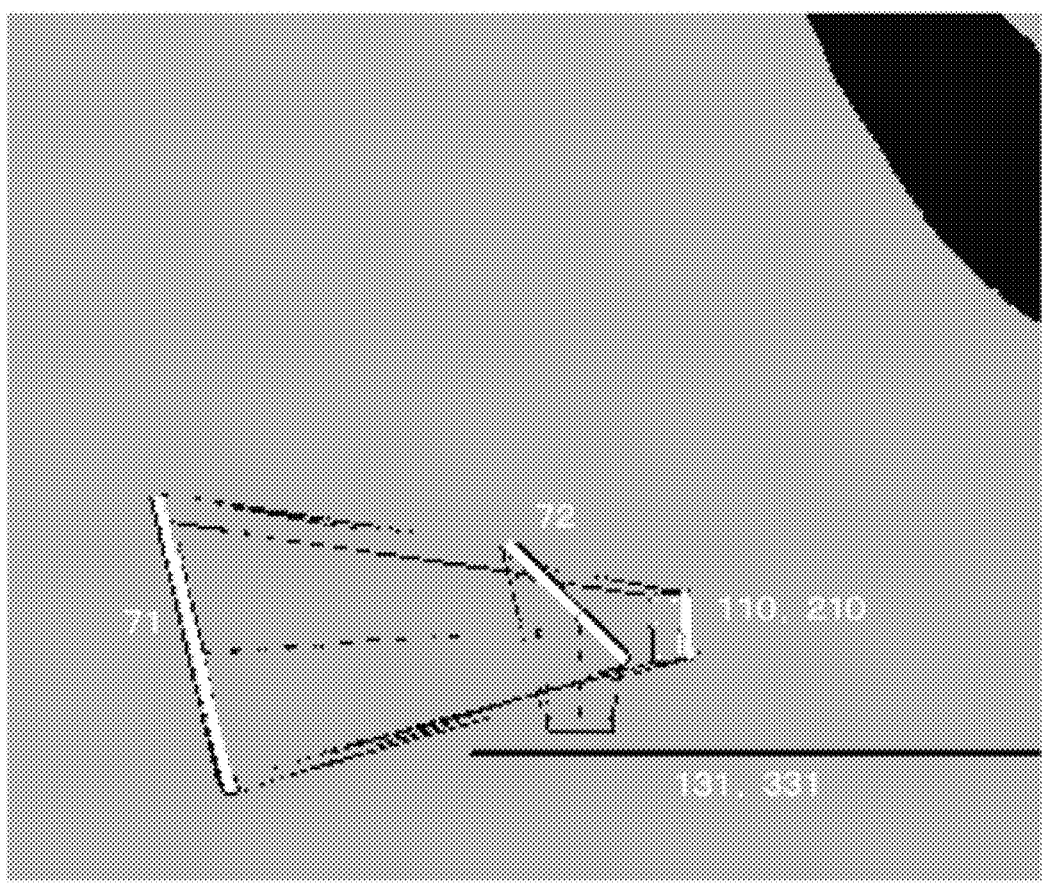
FIG. 17 is a diagram specifically showing the positional relationship among the image generating device, the first reflective mirror, and the second reflective mirror in the image display device of embodiment example 1.
Figure 18:
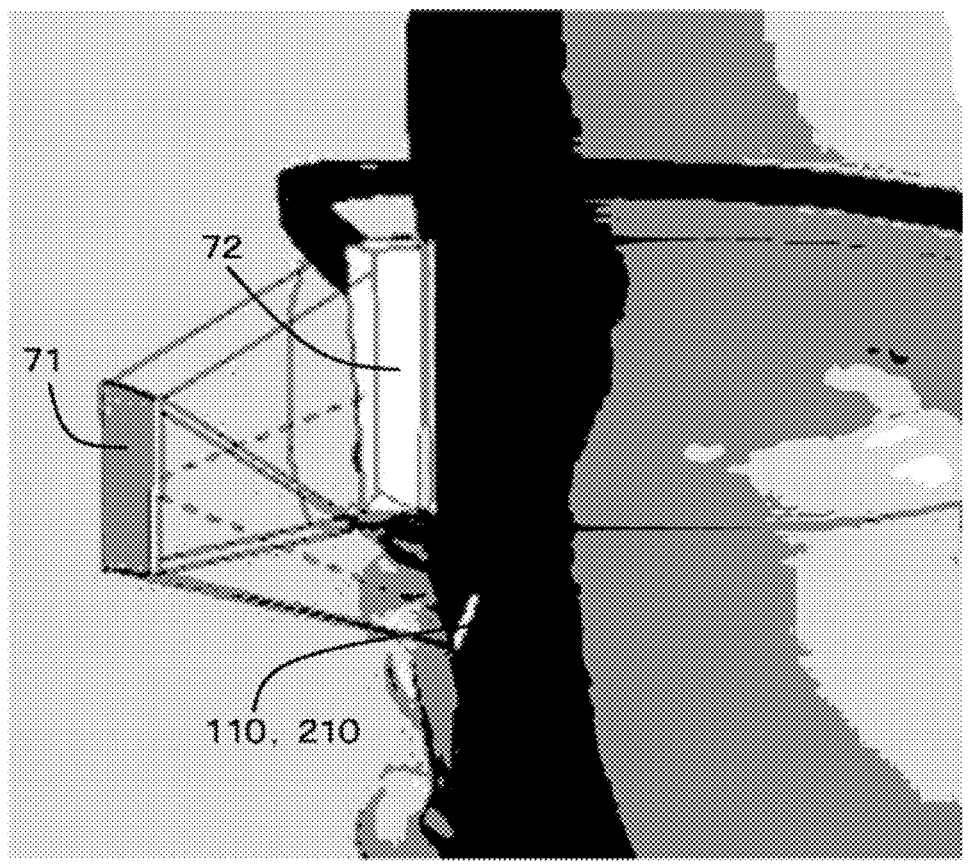
FIG. 18 is a diagram specifically showing the positional relationship among the image generating device, the first reflective mirror, and the second reflective mirror in the image display device of embodiment example 1, and is viewed from an angle different from that of FIG. 17.
Figure 19:
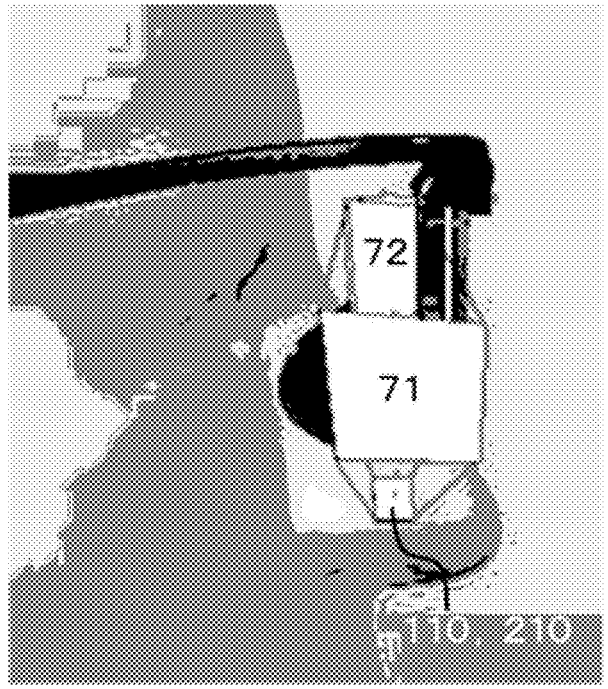
FIG. 19 is a diagram specifically showing the positional relationship among the image generating device, the first reflective mirror, and the second reflective mirror in the image display device of embodiment example 1, and is viewed from an angle different from that of FIG. 17.
Figure 20:
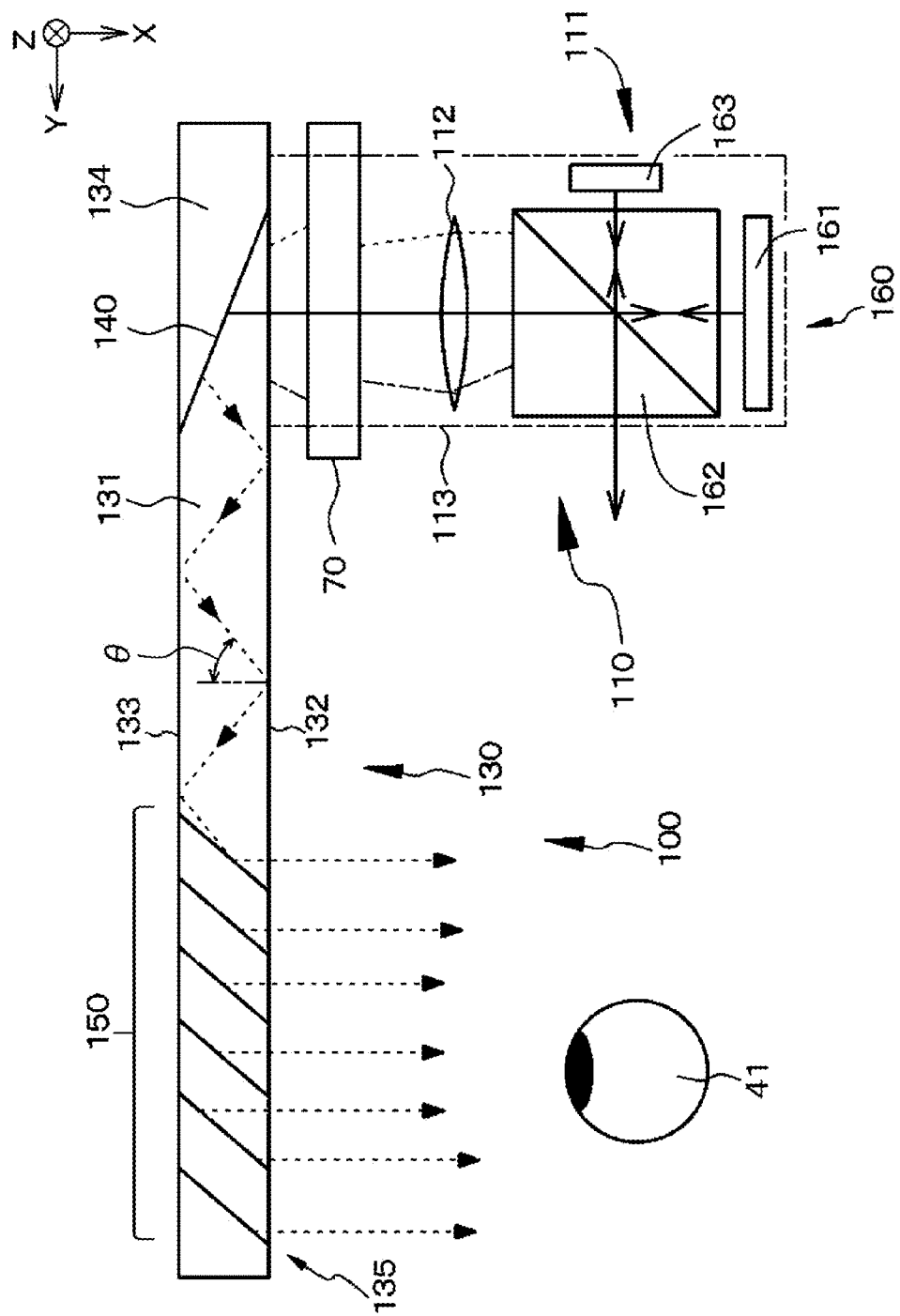
FIG. 20 is a conceptual diagram of the image display device of embodiment example 1.
Figure 21:
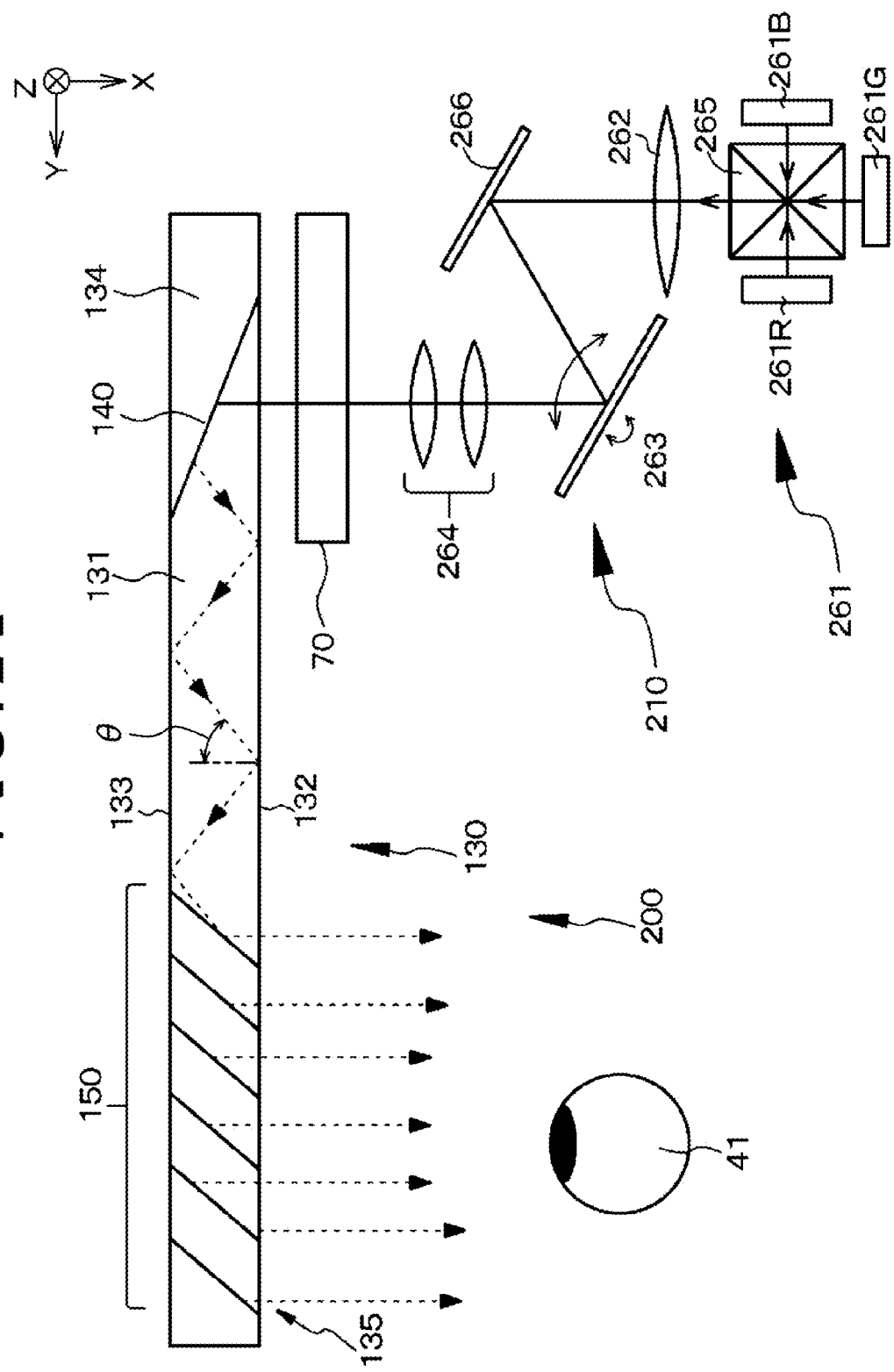
FIG. 21 is a conceptual diagram of an image display device of embodiment example 2.

FIGS. 1A and 1B show a conceptual diagram when the light beam expanding device of embodiment example 1 is viewed from the Y direction and a conceptual diagram when it is viewed from the Z direction, respectively. FIGS. 2A, 2B and 2C show a schematic partial sectional view of a first reflective mirror, a schematic partial plan view of the first reflective mirror, and a schematic partial side view of the first reflective mirror (only the behavior of light is shown), respectively, when the first reflective mirror is cut along a 1A-th virtual plane that is a virtual plane perpendicular to the Z direction. FIGS. 3A, 3B and 3C show a schematic partial sectional view of a second reflective mirror, a schematic partial plan view of the second reflective mirror, and a schematic partial side view of the second reflective mirror (only the behavior of light is shown), respectively, when the second reflective mirror is cut along a 2A-th virtual plane that is a virtual plane perpendicular to the Y direction. FIGS. 4A and 4B show schematic partial sectional views of the first reflective mirror and the second reflective mirror, respectively. FIG. 5, FIG. 6, and FIG. 7 show schematic diagrams when the light beam expanding device of embodiment example 1 is viewed from various directions. FIG. 8 stereoscopically shows the positional relationship among an image forming device or a light source, the first reflective mirror, the second reflective mirror, and a light guide plate in the image display device of embodiment example 1. FIG. 9 shows the behavior of light in the light beam expanding device of embodiment example 1. FIG. 10 schematically shows the positional relationship between the image forming device or the light source and the first reflective mirror in the image display device of embodiment example 1. FIG. 11 schematically shows the positional relationship among the image forming device or the light source, the first reflective mirror, and the second reflective mirror in the image display device of embodiment example 1. FIG. 12 schematically shows the positional relationship among the image forming device or the light source, the first reflective mirror, the second reflective mirror, and the light guide plate in the image display device of embodiment example 1. FIG. 13 conceptually shows the positional relationship among an image generating device, the first reflective mirror, the second reflective mirror, and the light guide plate in a modification example of the image display device of embodiment example 1. FIG. 14 to FIG. 16 specifically show the positional relationship among the image generating device, the first reflective mirror, and the second reflective mirror in the modification example of the image display device of embodiment example 1. FIG. 17 to FIG. 19 specifically show the positional relationship among the image generating device, the first reflective mirror, and the second reflective mirror in the image display device of embodiment example 1.

FIG. 20, FIG. 21, FIG. 22A, and FIG. 23 show conceptual diagrams of the image display devices in embodiment example 1 and embodiment example 2 to embodiment example 4 to be described later.

Image display devices 100, 200, 300, and 400 in embodiment example 1 and embodiment example 2 to embodiment example 4 to be described later are image display devices including (A) an image generating device 110 or 210, and (B) a light guide unit 130 or 330 on which light from the image generating device 110 or 210 is incident, the light guide unit 130 or 330 guiding the light and outputting the light toward a pupil of a viewer. The light guide units 130 and 330 include (B-1) a light guide plate 131 or 331 from which the incident light is output after being propagated inside by total reflection, (B-2) a first deflector 140 or 340 that is disposed in the light guide plate 131 or 331 and deflects the light incident on the light guide plate 131 or 331 in such a manner that the light incident on the light guide plate 131 or 331 is totally reflected inside the light guide plate 131 or 331, and (B-3) a second deflector 150 or 350 that is disposed in the light guide plate 131 or 331 and deflects the light propagated inside the light guide plate 131 or 331 by total reflection a plurality of times in order to output the light propagated inside the light guide plate 131 or 331 by total reflection from the light guide plate 131 or 331. The light guide units 130 and 330 are a see-through type (semi-transmissive type). Furthermore, the image display devices include (C) a light beam expanding device 70 that expands a light beam incident from the image generating device 110 or 210 along the Z direction and outputs the light beam to the light guide unit 130 or 330 when the incident direction of the light incident on the light guide plate 131 or 331 is defined as the X direction and the propagation direction of the light in the light guide plate 131 or 331 is defined as the Y direction.

The light beam expanding device 70 is composed of a first reflective mirror 71 on which the light from the image generating device 110 or 210 is incident and a second reflective mirror 72 on which the light from the first reflective mirror 71 is incident and that outputs the light to the light guide unit 130 or 330.

Furthermore, the optical devices in embodiment example 1 and embodiment example 2 to embodiment example 4 to be described later include the light guide unit 130 or 330. The light guide units 130 and 330 include (b-1) the light guide plate 131 or 331 from which light incident from a light source (in the embodiment examples, specifically the image generating device 110 or 210) is output after being propagated inside by total reflection, (b-2) the first deflector 140 or 340 that is disposed in the light guide plate 131 or 331 and deflects the light incident on the light guide plate 131 or 331 in such a manner that the light incident on the light guide plate 131 or 331 is totally reflected inside the light guide plate 131 or 331, and (b-3) the second deflector 150 or 350 that is disposed in the light guide plate 131 or 331 and deflects the light propagated inside the light guide plate 131 or 331 by total reflection a plurality of times in order to output the light propagated inside the light guide plate 131 or 331 by total reflection from the light guide plate 131 or 331. Moreover, the optical devices include the light beam expanding device 70 that expands a light beam incident from the light source along the Z direction and outputs the light beam to the light guide unit 130 or 330 when the incident direction of the light incident on the light guide plate 131 or 331 is defined as the X direction and the propagation direction of the light in the light guide plate 131 or 331 is defined as the Y direction.

The light beam expanding device 70 is composed of the first reflective mirror 71 on which the light from the light source is incident and the second reflective mirror 72 on which the light from the first reflective mirror 71 is incident and that outputs the light to the light guide unit 130 or 330.

Furthermore, the light beam expanding device 70 of embodiment example 1 is disposed between the light source (in the embodiment example, specifically the image generating device 110) and an irradiated surface (in the embodiment example, specifically the light guide unit 130) and is composed of the first reflective mirror 71 on which the light from the light source is incident and the second reflective mirror 72 on which the light from the first reflective mirror 71 is incident and that outputs the light to the irradiated surface.

In the image display devices 100 and 300 of embodiment example 1 and embodiment example 3 to be described later, the image generating device 110 is an image generating device of a first embodiment and includes (A-1) an image forming device 111 having a plurality of pixels arranged in a two-dimensional matrix manner, and (A-2) a collimating optical system 112 that turns light output from the respective pixels of the image forming device 111 to collimated light.

The light from the collimating optical system 112 is incident on the first reflective mirror 71.

The first deflector 140 and the second deflector 150 are disposed inside the light guide plate 131. The first deflector 140 reflects the light incident on the light guide plate 131 and the second deflector 150 transmits and reflects the light propagated inside the light guide plate 131 by total reflection a plurality of times. That is, the first deflector 140 functions as a reflective mirror and the second deflector 150 functions as a semi-transmissive mirror. Specifically, the first deflector 140 provided inside the light guide plate 131 is composed of aluminum and is formed of a light reflective film (a kind of mirror) that reflects the light incident on the light guide plate 131. The second deflector 150 provided inside the light guide plate 131 is formed of a multilayer-stacked structure body obtained by stacking a large number of dielectric films. The dielectric stacked films are formed of e.g. a $TiO_2$ film as a high dielectric constant material and an $SiO_2$ film as a low dielectric constant material. The multilayer-stacked structure body obtained by stacking a large number of dielectric films is disclosed in JP-T-2005-521099. Although six layers of the dielectric stacked films are shown in the diagram, the configuration is not limited thereto. A thin slice composed of the same material as that of the light guide plate 131 is sandwiched between the dielectric stacked films. By the first deflector 140, the collimated light incident on the light guide plate 131 is so reflected (or diffracted) as to be totally reflected inside the light guide plate 131. By the second deflector 150, the collimated light propagated inside the light guide plate 131 by total reflection is reflected (or diffracted) a plurality of times to be output from the light guide plate 131 in the collimated light state.

The first deflector 140 can be formed as follows. Specifically, an inclined surface on which the first deflector 140 is to be formed is made in the light guide plate 131 by cutting out part 134 of the light guide plate 131 on which the first deflector 140 is provided. Then, a light reflective film is vacuum evaporated on this inclined surface and then the cut-out part 134 of the light guide plate 131 is bonded to the first deflector 140. The second deflector 150 can be formed as follows. Specifically, a multilayer-stacked structure body is fabricated by stacking a larger number of films composed of the same material (e.g. glass) as that of the light guide plate 131 and dielectric films (e.g. they can be deposited by a vacuum evaporation method). Then, part 135 of the light guide plate 131 on which the second deflector 150 is provided is cut out to form an inclined surface. The multilayer-stacked structure body is bonded to this inclined surface and the outer shape is adjusted by performing polishing and so forth. In this manner, the light guide unit 130 in which the first deflector 140 and the second deflector 150 are provided inside the light guide plate 131 can be obtained.

In embodiment example 1 or embodiment example 3 to be described later, the image forming device 111 is composed of a reflective spatial light modulating device 160 and a light source 163 formed of a light emitting diode that outputs white light. Specifically, the reflective spatial light modulating device 160 is composed of a liquid crystal display device (LCD) 161 formed of an LCOS as a light valve and a polarization beam splitter 162 that reflects part of light from the light source 163 to guide the reflected light to the liquid crystal display device 161 and allows the passage of part of light reflected by the liquid crystal display device 161 to guide the passing light to the collimating optical system 112. The liquid crystal display device 161 has plural (e.g. 320×240) pixels (liquid crystal cells) arranged in a two-dimensional matrix manner. The polarization beam splitter 162 has known configuration and structure. Non-polarized light output from the light source 163 collides with the polarization beam splitter 162. The P-polarized component passes through the polarization beam splitter 162 to be output to the outside of the system. The S-polarized component is reflected in the polarization beam splitter 162 and is incident on the liquid crystal display device 161 to be reflected inside the liquid crystal display device 161 and be output from the liquid crystal display device 161. Of the light output from the liquid crystal display device 161, light output from the pixel that displays "white" contains a large amount of P-polarized component and light output from the pixel that displays "black" contains a large amount of S-polarized component. Therefore, of the light that is output from the liquid crystal display device 161 and collides with the polarization beam splitter 162, the P-polarized component passes through the polarization beam splitter 162 to be guided to the collimating optical system 112. In contrast, the S-polarized component is reflected in the polarization beam splitter 162 to be returned to the light source 163. The liquid crystal display device 161 has e.g. plural (e.g. 320×240) pixels (the number of liquid crystal cells is three times the number of pixels) arranged in a two-dimensional matrix manner. The collimating optical system 112 is formed of e.g. a convex lens and the image forming device 111 (more specifically, the liquid crystal display device 161) is disposed at the place (position) corresponding to the focal length of the collimating optical system 112 in order to generate collimated light. One pixel is composed of a red light emitting sub-pixel that outputs red, a green light emitting sub-pixel that outputs green, and a blue light emitting sub-pixel that outputs blue.

In embodiment example 1 and embodiment example 2 to embodiment example 4 to be described later, the light guide plates 131 and 331 composed of optical glass or a plastic material have two parallel surfaces (first surface 132 or 332 and second surface 133 or 333) extending in parallel to the direction of light propagation (Y direction) by internal total reflection in the light guide plates 131 and 331. The first surfaces 132 and 332 are opposed to the second surfaces 133 and 333. Collimated light is incident from the first surface 132 or 332 equivalent to the light incidence surface. The collimated light is propagated inside by total reflection and then output from the first surface 132 or 332 equivalent to the light exit surface. However, the configuration is not limited thereto. The light incidence surface may be configured by the second surface 133 or 333 and the light exit surface may be configured by the first surface 132 or 332.

In the light beam expanding device 70, the light reflective surface of the first reflective mirror 71 is composed of 1A-th inclined surfaces 71A and 1B-th inclined surfaces 71B that are juxtaposed alternately and continuously and has a saw-tooth shape as the sectional shape, the light reflective surface of the second reflective mirror 72 is composed of 2A-th inclined surfaces 72A and 2B-th inclined surfaces 72B that are juxtaposed alternately and continuously and has a saw-tooth shape as the sectional shape, the top side and the bottom side of the 1A-th inclined surface 71A are parallel to each other and extend along the Z direction, the angle ($\theta_1$) formed by the bottom part of the 1A-th inclined surface 71A and the bottom part of the 1B-th inclined surface 71B is 90 degrees, the top side and the bottom side of the 2A-th inclined surface 72A are parallel to each other and extend along the Y direction, and the angle ($\theta_2$) formed by the bottom part of the 2A-th inclined surface 72A and the bottom part of the 2 B-th inclined surface 72B is 90 degrees. In a pair of the 1A-th inclined surface 71A and the 1B-th inclined surface 71B, the top side of the 1A-th inclined surface 71A and the top side of the 1B-th inclined surface 71B occupy the same top side and the bottom side of the 1A-th inclined surface 71A and the bottom side of the 1B-th inclined surface 71B occupy the same bottom side. Similarly, in a pair of the 2A-th inclined surface 72A and the 2B-th inclined surface 72B, the top side of the 2A-th inclined surface 72A and the top side of the 2B-th inclined surface 72B occupy the same top side and the bottom side of the 2A-th inclined surface 72A and the bottom side of the 2B-th inclined surface 72B occupy the same bottom side.

FIGS. 4A and 4B show schematic partial sectional views of the first reflective mirror 71 and the second reflective mirror 72. The schematic partial sectional view of the first reflective mirror 71 shown in FIG. 4A is one when the first reflective mirror 71 is cut along the 1A-th virtual plane. The schematic partial sectional view of the second reflective mirror 72 shown in FIG. 4B is one when the second reflective mirror 72 is cut along the 2A-th virtual plane. For the light reflective surfaces of the first reflective mirror 71 and the second reflective mirror 72, light reflective layers 71E and 72E composed of a light reflective material such as aluminum are provided. In embodiment example 1, the explanation will be made based on the assumption that the normal to the first reflective mirror 71 and the second reflective mirror 72 is parallel to the X axis. However, the configuration is not limited thereto. In embodiment example 1, the angle ($\theta_1'$) formed by a top part 71C of the 1A-th inclined surface 71A and the top part 71C of the 1B-th inclined surface 71B is set to 90 degrees. Furthermore, the angle ($\theta_2'$) formed by a top part 72C of the 2A-th inclined surface 72A and the top part 72C of the 2B-th inclined surface 72B is also set to 90 degrees. The shape of a virtual triangle 71F formed by the top side of the above-described 1A-th inclined surface-A, the top side of the 1A-th inclined surface-B adjacent to this 1A-th inclined surface-A, and a bottom side 71D of the 1A-th inclined surface-A is an isosceles right triangle (first virtual right triangle) in which the lengths of adjacent sides are equal to each other. The shape of a virtual triangle 72F formed by the top side of the 2A-th inclined surface-A, the top side of the 2A-th inclined surface-B adjacent to this 2A-th inclined surface-A, and a bottom side 72D of the 2A-th inclined surface-A is an isosceles right triangle (second virtual right triangle) in which the lengths of adjacent sides are equal to each other. That is, in the first reflective mirror 71, the first virtual right triangles having the same shape are lined along the Y direction. Similarly, in the second reflective mirror 72, the second virtual right triangles having the same shape are lined along the Z direction.

Light incident on the first reflective mirror 71 collides with the 1A-th inclined surface 71A to be reflected by the 1A-th inclined surface 71A. Then, the reflected light collides with the 1B-th inclined surface 71B opposed to this 1A-th inclined surface 71A to be reflected by the 1B-th inclined surface 71B and be output from the first reflective mirror 71. Alternatively, light incident on the first reflective mirror 71 collides with the 1B-th inclined surface 71B to be reflected by the 1B-th inclined surface 71B. Then, the reflected light collides with the 1A-th inclined surface 71A opposed to this 1B-th inclined surface 71B to be reflected by the 1A-th inclined surface 71A and be output from the first reflective mirror 71. Similarly, light incident on the second reflective mirror 72 collides with the 2A-th inclined surface 72A to be reflected by the 2A-th inclined surface 72A. Then, the reflected light collides with the 2B-th inclined surface 72B opposed to this 2A-th inclined surface 72A to be reflected by the 2B-th inclined surface 72B and be output from the second reflective mirror 72. Alternatively, light incident on the second reflective mirror 72 collides with the 2B-th inclined surface 72B to be reflected by the 2B-th inclined surface 72B. Then, the reflected light collides with the 2A-th inclined surface 72A opposed to this 2B-th inclined surface 72B to be reflected by the 2A-th inclined surface 72A and be output from the second reflective mirror 72.

The behavior of light that is output from the image forming device to reach the light guide plate via the first reflective mirror and the second reflective mirror will be described below with reference to FIGS. 1A and 1B, FIGS. 2A, 2B and 2C, FIGS. 3A, 3B and 3C, FIG. 5, FIG. 6, FIG. 7, FIG. 8, FIG. 9, FIG. 10, FIG. 11, and FIG. 12.

In the configuration and structure shown in FIGS. 1A and 1B, part of light output from the image forming device 111 or a light source 261 (to be described later) passes through a half mirror 73 (see FIG. 1B) shown by a one-dot chain line to be incident on the first reflective mirror 71 and output from the first reflective mirror 71. Part of the output light is reflected by the half mirror 73 to be incident on a half mirror 74 (see FIG. 1B) shown by a one-dot chain line. Part of the incident light is reflected by the half mirror 74 to be incident on the second reflective mirror 72 and be output from the second reflective mirror 72. Part of the output light passes through the half mirror 74 to be incident on the light guide plate 131 or 331. In FIG. 1A, the half mirror 73 is disposed at the place shown by "A" and the half mirror 74 is disposed at the place shown by "B."

On the other hand, in the configurations and structures shown in FIG. 5 to FIG. 19, the half mirror is not used. Instead, the image forming device 111 or the light source 261, the first reflective mirror 71, the second reflective mirror 72, and the light guide plate 131 or 331 are properly disposed in the space. Thereby, the light that is output from the image forming device 111 or the light source 261 and is incident on the light guide plate 131 or 331 via the first reflective mirror 71 and the second reflective mirror 72 is prevented from being blocked by the image forming device 111 or the light source 261 and the second reflective mirror 72.

Furthermore, in the light beam expanding device 70 of embodiment example 1, when being projected onto the 1A-th virtual plane (in FIG. 2A, the plane parallel to the plane of paper of the diagram), the trajectory of light incident on the first reflective mirror 71 from the image generating device 110 or 210 (or light source) (in FIG. 2A, shown by A and B) and the trajectory of light output from the first reflective mirror 71 (in FIG. 2A, shown by C and D) are parallel to each other (see FIG. 1B and FIG. 2A). Meanwhile, when being projected onto the 1B-th virtual plane (in FIG. 2B, the plane parallel to the plane of paper of the diagram) including the axis line parallel to the Y direction and the axis line parallel to the Z direction, the trajectory of the light incident on the first reflective mirror 71 from the image generating device 110 or 210 (or light source) (in FIG. 2B, shown by A and B) and the trajectory of the light output from the first reflective mirror 71 (in FIG. 2B, shown by C and D) are symmetric with each other about the 1A-th virtual plane. In FIG. 2C, a schematic partial side view of the first reflective mirror 71 is shown. In this diagram, the top part 71C and the bottom side 71D of the first reflective mirror 71 are shown. In addition, the inclined surfaces of the first reflective mirror 71 are shown as transparent ones and only the behavior of the light is shown.

Moreover, when being projected onto the 2A-th virtual plane (in FIG. 3A, the plane parallel to the plane of paper of the diagram), the trajectory of light incident on the second reflective mirror 72 from the first reflective mirror 71 (in FIG. 3A, shown by E and F) and the trajectory of light output from the second reflective mirror 72 (in FIG. 3A, shown by G and H) are parallel to each other (see FIG. 1A and FIG. 3A). Meanwhile, when being projected onto the 2B-th virtual plane (in FIG. 3B, the plane parallel to the plane of paper of the diagram), the trajectory of the light incident on the second reflective mirror 72 from the first reflective mirror 71 (in FIG. 3B, shown by E and F) and the trajectory of the light output from the second reflective mirror 72 (in FIG. 3B, shown by G and H) are symmetric with each other about the 2A-th virtual plane. In FIG. 3C, a schematic partial side view of the second reflective mirror 72 is shown. In this diagram, the top part 72C and the bottom side 72D of the second reflective mirror 72 are shown. In addition, the inclined surfaces of the second reflective mirror 72 are shown as transparent ones and only the behavior of the light is shown.

The optical path length of the light that is output from the center of the image generating device 110 or 210 (or light source) and is incident on the first reflective mirror 71 is equal to the optical path length of the light that is the light originally output from the center of the image generating device 110 or 210 (or light source) and is output from the first reflective mirror 71 and is incident on the second reflective mirror 72 to be output from the second reflective mirror 72 and be incident on the light guide unit (or irradiated surface). Furthermore, a size $Y_0$, along the Y direction, of the light beam output from the image generating device 110 or 210 (or light source) is equal to the size, along the Y direction, of the light beam incident on the light guide unit 130 or 330 (or irradiated surface) (see FIG. 1B). On the other hand, a size $Z_1$, along the Z direction, of the light beam incident on the light guide unit 130 or 330 (or irradiated surface) is larger than a size $Z0$, along the Z direction, of the light beam output from the image generating device 110 or 210 (or light source) (see FIG. 1A). Moreover, the size, along the Z-direction, of the light beam output from the light guide unit 130 or 330 is equal to the size $Z_0$, along the Z direction, of the light beam output from the image generating device 110 or 210 (or light source). To achieve such a configuration, the image forming device 111 or the light source 261, the first reflective mirror 71, the second reflective mirror 72, and the light guide plate 131 or 331 are properly disposed in the space and the configuration and structure of them are optimized.

Embodiment example 1 includes the light beam expanding device 70 that makes a light beam (light flux) be incident on the light guide unit 130 or 330 in the state in which the light beam is expanded along the Z direction whereas it is not expanded along the Y direction. The light beam expanding device 70 functions as a kind of a beam expander. Therefore, the need to set a large diameter as the diameter of the aperture stop in the Z direction in the image generating device 110 or 210 is eliminated and the diameter of the lens that should be included in the image generating device 110 or 210 does not need to be set large. That is, the diameter of the lens included in the collimating optical system 112 provided for the image generating device 111 does not need to be set large and reduction in the size and weight of the image display device can be achieved. In addition, the occurrence of a problem that the display contrast is lowered and the image quality deteriorates is also absent.

FIG. 13 conceptually shows the positional relationship among the image generating device 110 or 210, the first reflective mirror 71, the second reflective mirror 72, and the light guide plate 131 or 331 in a modification example of the image display device of embodiment example 1. FIG. 14 to FIG. 16 specifically show the positional relationship among the image generating device 110 or 210, the first reflective mirror 71, and the second reflective mirror 72 in the modification example of the image display device of embodiment example 1. FIG. 17 to FIG. 19 specifically show the positional relationship among the image generating device 110 or 210, the first reflective mirror 71, and the second reflective mirror 72 in the image display device of embodiment example 1. FIG. 14 and FIG. 17 are transparent views showing the positional relationship among the image generating device 110 or 210, the first reflective mirror 71, and the second reflective mirror 72. FIG. 15 and FIG. 18 are diagrams when the image display device is viewed from the front and FIG. 16 and FIG. 19 are diagrams when the image display device is viewed from the side.

In the modification example shown in FIG. 13 and FIG. 14 to FIG. 16, at least one planar reflective member (in embodiment example 1, two planar reflective members 75 and 76) is provided between the image generating device 110 or 210 and the first reflective mirror 71 or between the light source and the first reflective mirror 71. In addition, at least one planar reflective member (in embodiment example 1, one planar reflective member 76) is provided between the first reflective mirror 71 and the second reflective mirror 72. Furthermore, one planar reflective member 76 provided between the image generating device 110 or 210 and the first reflective mirror 71 or between the light source and the first reflective mirror 71 serves also as one planar reflective member 76 provided between the first reflective mirror 71 and the second reflective mirror 72. By employing such a form, the optical path from the image generating device 110 or 210 to the first reflective mirror 71 or the optical path from the light source to the first reflective mirror 71 is set to a kind of folded state. As a result, it becomes possible to equalize the optical path length of the light that is output from the center of the image generating device 110 or 210 (or light source) and is incident on the first reflective mirror 71 ($L_1+L_2+L_3$ in FIG. 13) to the optical path length of the light that is the light originally output from the center of the image generating device 110 or 210 (or light source) and is output from the first reflective mirror 71 and is incident on the second reflective mirror 72 to be output from the second reflective mirror 72 and be incident on the light guide unit (or irradiated surface) ($L_4+L_5+L_6$ in FIG. 13) with compact configuration and structure. That is, compactification of the light beam expanding device, the optical device, and the image display device can be achieved.

[Embodiment Example 2]

Embodiment example 2 is a modification of embodiment example 1 and relates to the image generating device 210 of a second embodiment. As shown in conceptual diagrams of FIG. 21 and FIG. 23, the image display devices 200 and 400 of embodiment example 2 and embodiment example 4 to be described later include (A-1) the light source 261, (A-2) a collimating optical system 262 that turns light output from the light source 261 to collimated light, (A-3) a scanning unit 263 that scans the collimated light output from the collimating optical system 262, and (A-4) a relay optical system 264 that relays the collimated light scanned by the scanning unit 263, and the light from the relay optical system 264 is incident on the first reflective mirror 71.

The light guide unit 130 has the same configuration and structure as those of the light guide unit 130 explained in embodiment example 1 and therefore detailed description thereof is omitted.

The light source 261 is composed of a red light emitting element 261R that emits red light, a green light emitting element 261G that emits green light, and a blue light emitting element 261B that emits blue light. Each light emitting element is formed of a semiconductor laser element. The light of three primary colors output from the light source 261 passes through a cross prism 265. Thereby, color synthesis is performed and the optical paths are integrated to one path. The resulting light is incident on the collimating optical system 262 having positive optical power as a whole to be output as collimated light. Then, this collimated light is reflected by a total reflection mirror 266 and is subjected to horizontal scanning and vertical scanning by the scanning unit 263 formed of MEMS that allow a micro-mirror to be freely rotated in the two-dimensional directions and can two-dimensionally scan the incident collimated light. Thereby, the light is turned to a kind of two-dimensional image and virtual pixels are generated. Then, the light from the virtual pixels passes through the relay optical system 264 formed of a known relay optical system and light flux turned to collimated light is incident on the light guide unit 130 via the light beam expanding device 70.

[Embodiment Example 3]

Embodiment example 3 is also a modification of embodiment example 1. As shown in a conceptual diagram of FIG. 22A, the image forming device 111, the collimating optical system 112, and the light beam expanding device 70 in the image display device 300 of embodiment example 3 have the same configuration and structure as those of the image forming device 111, the collimating optical system 112, and the light beam expanding device 70 explained in embodiment example 1. Furthermore, except for that the configuration and structure of the first deflector and the second deflector are different, the light guide unit 330 also has the same basic configuration and structure as those of the light guide unit 130 of embodiment example 1. Specifically, the light guide unit 330 is the same as the light guide unit 130 in that it includes (C-1) the light guide plate 331 from which the incident light is output after being propagated inside by total reflection, (C-2) the first deflector that is disposed on the light guide plate 331 and deflects the light incident on the light guide plate 331 in such a manner that the light incident on the light guide plate 331 is totally reflected inside the light guide plate 331, and (C-3) the second deflector that is disposed on the light guide plate 331 and deflects the light propagated inside the light guide plate 331 by total reflection a plurality of times in order to output the light propagated inside the light guide plate 331 by total reflection from the light guide plate 331.

In embodiment example 3, the first deflector and the second deflector are disposed on a surface of the light guide plate 331 (specifically, the second surface 333 of the light guide plate 331). The first deflector diffracts the light incident on the light guide plate 331 and the second deflector diffracts the light propagated inside the light guide plate 331 by total reflection a plurality of times. The first deflector and the second deflector are formed of diffraction grating elements, specifically reflective diffraction grating elements, more specifically reflective volume hologram diffraction gratings. In the following description, the first deflector formed of a reflective volume hologram diffraction grating will be referred to as the "first diffraction grating member 340" for convenience and the second deflector formed of a reflective volume hologram diffraction grating will be referred to as the "second diffraction grating member 350" for convenience.

Figure 22:
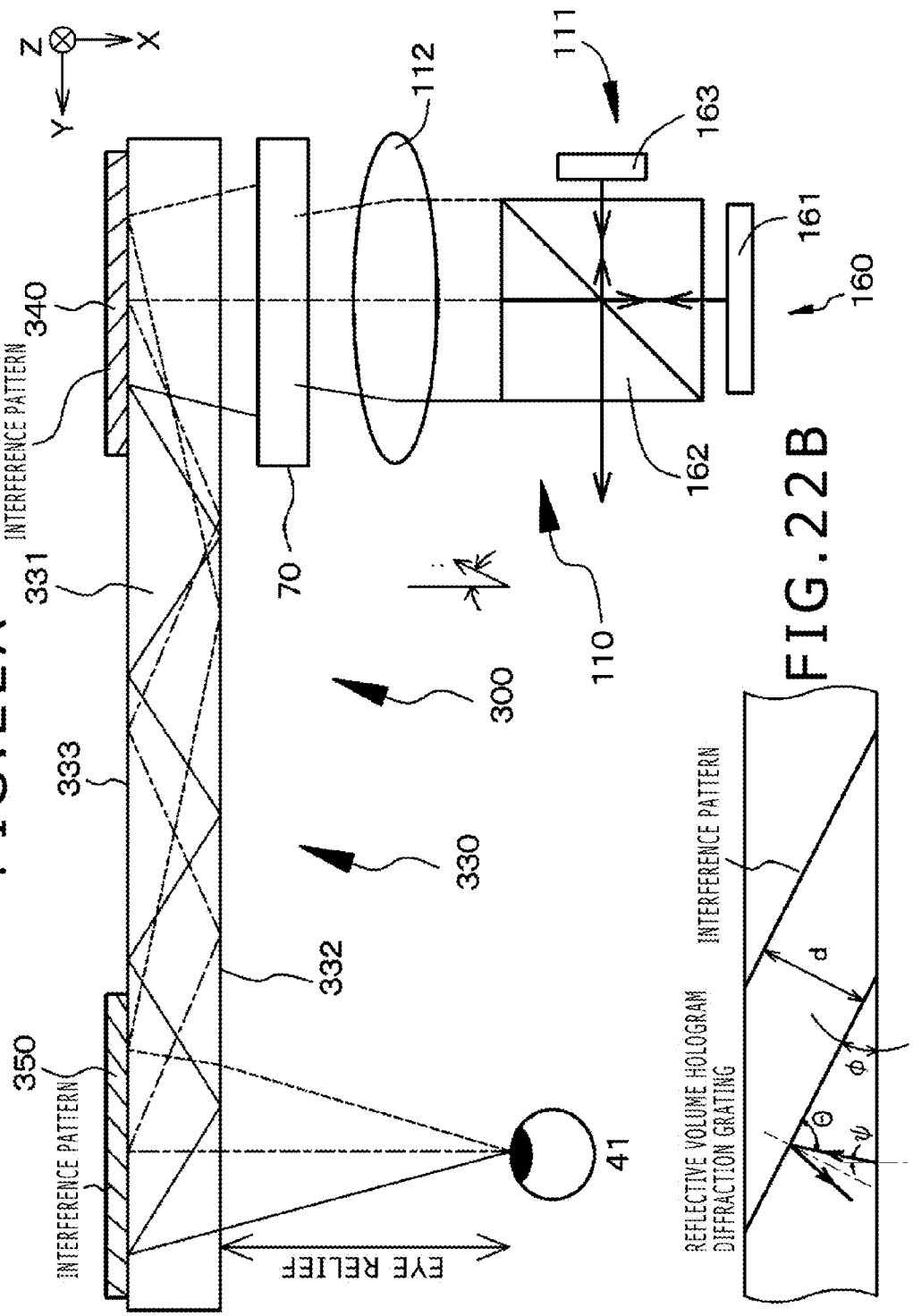
FIG. 22A is a conceptual diagram of an image display device of embodiment example 3 and FIG. 22B is a schematic sectional view showing part of a reflective volume hologram diffraction grating in an enlarged manner.
Figure 23:
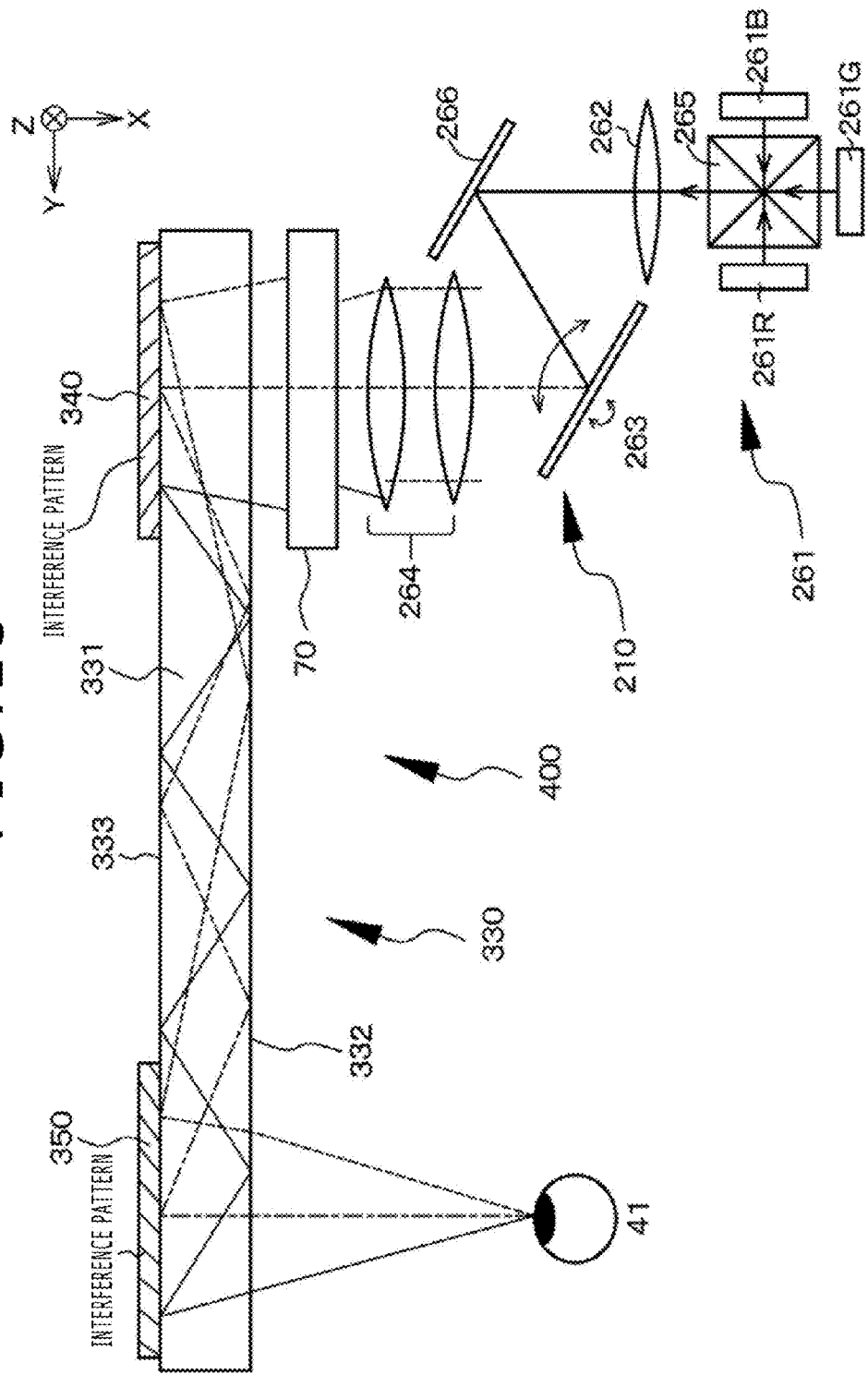
FIG. 23 is a conceptual diagram of an image display device of embodiment example 4.

In embodiment example 3 and embodiment example 4 to be described later, in order to cover diffraction reflection of P kinds of light having different P kinds (specifically, P=3, three kinds of red, green, and blue) of wavelength bands (or wavelengths), the first diffraction grating member 340 and the second diffraction grating member 350 have a configuration obtained by stacking P diffraction grating layers formed of reflective volume hologram diffraction gratings. In each diffraction grating layer composed of a photopolymer material, an interference pattern corresponding to one kind of wavelength band (or wavelength) is formed and it is fabricated by an existing method. Specifically, the first diffraction grating member 340 and the second diffraction grating member 350 have a structure obtained by stacking a diffraction grating layer that makes diffraction reflection of red light, a diffraction grating layer that makes diffraction reflection of green light, and a diffraction grating layer that makes diffraction reflection of blue light. The pitch of the interference pattern formed in the diffraction grating layer (diffraction grating element) is constant. The interference pattern is in a linear manner and is parallel to the Z direction. In FIG. 22A and FIG. 23, the first diffraction grating member 340 and the second diffraction grating member 350 are shown as one layer. Employing such a configuration allows increase in the diffraction efficiency, increase in the diffraction acceptance angle, and optimization of the diffraction angle when light having the respective wavelength bands (or wavelengths) is subjected to diffraction reflection by the first diffraction grating member 340 and the second diffraction grating member 350.

FIG. 22B shows an enlarged schematic partial sectional view of the reflective volume hologram diffraction grating.

An interference pattern having an inclination angle φ is formed in the reflective volume hologram diffraction grating. The inclination angle φ refers to the angle formed by the surface of the reflective volume hologram diffraction grating and the interference pattern. The interference pattern is formed from the inside to the surface of the reflective volume hologram diffraction grating. The interference pattern satisfies the Bragg condition. The Bragg condition refers to the condition satisfying the following expression (A). In expression (A), m denotes a positive integer and λ denotes the wavelength. In addition, d denotes the pitch of the grating plane (interval of the virtual plane including the interference pattern in the normal direction) and Θ denotes the complementary angle of the angle of the incidence on the interference pattern. Furthermore, the relationship among Θ, the inclination angle φ, and the incidence angle ψ when light enters the diffraction grating member at the incidence angle ψ is as shown in expression (B).

$$m \cdot \lambda = 2 \cdot d \cdot \sin \Theta \quad (A)$$

$$\Theta = 90° - (\phi + \psi) \quad (B)$$

The first diffraction grating member 340 is provided on (bonded to) the second surface 333 of the light guide plate 331 as described above and makes diffraction reflection of collimated light incident on the light guide plate 331 through the first surface 332 in such a manner that this collimated light incident on the light guide plate 331 is totally reflected inside the light guide plate 331. Furthermore, the second diffraction grating member 350 is provided on (bonded to) the second surface 333 of the light guide plate 331 as described above and makes diffraction reflection of this collimated light propagated inside the light guide plate 331 by total reflection plural times to output the collimated light as it is from the light guide plate 331 through the first surface 332. However, the configuration is not limited thereto. The light guide plate incidence surface may be configured by the second surface 333 and the light guide plate exit surface may be configured by the first surface 332.

Also in the light guide plate 331, collimated light of three colors of red, green, and blue is propagated inside by total reflection and then is output. At this time, the number of times of total reflection until the light reaches the second diffraction grating member 350 differs depending on the angle of view (horizontal angle of view) because the light guide plate 331 is thin and the optical path along which the light travels inside the light guide plate 331 is long. More specifically, of collimated light incident on the light guide plate 331, collimated light incident at an angle (horizontal angle of view) corresponding to such a direction as to get closer to the second diffraction grating member 350 has a smaller number of times of total reflection than collimated light incident on the light guide plate 331 at a horizontal angle of view corresponding to such a direction as to get away from the second diffraction grating member 350. This is because the angle formed by light propagating inside the light guide plate 331 and the normal to the light guide plate 331 when the light collides with the internal surface of the light guide plate 331 is larger in the collimated light that is the collimated light subjected to diffraction reflection by the first diffraction grating member 340 and is incident on the light guide plate 331 at a horizontal angle of view corresponding to such a direction as to get closer to the second diffraction grating member 350 than in the collimated light incident on the light guide plate 331 at the horizontal angle of view corresponding to the direction opposite thereto. The shape of the interference pattern formed inside the second diffraction grating member 350 and the shape of the interference pattern formed inside the first diffraction grating member 340 are in a symmetric relationship about the XZ plane of the light guide plate 331.

Basically, the light guide plate 331 in embodiment example 4 to be described next also has the same configuration and structure as those of the light guide plate 331 described above.

In embodiment example 3, when the direction of light propagation by internal total reflection in the light guide plate 331 is defined as the Y direction and the thickness direction of the light guide plate 331 is defined as the X direction, the direction along which the interference pattern is arranged in the first diffraction grating member 340 and the second diffraction grating member 350, i.e. the diffraction direction, is the Y direction.

Unless the surface of the reflective volume hologram diffraction grating is sufficiently smooth and flat, possibly light is scattered and the lowering of the contrast and the deterioration of the resolution occur. In view of prevention of the occurrence of such problems and protection of the reflective volume hologram diffraction grating, it is also possible for the light guide unit 330 to have a structure obtained by stacking the light guide plate 331, the reflective volume hologram diffraction gratings 340 and 350, and a transparent parallel flat plate from the light incidence side.

Suppose that, in embodiment example 3, the distance between the centers of the first deflector (first diffraction grating member 340) and the second deflector (second diffraction grating member 350) is 30 mm, the wavelength of incident light is 522 nm, and the diffraction angle (total reflection angle in the light guide plate 331) of light incident on the light guide plate 331 at 0 degrees is 59 degrees. Furthermore, suppose that the thickness of the light guide plate 331 is 1.5 mm, the refractive index is 1.52, and the eye relief is 15 mm. At this time, the distance from the point of incidence, on the light guide plate 331, of light that collides with the center of the first diffraction grating member 340 (hereinafter, referred to simply as the "light incidence point") to the pupil of the viewer is 40 mm in the air-equivalent length. Furthermore, it is when the horizontal angle of view is negative that the distance from the light incidence point to the pupil 41 of the viewer is the longest. If it is assumed that the horizontal angle of view is ±11 degrees and the vertical angle of view is ±8.3 degrees, the air-equivalent length of the distance from the light incidence point of a light beam whose horizontal angle of view is −11 degrees to the pupil 41 of the viewer is 48 mm. An aperture stop (clear aperture) whose vertical angle of view is ±8.3 degrees at this distance of 48 mm should be ensured. Therefore, the desired bore of the projection optical system along the vertical direction is 17 mm when it is assumed that the pupil diameter of the viewer is 3 mm. This bore is equivalent to the length of the light output area along the Z direction in the light guide plate 331. In this case, the length of the light reflection area along the Z direction in the second reflective mirror 72 is $\{17+2\times L_6 \times \tan(8.3°)\}$ mm.

[Embodiment Example 4]

Embodiment example 4 is a modification of embodiment example 3. FIG. 23 shows a conceptual diagram of the image display device of embodiment example 4. The light source 261, the collimating optical system 262, the scanning unit 263, the relay optical system 264, and so forth in the image display device of embodiment example 4 have the same configuration and structure as those in embodiment example 2. Furthermore, the light guide unit 330 in embodiment example 4 has the same configuration and structure as those of the light guide unit 330 in embodiment example 3.

[Embodiment Example 5]

Figure 24:
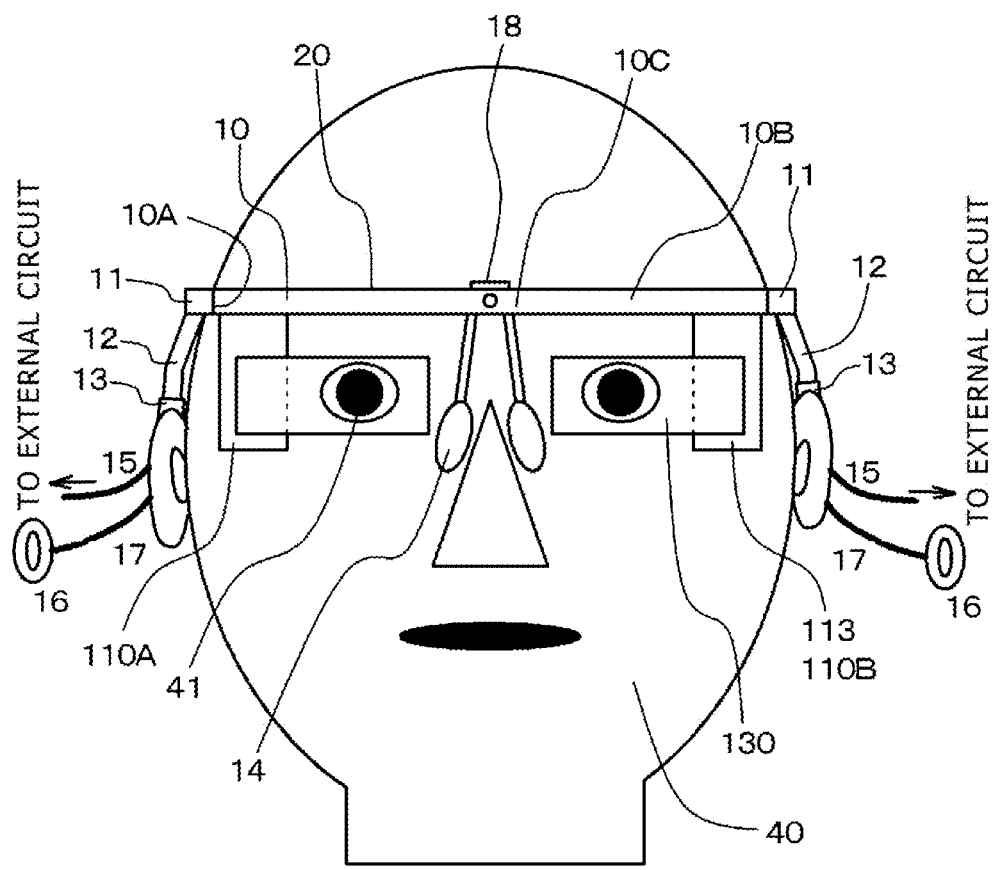
FIG. 24 is a schematic diagram when a head mounted display of embodiment example 5 is viewed from the front.
Figure 25:
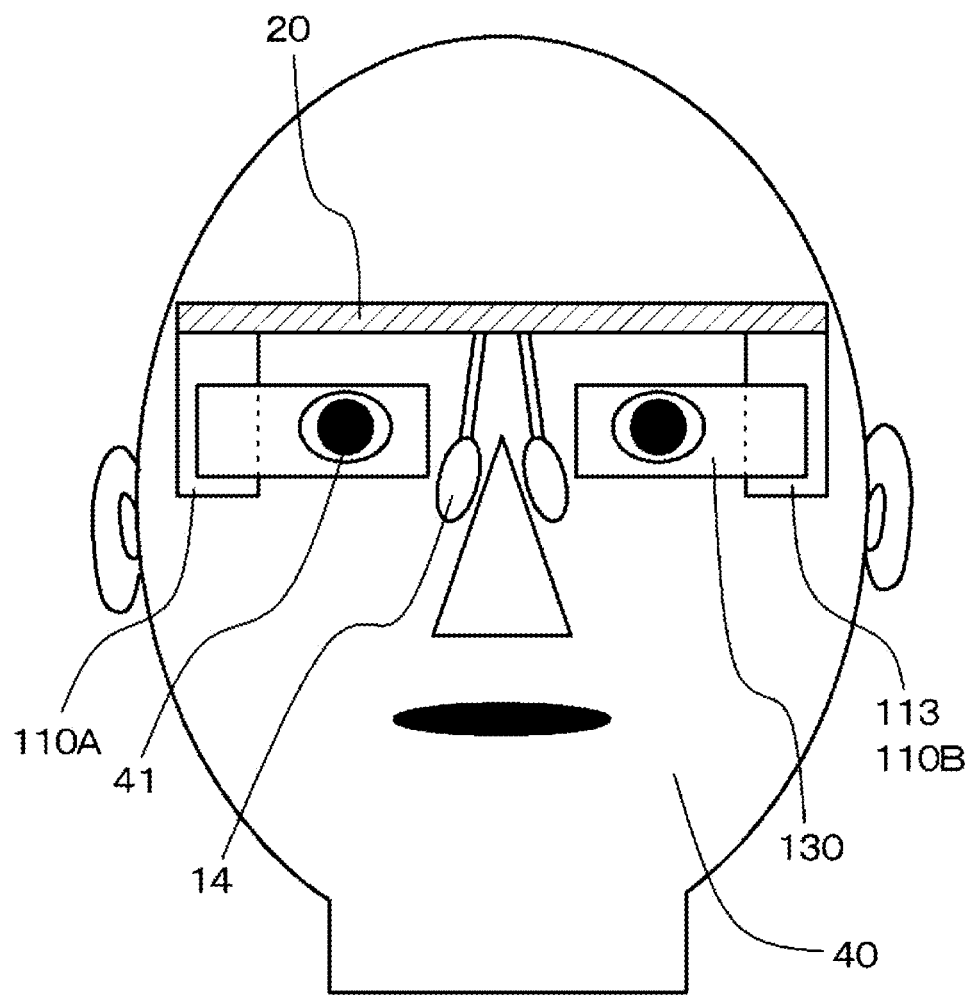
FIG. 25 is a schematic diagram when the head mounted display of embodiment example 5 (in a state when it is assumed that a frame is removed) is viewed from the front.
Figure 26:
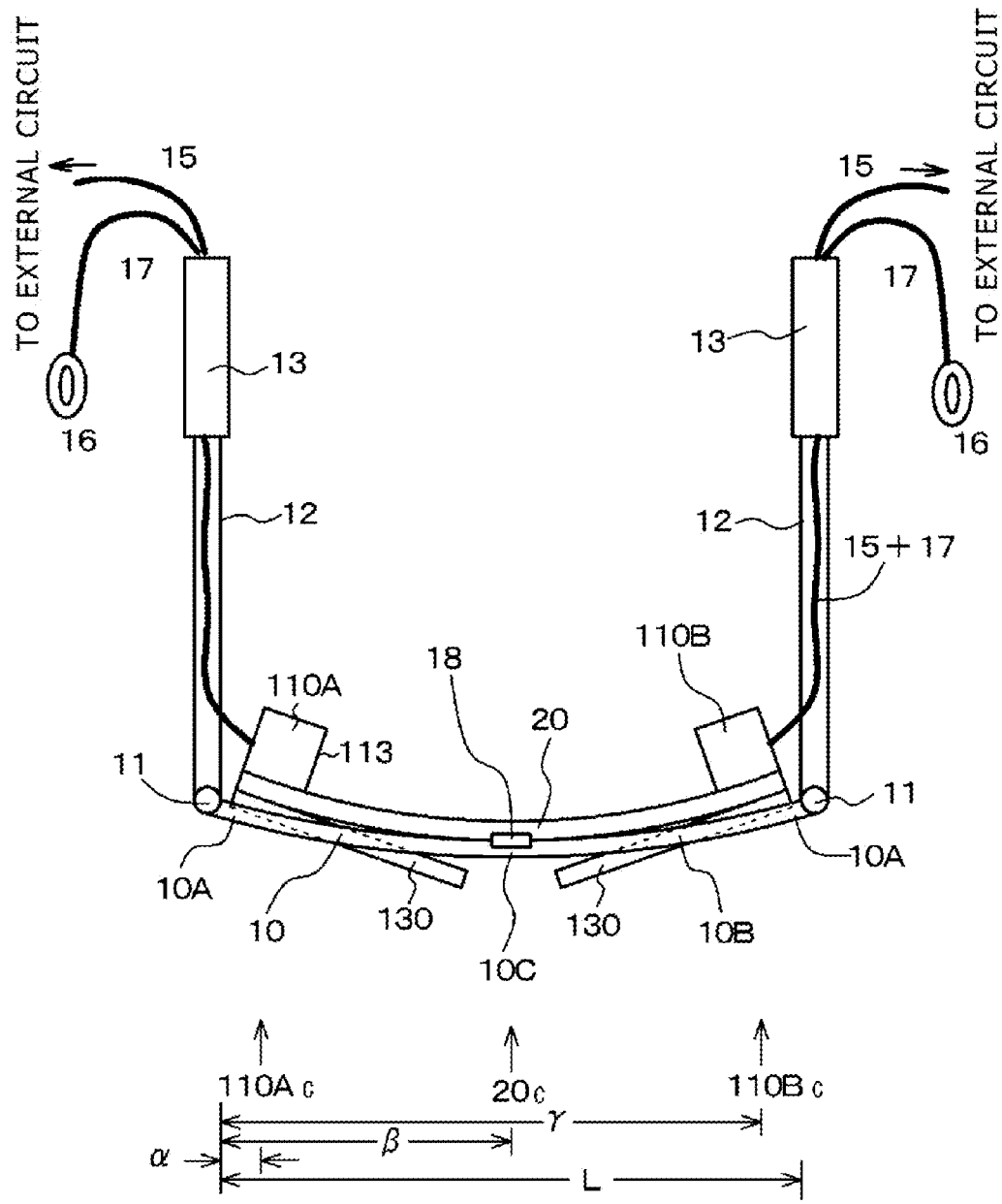
FIG. 26 is a schematic diagram when the head mounted display of embodiment example 5 is viewed from the top.
Figure 27:
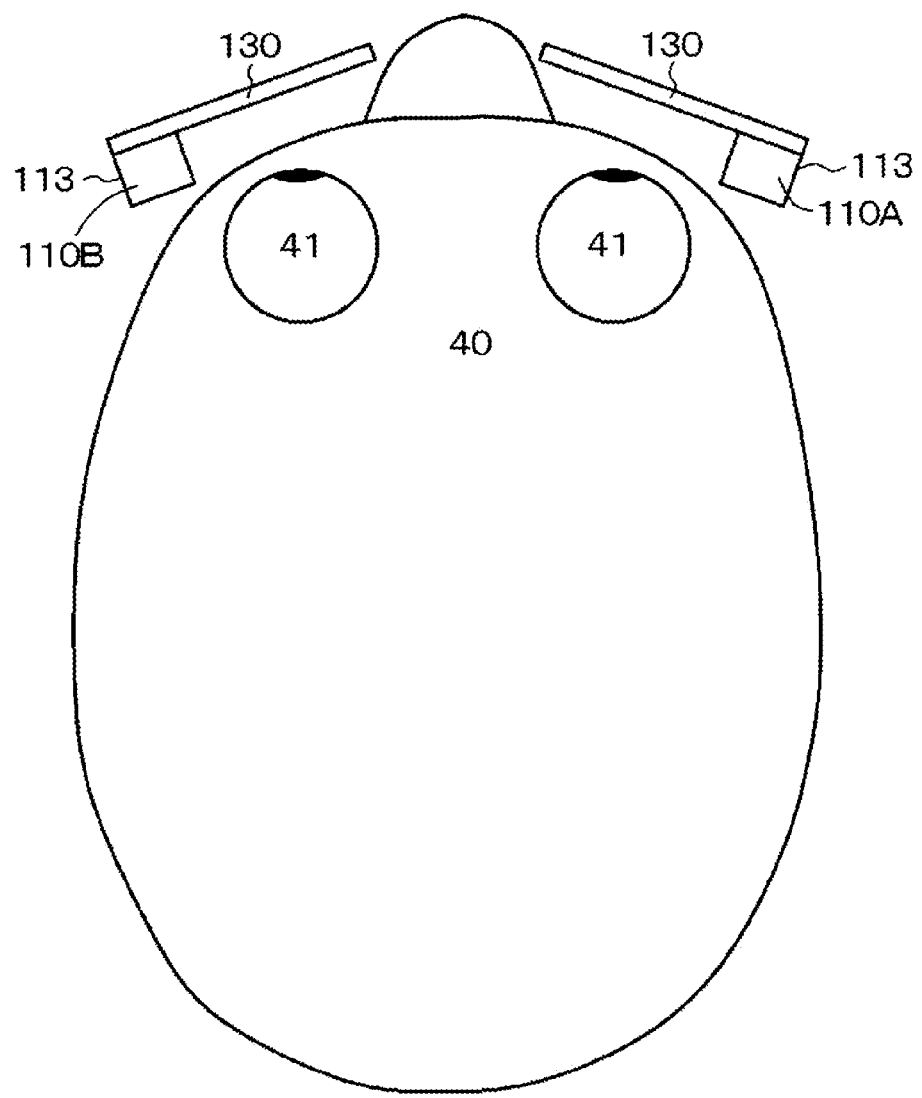
FIG. 27 is a diagram when the state in which the head mounted display of embodiment example 5 is mounted on the head of a viewer is viewed from the top (only an image display device is shown and diagrammatic representation of the frame is omitted)

Embodiment example 5 relates to a head mounted display into which the image display device of an embodiment of the present disclosure, specifically any of the image display devices 100, 200, 300, and 400 explained in embodiment example 1 to embodiment example 4, is incorporated. FIG. 24 shows a schematic diagram when the head mounted display of embodiment example 5 is viewed from the front. FIG. 25 shows a schematic diagram when the head mounted display of embodiment example 5 (in a state when it is assumed that the frame is removed) is viewed from the front. FIG. 26 shows a schematic diagram when the head mounted display of embodiment example 5 is viewed from the top. FIG. 27 shows a diagram when the state in which the head mounted display of embodiment example 5 is mounted on the head of a viewer 40 is viewed from the top. In FIG. 27, only the image display device is shown and diagrammatic representation of the frame is omitted for convenience. Furthermore, in the following description, the image display device 100 is employed as a representative for the image display device. However, it is obvious that the image display devices 200, 300, and 400 can be employed.

The head mounted display of embodiment example 5 includes (A) a glasses-type frame 10 mounted on the head of the viewer 40, and (B) two image display devices 100. The head mounted displays in embodiment example 5 and embodiment example 6 to be described later are a both-eyes type having two image display devices 100.

The head mounted display of embodiment example 5 further has a connecting member 20 that connects two image display devices 100. The connecting member 20 is attached to the viewer-facing side of a center part 10C of the frame 10 located between two pupils 41 of the viewer 40 (i.e. between the viewer 40 and the frame 10) by using e.g. a screw (not shown). Moreover, the projected image of the connecting member 20 is included in the projected image of the frame 10. That is, when the head mounted display is viewed from the front of the viewer 40, the connecting member 20 is hidden by the frame 10 and is not visually recognized. Two image display devices 10 are connected by the connecting member 20. Specifically, image generating devices 110A and 110B are stored in chassis 113 and the chassis 113 is attached to each end part of the connecting member 20 in such a manner that the attachment state can be adjusted. The respective image generating devices 110A and 110B are located outside the pupils 41 of the viewer 40. Specifically, when parameters are defined as follows, expressions shown below are satisfied: $\alpha$ is the distance between the attachment part center $110A_C$ of one image generating device 110A and one end part (one lug) 10A of the frame 10; $\beta$ is the distance from the center $20_C$ of the connecting member 20 to one end part (one lug) 10A of the frame; $\gamma$ is the distance between the attachment part center $110B_C$ of the other image generating device 110B and one end part (one lug) 10A of the frame; and L is the length of the frame.

$\alpha = 0.1 \times L$ $\beta = 0.5 \times L$ $\gamma = 0.9 \times L$

Figure 29:
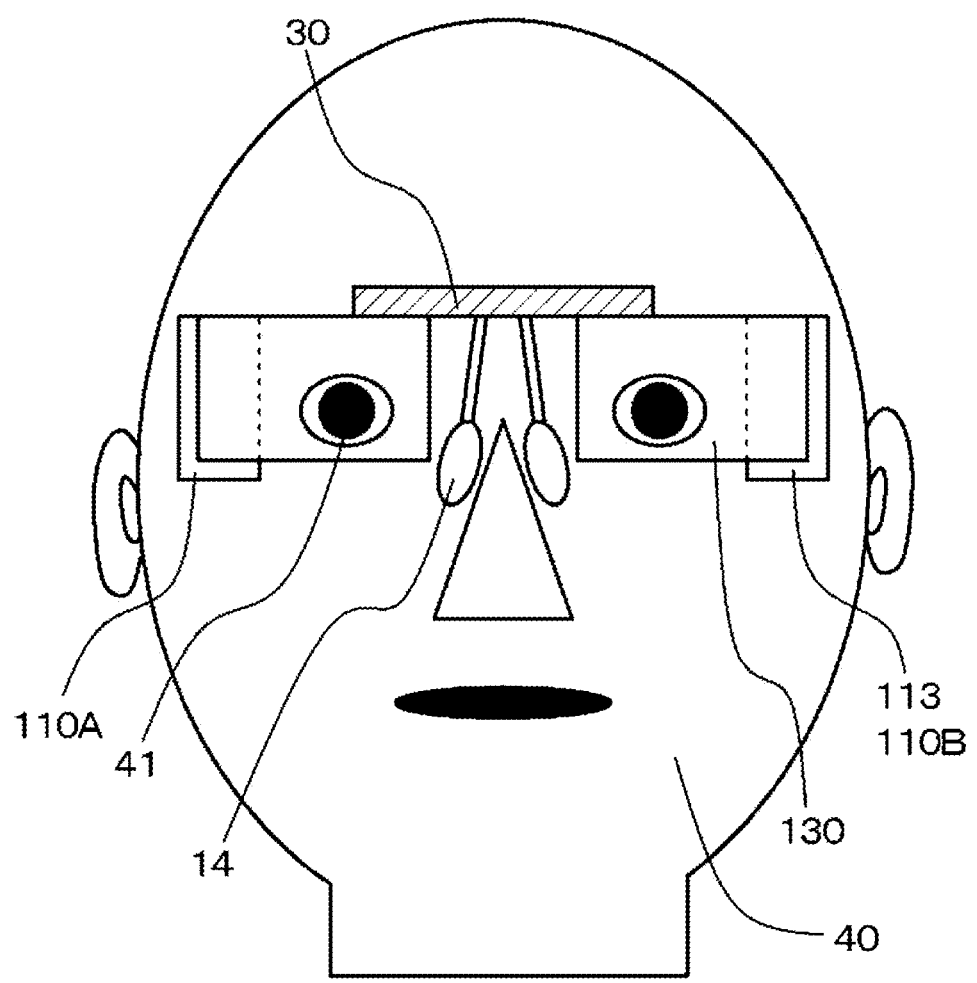
FIG. 29 is a schematic diagram when the head mounted display of embodiment example 6 (in a state when it is assumed that a frame is removed) is viewed from the front.

The image generating devices (specifically, the image generating devices 110A and 110B) are attached to the respective end parts of the connecting member 20 in the following manner. Specifically, penetrating holes (not shown) are made at three places at each end part of the connecting member and tap-equipped hole parts (screwing parts, not shown) corresponding to the penetrating holes are made in the image generating devices 110A and 110B. Furthermore, screws (not shown) are made to pass through the respective penetrating holes and are screwed into the hole parts made in the image generating devices 110A and 110B. A spring is inserted between the screw and the hole part. Due to this, the attachment state of the image generating device (inclination of the image generating device relative to the connecting member) can be adjusted based on the fastening state of the screw. After the attachment, the screws are hidden by a lid (not shown). In FIG. 25 and FIG. 29, the connecting members 20 and 30 are hatched to clearly show them.

Figure 30:
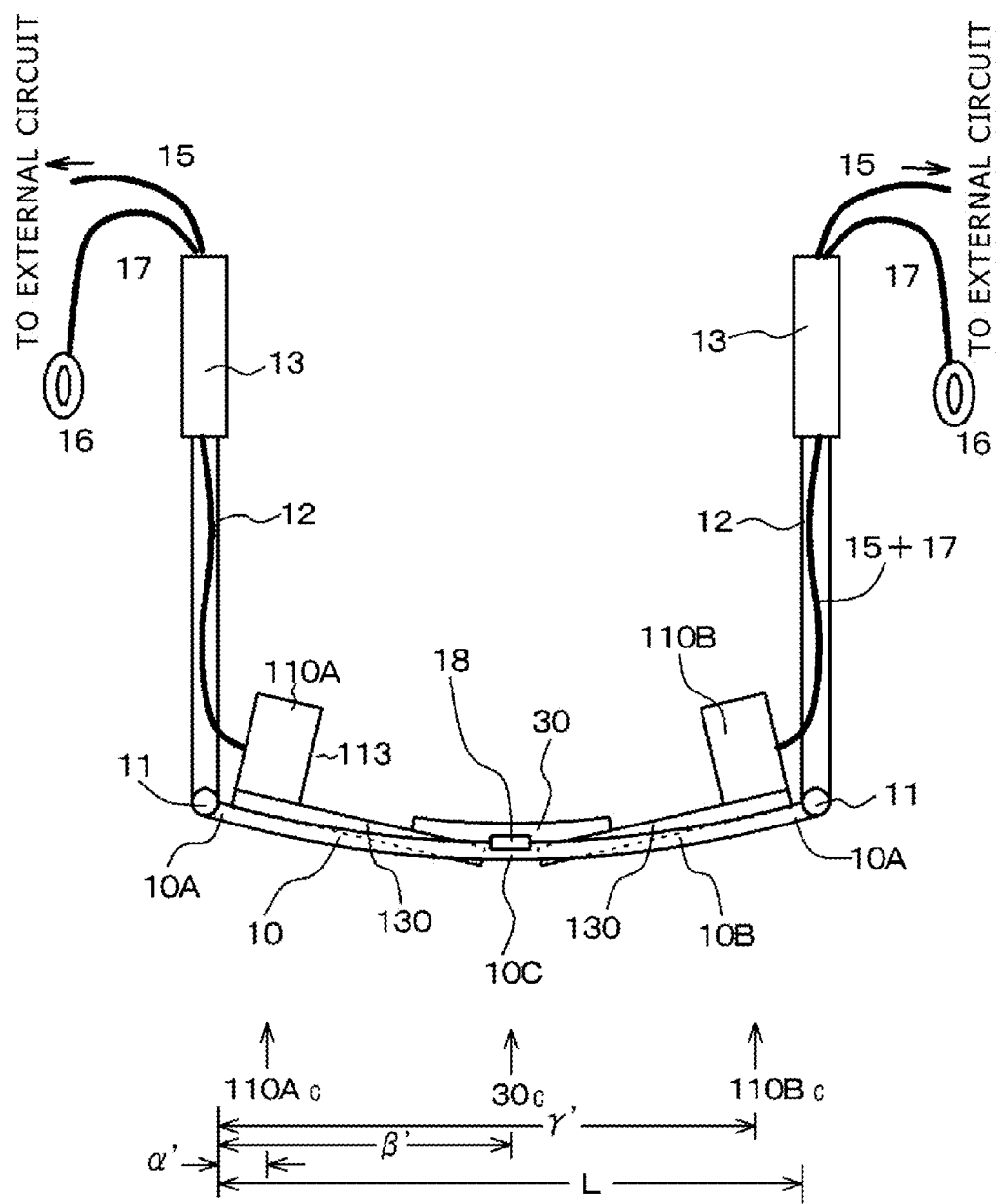
FIG. 30 is a schematic diagram when the head mounted display of embodiment example 6 is viewed from the top.

The frame 10 is composed of a front part 10B disposed in front of the viewer 40, two temple parts 12 freely rotatably attached to both ends of the front part 10B with the intermediary of hinges 11, and end parts (referred to also as tip cells and ear pads) 13 attached to the tip parts of the respective temple parts 12. The connecting member 20 is attached to the center part 10C (equivalent to the bridge part in normal glasses) of the front part 10B located between two pupils 41 of the viewer 40. Furthermore, nose pads 14 are attached to the side facing the viewer 40, of the connecting member 20. In FIG. 26 and FIG. 30, diagrammatic representation of the nose pads 14 is omitted. The frame 10 and the connecting member 20 are fabricated from a metal or plastic and the shape of the connecting member 20 is a curved bar shape.

Moreover, wiring lines (signal line, power supply line, etc.) 15 extending from each of image generating devices 110A and 110B pass through the inside of the temple part 12 and the end part 13 and extend from the tip part of the end part 13 to the eternal to be connected to an external circuit (not shown), respectively. Furthermore, each of the image generating devices 110A and 110B has a headphone part 16 and a headphone part wiring line 17 extending from each of the image generating devices 110A and 110B passes through the inside of the temple part 12 and the end part 13 and extends from the tip part of the end part 13 to the headphone part 16. Specifically, the headphone part wiring line 17 extends from the tip part of the end part 13 to the headphone part 16 in such a manner as to go around the back side of the auricle (auditory capsule). Employing such a configuration can provide a neat head mounted display without giving an impression that the headphone part 16 and the headphone part wiring line 17 are messily disposed.

At the center part 10C of the front part 10B, an imaging device 18 configured by a solid-state imaging element formed of a CCD or CMOS sensor and a lens (neither is shown) is attached. Specifically, a penetrating hole is made in the center part 10C and a recess is made at the part of the connecting member 20 opposed to the penetrating hole made in the center part 10C. The imaging device 18 is disposed in this recess. Light incident from the penetrating hole made in the center part 10C is focused on the solid-state imaging element by the lens. A signal from the solid-state imaging element is sent out to the image generating device 110A and the external circuit via a wiring line (not shown) extending from the imaging device 18. The wiring line passes between the connecting member 20 and the front part 10B and is connected to one image generating device 110A. Employing such a configuration can make it difficult to visually recognize that the imaging device 18 is incorporated in the head mounted display.

As described above, in the head mounted display (HMD) of embodiment example 5, the connecting member 20 connects two image display devices 100 and this connecting member 20 is attached to the center part 10C of the frame 10 located between two pupils 41 of the viewer 40. That is, this head mounted display does not have a structure in which the respective image display devices 100 are attached directly to the frame 10. Therefore, the following advantage is obtained. Specifically, when the viewer 40 wears the frame 10 on the head, even when the temple parts 12 become a state of being expanded toward the outside and the frame 10 is deformed as a result, the displacement (position change) of the image generating devices 110A and 110B due to this deformation of the frame 10 does not occur or is extremely slight even if it occurs. Therefore, change in the vergence angle between left and right images can be surely prevented. In addition, the rigidity of the front part 10B of the frame 10 does not need to be enhanced. Thus, increase in the weight of the frame 10, the lowering of design, and increase in the cost are not caused. Furthermore, because the image display devices 100 are not attached directly to the glasses-type frame 10, the design, color, etc. of the frame 10 can be freely selected depending on the preference of the viewer. Furthermore, restrictions on the design of the frame 10 are also less and flexibility in terms of the design is high. In addition, the connecting member 20 is hidden by the frame 10 when the head mounted display is viewed from the front of the viewer. Therefore, high design quality can be given to the head mounted display.

[Embodiment Example 6]

Figure 28:
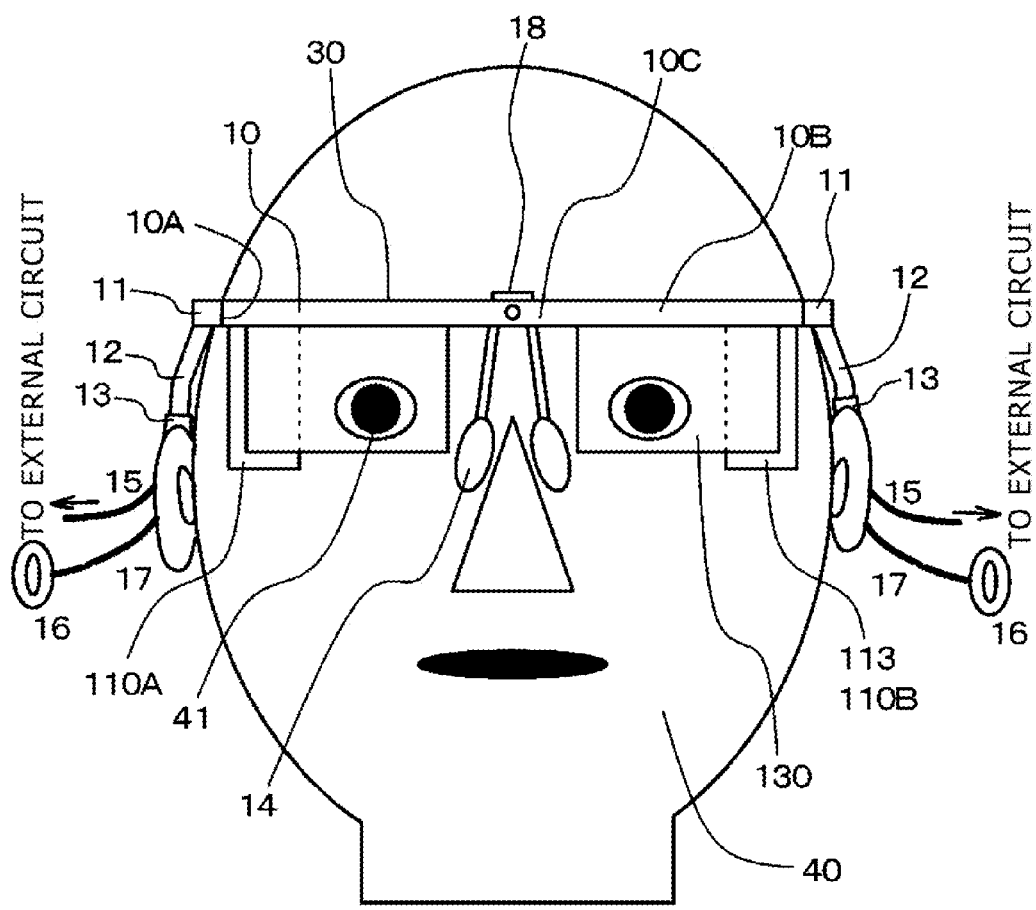
FIG. 28 is a schematic diagram when a head mounted display of embodiment example 6 is viewed from the front.

Embodiment example 6 is a modification of embodiment example 5. FIG. 28 shows a schematic diagram when the head mounted display of embodiment example 6 is viewed from the front. FIG. 29 shows a schematic diagram when the head mounted display of embodiment example 6 (in a state when it is assumed that the frame is removed) is viewed from the front. FIG. 30 shows a schematic diagram when the head mounted display of embodiment example 6 is viewed from the top.

In the head mounted display of embodiment example 6, the bar-like connecting member 30 connects two light guide units 130 instead of connecting two image generating devices 110A and 110B differently from embodiment example 5. It is also possible to employ a form in which two light guide units 130 are monolithically fabricated and the connecting member 30 is attached to the monolithically-fabricated light guide units 130.

Also in the head mounted display of embodiment example 6, the connecting member 30 is attached to the center part 10C of the frame 10 located between two pupils 41 of the viewer 40 by using e.g. a screw and the respective image generating devices 110 are located outside the pupils 41 of the viewer 40. Each image generating device 110 is attached to the end part of the light guide unit 330. When the distance from the center $30_C$ of the connecting member 30 to one end part of the frame 10 is defined as β' and the length of the frame 10 is defined as L, β'=0.5×L is satisfied. Also in embodiment example 6, the values of α' and γ' are the same as those of α and γ in embodiment example 5.

In embodiment example 6, the frame 10 and the respective image display devices have the same configuration and structure as those of the frame 10 and the image display devices explained in embodiment example 5. Therefore, detailed description of them is omitted. Furthermore, the head mounted display of embodiment example 6 also has the same configuration and structure as those of the head mounted display of embodiment example 5 substantially except for the above difference, and therefore detailed description thereof is omitted.

Although the present disclosure is described above based on preferred embodiment examples, the present disclosure is not limited to these embodiment examples. The configurations and structures of the image display devices and the optical devices explained in the embodiment examples are examples and can be arbitrarily changed. For example, a surface relief hologram (refer to U.S. Patent No. 20040062505A1) may be disposed on the light guide plate. Furthermore, it is also possible for the light guide units of embodiment example 3 and embodiment example 4 to have a configuration in which the first deflector formed of a transmissive hologram is provided on the first surface 332 of the light guide plate 331 and the second deflector formed of a reflective hologram is provided on the second surface 333. In such a configuration, light incident on the first deflector is diffracted and satisfies the total reflection condition in the light guide plate to be propagated to the second deflector. Then, the light is subjected to diffraction reflection by the second deflector to be output from the light guide plate. Furthermore, it is also possible for the light guide units of embodiment example 3 and embodiment example 4 to have a form in which the diffraction grating element is formed of a transmissive diffraction grating element or a form in which either one of the first deflector and the second deflector is formed of a reflective diffraction grating element and the other is formed of a transmissive diffraction grating element. Alternatively, it is also possible that the diffraction grating element is formed of a reflective blazed diffraction grating element or a surface relief hologram. Although the both-eyes type including two image display devices is exclusively employed in the embodiment examples, a single-eye type including one image display device may be employed.

Figure 31:
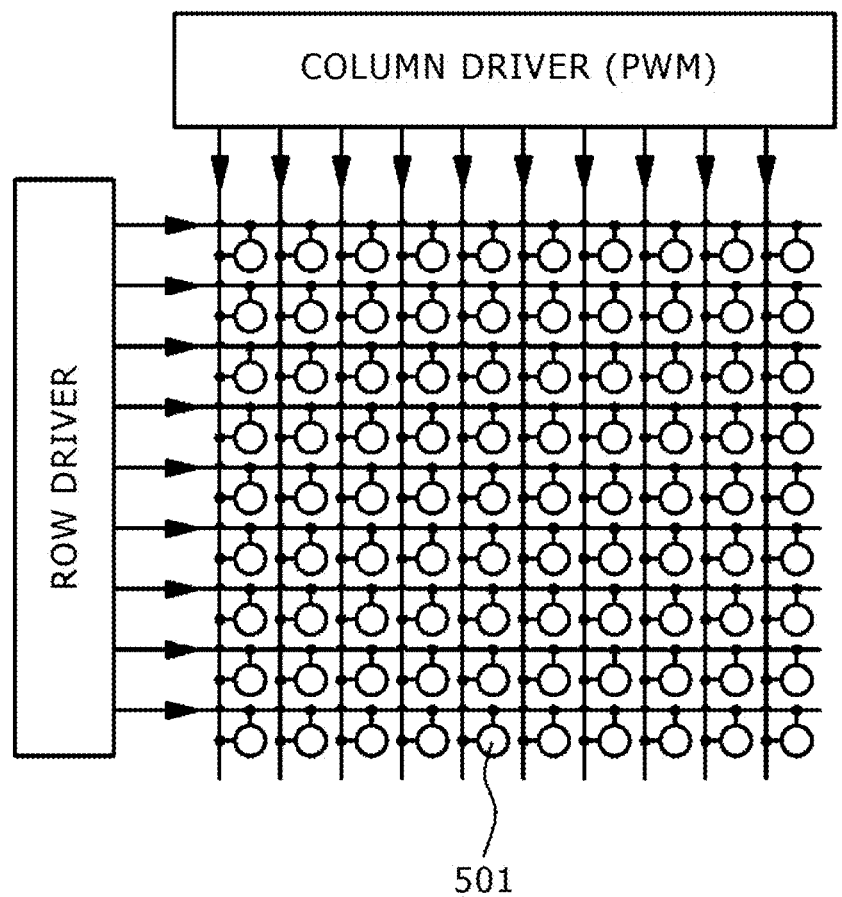
FIG. 31 is a conceptual diagram of a modification example of the image forming device suitable to be used for embodiment example 1 and embodiment example 3.

As a modification example of the image forming device suitable to be used in embodiment example 1 and embodiment example 3, e.g. an image forming device of the active matrix type like that shown in a conceptual diagram of FIG. 31 can also be employed. This image forming device is formed of a light emitting panel in which light emitting elements 501 formed of semiconductor light emitting elements are arranged in a two-dimensional matrix manner. The image forming device controls the emission/non-emission state of each of the light emitting elements 501 and thereby allows direct visual recognition of the emission state of the light emitting elements 501 to thereby display an image. Light output from this image forming device is incident on the light guide plate 131 or 331 via the collimating optical system 112 and the light beam expanding device 70.

Figure 32:
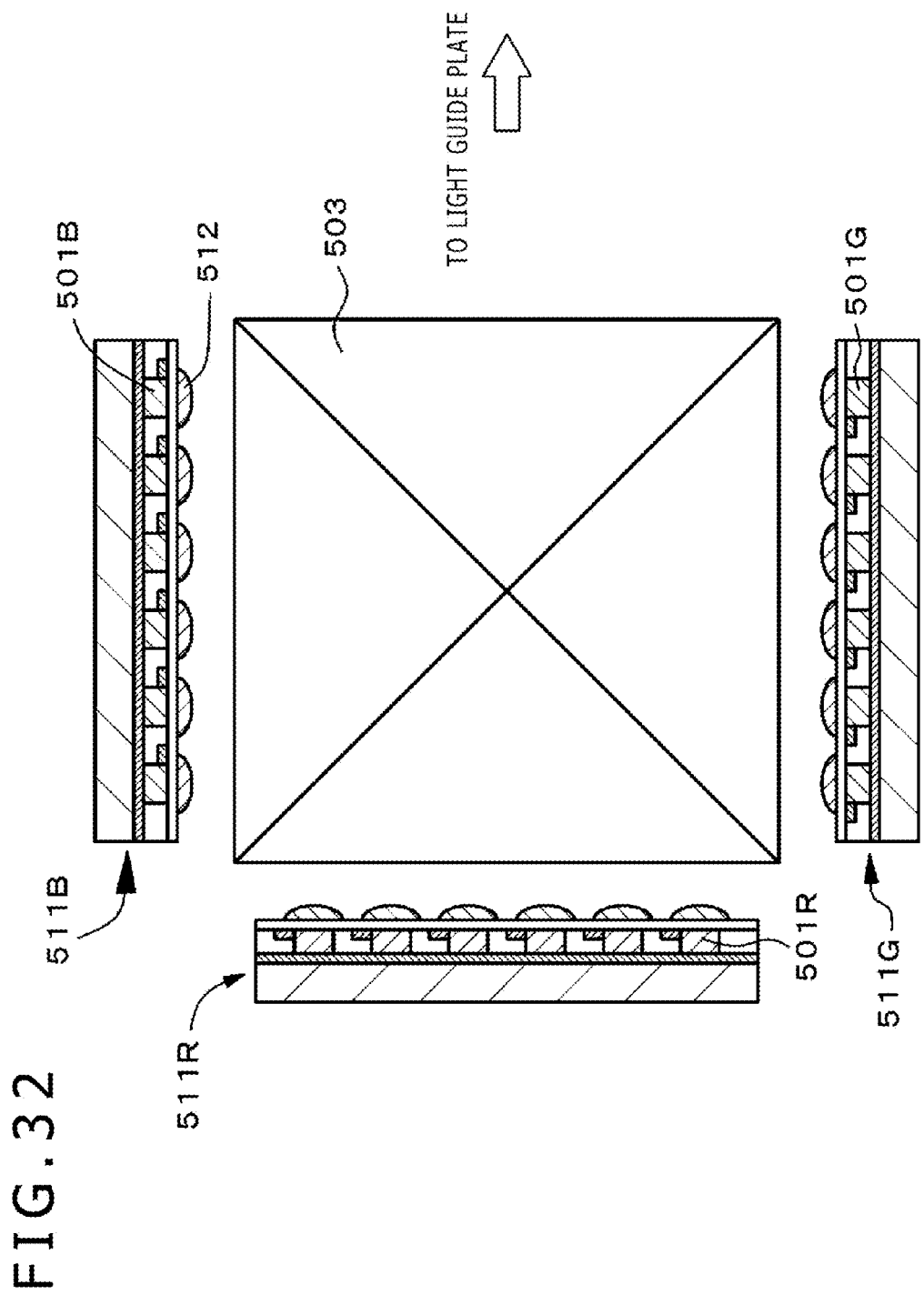
FIG. 32 is a conceptual diagram showing another modification example of the image forming device suitable to be used for embodiment example 1 and embodiment example 3.

Alternatively, it is also possible to employ an image forming device for color displaying shown in a conceptual diagram of FIG. 32. Specifically, the image forming device includes (α) a red light emitting panel 511R in which red light emitting elements 501R that emit red light are arranged in a two-dimensional matrix manner, (β) a green light emitting panel 511G in which green light emitting elements 501G that emit green light are arranged in a two-dimensional matrix manner, (γ) a blue light emitting panel 511B in which blue light emitting elements 501B that emit blue light are arranged in a two-dimensional matrix manner, and (δ) a unit (e.g. dichroic prism 503) for integrating light output from the red light emitting panel 511R, the green light emitting panel 511G, and the blue light emitting panel 511B onto one optical path.

The image forming device can be made as an image forming device for color displaying which controls the emission/non-emission state of each of the red light emitting elements 501R, the green light emitting elements 501G, and the blue light emitting elements 501B. Light output from this image forming device is also incident on the light guide plate 131 or 331 via the collimating optical system 112 and the light beam expanding device 70. Reference number 512 denotes a microlens for condensing the light output from the light emitting element.

Figure 33:
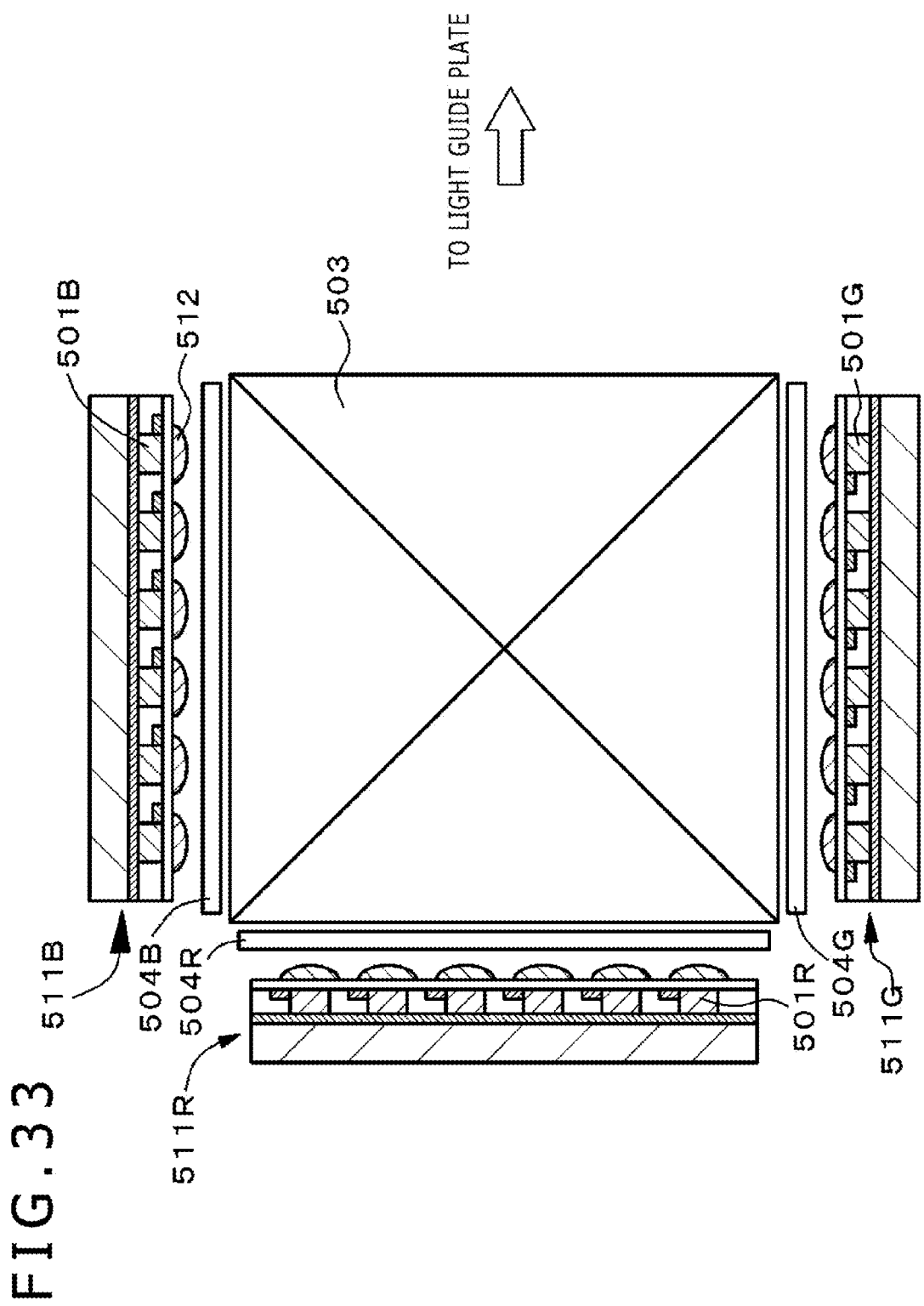
FIG. 33 is a conceptual diagram showing further another modification example of the image forming device suitable to be used for embodiment example 1 and embodiment example 3.

FIG. 33 shows a conceptual diagram of another image forming device formed of the light emitting panels 511R, 511G, and 511B, in which the light emitting elements 501R, 501G, and 501B are arranged in a two-dimensional matrix manner, and so forth. The passage/non-passage of light output from the light emitting panels 511R, 511G, and 511B is controlled by light passage control devices 504R, 504G, and 504B. The light beams are incident on the dichroic prism 503 and the optical paths of these light beams are integrated into one optical path. The integrated light is incident on the light guide plate 131 or 331 via the collimating optical system 112 and the light beam expanding device 70.

Figure 34:
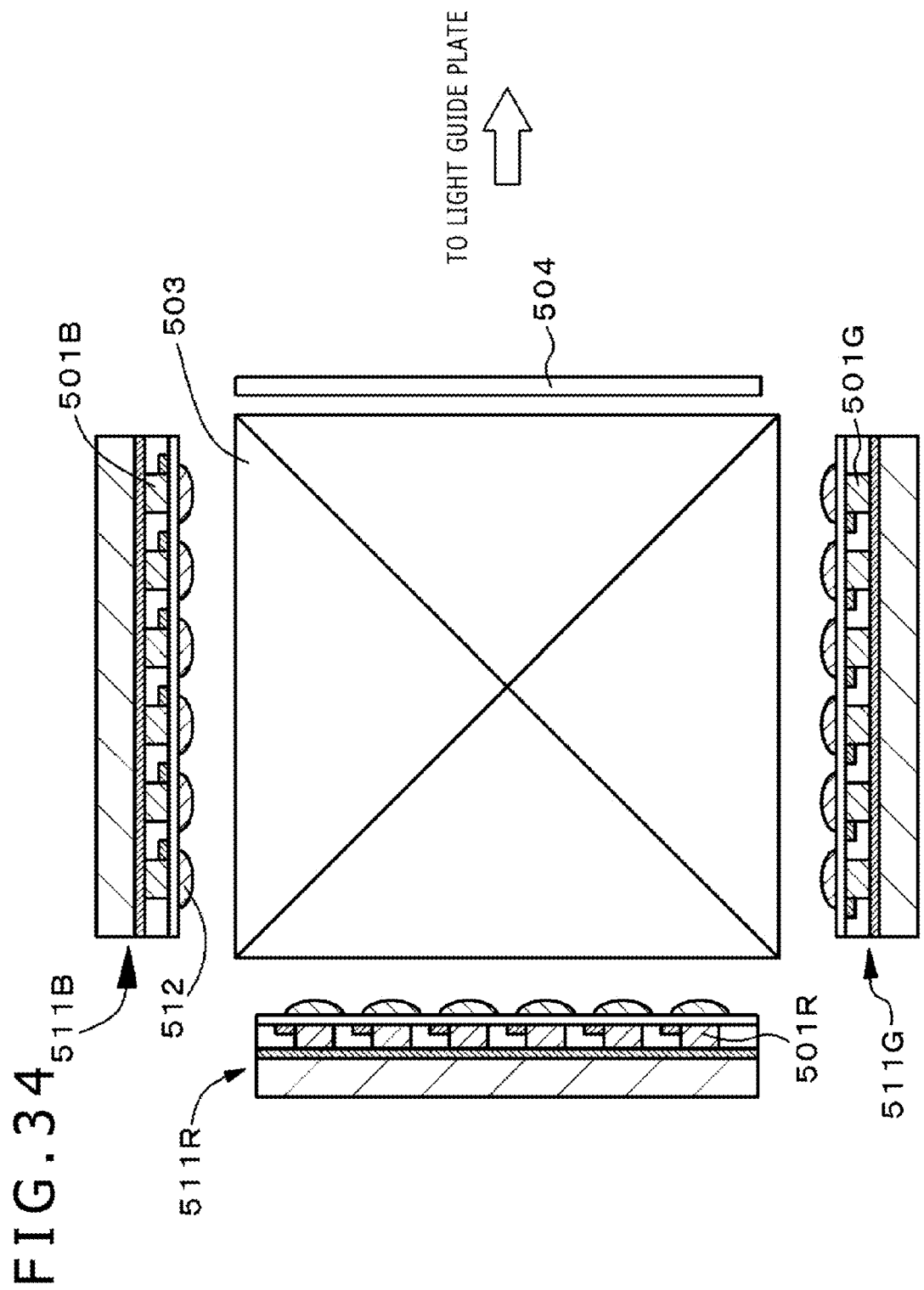
FIG. 34 is a conceptual diagram showing further another modification example of the image forming device suitable to be used for embodiment example 1 and embodiment example 3.

FIG. 34 shows a conceptual diagram of another image forming device formed of the light emitting panels 511R, 511G, and 511B, in which the light emitting elements 501R, 501G, and 501B are arranged in a two-dimensional matrix manner, and so forth. The light beams output from the light emitting panels 511R, 511G, and 511B are incident on the dichroic prism 503 and the optical paths of these light beams are integrated into one optical path. The passage/non-passage of these light beams output from the dichroic prism 503 is controlled by a light passage control device 504 and the light beams are incident on the light guide plate 131 or 331 via the collimating optical system 112 and the light beam expanding device 70.

Figure 35:
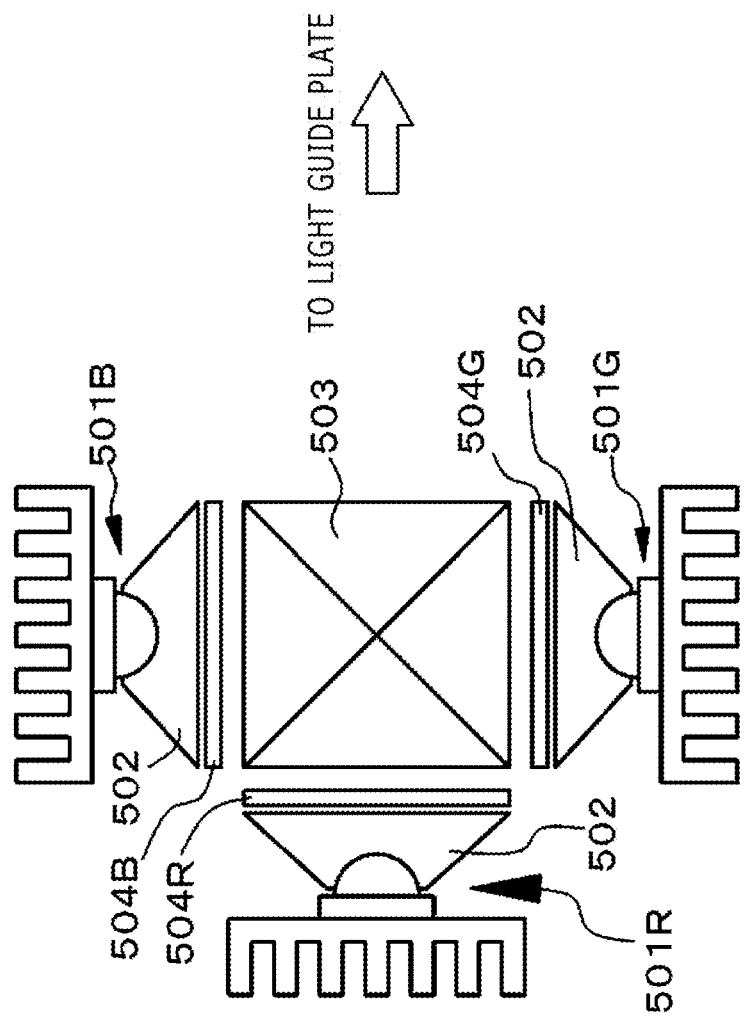
FIG. 35 is a conceptual diagram showing further another modification example of the image forming device suitable to be used for embodiment example 1 and embodiment example 3.

Alternatively, an image forming device shown in FIG. 35 can also be employed. This image forming device includes the light emitting element 501R that emits red light and a light passage control device (e.g. liquid crystal display device 504R) that is a kind of light valve for controlling the passage/non-passage of light output from the light emitting element 501R to emit red light. The image forming device further includes the light emitting element 501G that emits green light and a light passage control device (e.g. liquid crystal display device 504G) that is a kind of light valve for controlling the passage/non-passage of light output from the light emitting element 501G to emit green light. The image forming device further includes the light emitting element 501B that emits blue light and a light passage control device (e.g. liquid crystal display device 504B) that is a kind of light valve for controlling the passage/non-passage of light output from the light emitting element 501B to emit blue light. The image forming device further includes light leading members 502 that lead the light output from these light emitting elements 501R, 501G, and 501B composed of a GaN-based semiconductor and a unit (e.g. dichroic prism 503) for integration into one optical path.

Figure 36:
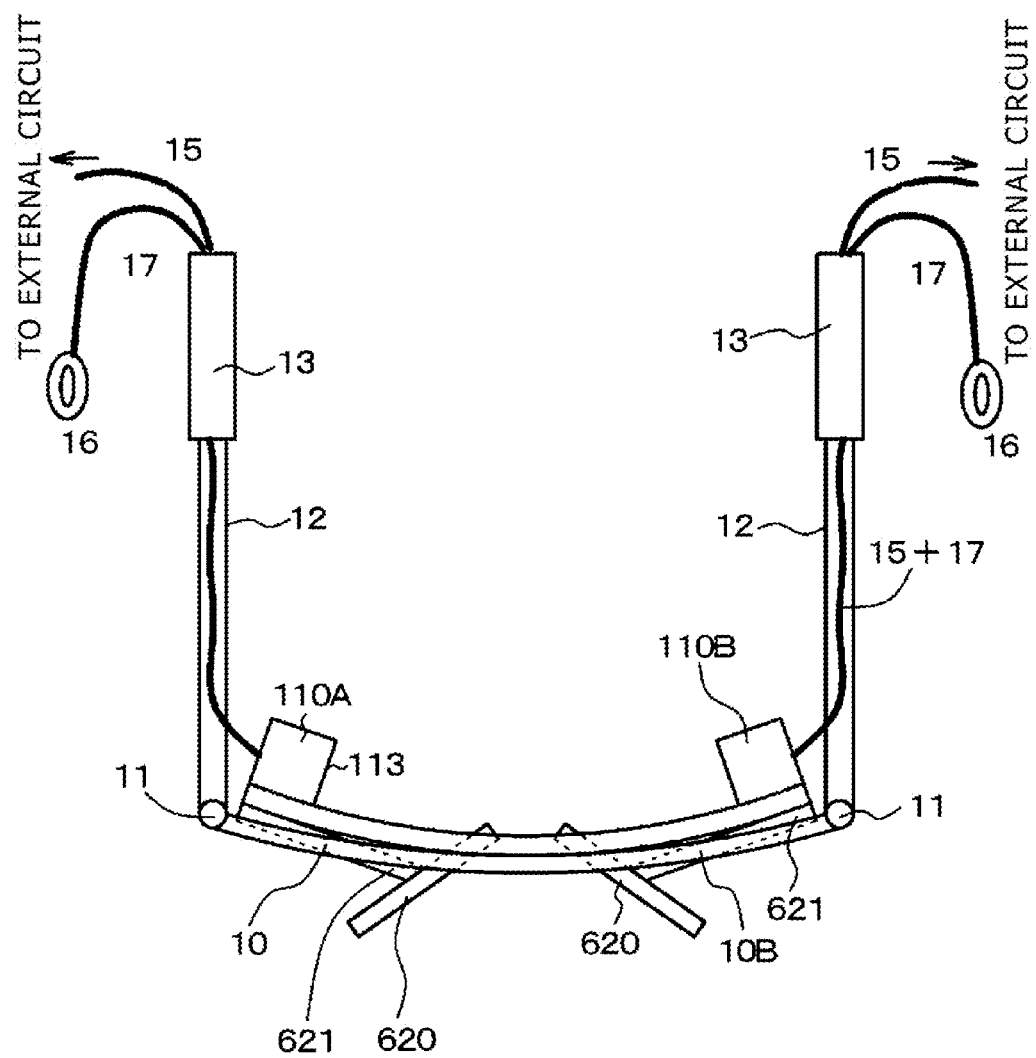
FIG. 36 is a schematic diagram when a modification example of the head mounted display of embodiment example 5 is viewed from the top.
Figure 37:
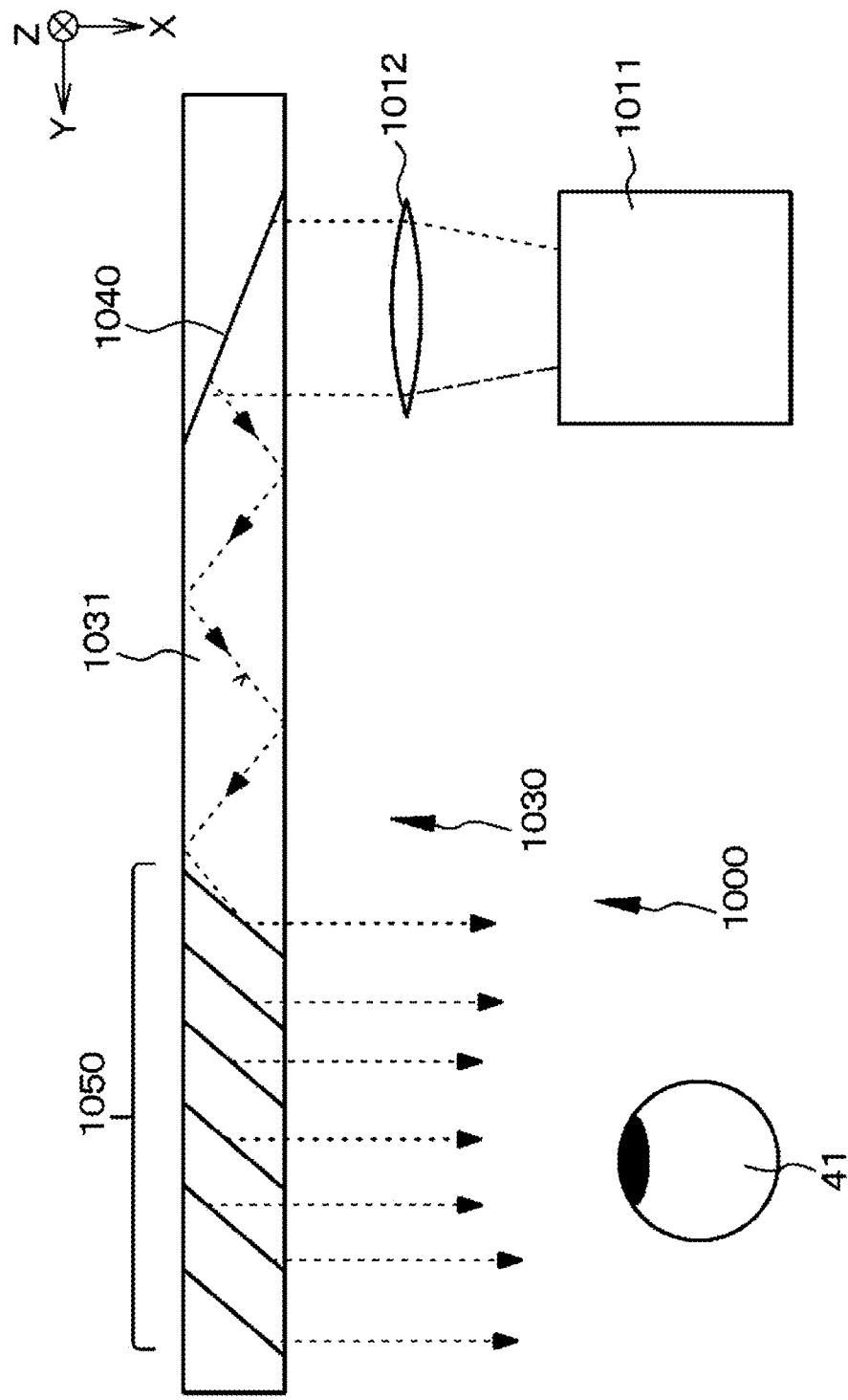
FIG. 37 is a conceptual diagram of a related-art image display device.
Figure 38:
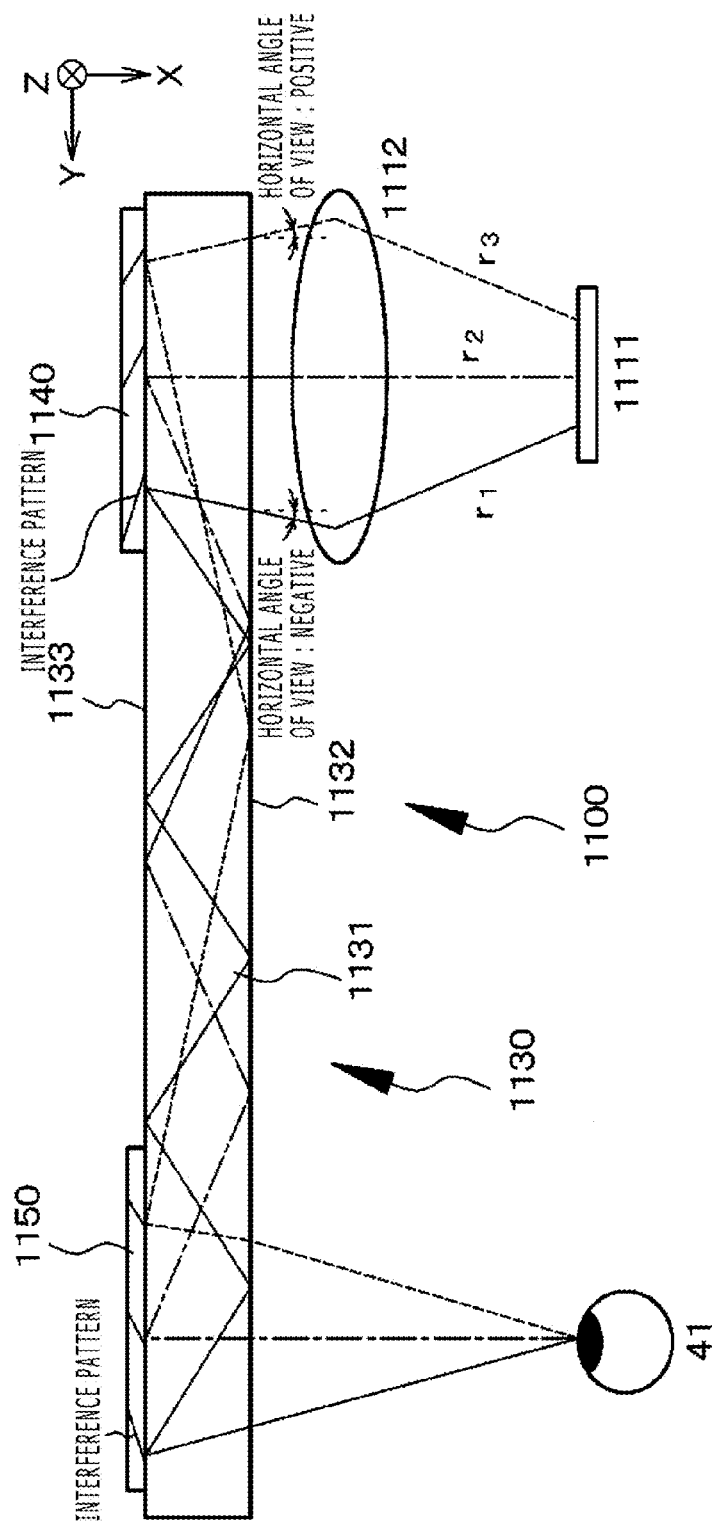
FIG. 38 is a conceptual diagram of a related-art image display device of a form different from that shown in FIG. 37.
Figure 39:
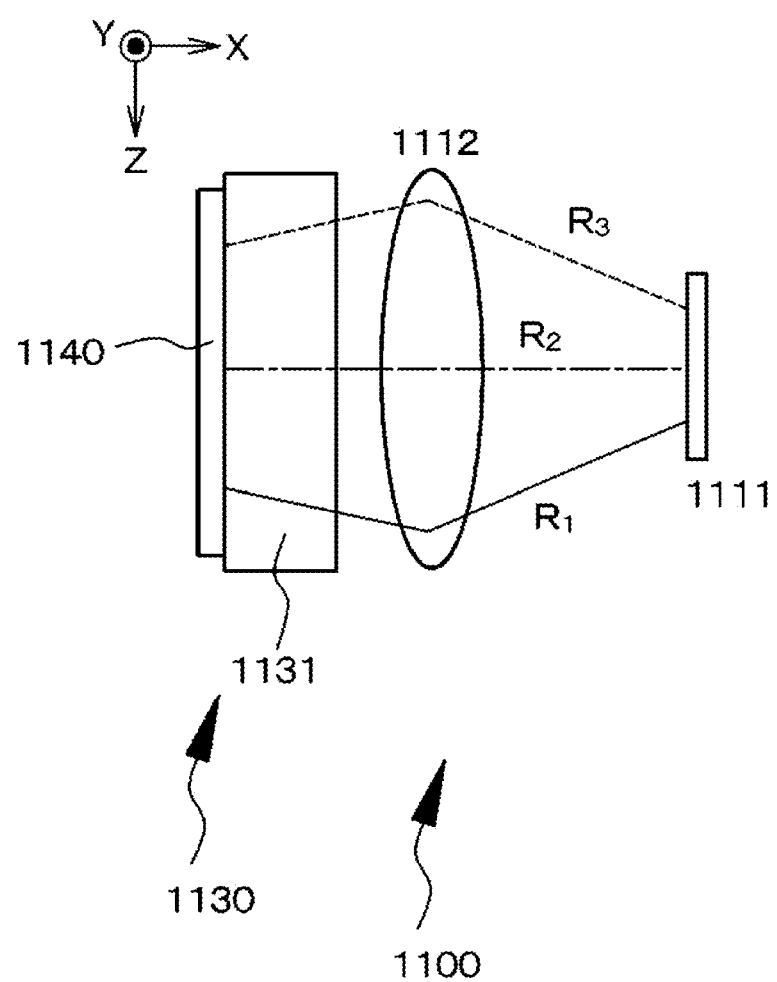
FIG. 39 is a conceptual diagram when the related-art image display device of the form shown in FIG. 38 is viewed from a direction different from that of FIG. 38.

Furthermore, as shown in FIG. 36, which is a conceptual diagram of a modification example of the head mounted display of embodiment example 5, it is also possible to employ a form in which the optical device is formed of a semi-transmissive mirror 620 on which light output from the image generating device 110 is incident and from which the light is output toward the pupil 41 of the viewer. This modification example has a structure in which the light output from the image generating device 110 propagates inside a transparent member 621 such as a glass plate or a plastic plate and is incident on the semi-transmissive mirror 620. However, the configuration is not limited thereto and a structure in which the light propagates in the air to be incident on the semi-transmissive mirror 620 may be employed. As the image generating device, the image generating device 110 or 210 explained in embodiment example 1 or embodiment example 2 can be employed.

The present disclosure can employ also the following configurations.

[1] <<Image Display Device<<

An image display device including (A) an image generating device, (B) a light guide unit on which light from the image generating device is incident, the light guide unit guiding light and outputting light toward a pupil of a viewer, the light guide unit including (B-1) a light guide plate from which incident light is output after being propagated inside by total reflection, (B-2) a first deflector that is disposed in or on the light guide plate and deflects light incident on the light guide plate in such a manner that the light incident on the light guide plate is totally reflected inside the light guide plate, and (B-3) a second deflector that is disposed in or on the light guide plate and deflects light propagated inside the light guide plate by total reflection a plurality of times in order to output the light propagated inside the light guide plate by total reflection from the light guide plate, and (C) a light beam expanding device configured to expand a light beam incident from the image generating device along a Z direction and output the light beam to the light guide unit when incident direction of light incident on the light guide plate is defined as an X direction and propagation direction of light in the light guide plate is defined as a Y direction, wherein the light beam expanding device is composed of a first reflective mirror on which light from the image generating device is incident and a second reflective mirror on which light from the first reflective mirror is incident and that outputs light to the light guide unit, a light reflective surface of the first reflective mirror is composed of 1A-th inclined surfaces and 1B-th inclined surfaces that are juxtaposed alternately and continuously and has a saw-tooth shape as a sectional shape, a light reflective surface of the second reflective mirror is composed of 2A-th inclined surfaces and 2 B-th inclined surfaces that are juxtaposed alternately and continuously and has a saw-tooth shape as a sectional shape, a top side and a bottom side of the 1A-th inclined surface are parallel to each other and extend along the Z direction, an angle formed by a bottom part of the 1A-th inclined surface and a bottom part of the 1B-th inclined surface is 90 degrees, a top side and a bottom side of the 2A-th inclined surface are parallel to each other and extend along the Y direction, and an angle formed by a bottom part of the 2A-th inclined surface and a bottom part of the 2B-th inclined surface is 90 degrees.

[2] The image display device according to [1], wherein at least one planar reflective member is provided between the image generating device and the first reflective mirror, at least one planar reflective member is provided between the first reflective mirror and the second reflective mirror, and one planar reflective member provided between the image generating device and the first reflective mirror serves also as one planar reflective member provided between the first reflective mirror and the second reflective mirror.

[3] The image display device according to [1] or [2], wherein a trajectory of light incident on the first reflective mirror from the image generating device and a trajectory of light output from the first reflective mirror are parallel to each other when being projected onto a 1A-th virtual plane that is a virtual plane perpendicular to the Z direction, the trajectory of the light incident on the first reflective mirror from the image generating device and the trajectory of the light output from the first reflective mirror are symmetric with each other about the 1A-th virtual plane when being projected onto a 1B-th virtual plane that is a virtual plane perpendicular to a normal to the first reflective mirror, a trajectory of light incident on the second reflective mirror from the first reflective mirror and a trajectory of light output from the second reflective mirror are parallel to each other when being projected onto a 2A-th virtual plane that is a virtual plane perpendicular to the Y direction, and the trajectory of the light incident on the second reflective mirror from the first reflective mirror and the trajectory of the light output from the second reflective mirror are symmetric with each other about the 2A-th virtual plane when being projected onto a 2B-th virtual plane that is a virtual plane perpendicular to a normal to the second reflective mirror.

[4] The image display device according to [3], wherein optical path length of light that is output from the center of the image generating device and is incident on the first reflective mirror is equal to optical path length of light that is light originally output from the center of the image generating device and is output from the first reflective mirror and is incident on the second reflective mirror to be output from the second reflective mirror and be incident on the light guide unit.

[5] The image display device according to [4], wherein size, along the Y direction, of a light beam output from the image generating device is equal to size, along the Y direction, of a light beam incident on the light guide unit.

[6] The image display device according to any one of [3] to [5], wherein size, along the Z direction, of a light beam incident on the light guide unit is larger than size, along the Z direction, of a light beam output from the image generating device.

[7] The image display device according to [6], wherein size, along the Z direction, of a light beam output from the light guide unit is equal to size, along the Z direction, of the light beam output from the image generating device.

[8] The image display device according to any one of [1] to [7], wherein the image generating device includes (A-1) an image forming device having a plurality of pixels arranged in a two-dimensional matrix manner, and (A-2) a collimating optical system that turns light output from the pixels of the image forming device to collimated light, and light from the collimating optical system is incident on the first reflective mirror.

[9] The image display device according to any one of [1] to [7], wherein the image generating device includes (A-1) a light source, (A-2) a collimating optical system that turns light output from the light source to collimated light, (A-3) a scanning unit that scans collimated light output from the collimating optical system, and (A-4) a relay optical system that relays collimated light scanned by the scanning unit, and light from the relay optical system is incident on the first reflective mirror.

[10] The image display device according to any one of [1] to [9], wherein the first deflector and the second deflector are formed of diffraction grating elements.

[11] The image display device according to [10], wherein the diffraction grating elements are formed of reflective diffraction grating elements.

[12] The image display device according to [11], wherein the reflective diffraction grating elements are formed of reflective volume hologram diffraction gratings.

[13] The image display device according to [10], wherein the diffraction grating elements are formed of transmissive diffraction grating elements.

[14] The image display device according to [10], wherein one of the diffraction grating elements is formed of a reflective diffraction grating element and the other of the diffraction grating elements is formed of a transmissive diffraction grating element.

[15] The image display device according to any one of [1] to [9], wherein the first deflector functions as a reflective mirror, and the second deflector functions as a semi-transmissive mirror.

[16]<<Optical Device>>

An optical device including a light guide unit configured to include a light guide plate from which light incident from a light source is output after being propagated inside by total reflection, a first deflector that is disposed in or on the light guide plate and deflects light incident on the light guide plate in such a manner that the light incident on the light guide plate is totally reflected inside the light guide plate, and a second deflector that is disposed in or on the light guide plate and deflects light propagated inside the light guide plate by total reflection a plurality of times in order to output the light propagated inside the light guide plate by total reflection from the light guide plate, and a light beam expanding device configured to expand a light beam incident from the light source along a Z direction and output the light beam to the light guide unit when incident direction of light incident on the light guide plate is defined as an X direction and propagation direction of light in the light guide plate is defined as a Y direction, wherein the light beam expanding device is composed of a first reflective mirror on which light from the light source is incident and a second reflective mirror on which light from the first reflective mirror is incident and that outputs light to the light guide unit, a light reflective surface of the first reflective mirror is composed of 1A-th inclined surfaces and 1B-th inclined surfaces that are juxtaposed alternately and continuously and has a saw-tooth shape as a sectional shape, a light reflective surface of the second reflective mirror is composed of 2A-th inclined surfaces and 2B-th inclined surfaces that are juxtaposed alternately and continuously and has a saw-tooth shape as a sectional shape, a top side and a bottom side of the 1A-th inclined surface are parallel to each other and extend along the Z direction, an angle formed by a bottom part of the 1A-th inclined surface and a bottom part of the 1B-th inclined surface is 90 degrees, a top side and a bottom side of the 2A-th inclined surface are parallel to each other and extend along the Y direction, and an angle formed by a bottom part of the 2 A-th inclined surface and a bottom part of the 2B-th inclined surface is 90 degrees.

[17] The optical device according to [16], wherein at least one planar reflective member is provided between the light source and the first reflective mirror, at least one planar reflective member is provided between the first reflective mirror and the second reflective mirror, and one planar reflective member provided between the light source and the first reflective mirror serves also as one planar reflective member provided between the first reflective mirror and the second reflective mirror.

[18] <<Light Beam Expanding Device>>

A light beam expanding device including:

a first reflective mirror configured to be disposed between a light source and an irradiated surface, light from the light source being incident on the first reflective mirror; and a second reflective mirror on which light from the first reflective mirror is incident, the second reflective mirror outputting light to the irradiated surface, wherein a light reflective surface of the first reflective mirror is composed of 1A-th inclined surfaces and 1B-th inclined surfaces that are juxtaposed alternately and continuously and has a saw-tooth shape as a sectional shape, a light reflective surface of the second reflective mirror is composed of 2A-th inclined surfaces and 2B-th inclined surfaces that are juxtaposed alternately and continuously and has a saw-tooth shape as a sectional shape, a top side and a bottom side of the 1A-th inclined surface are parallel to each other and extend along the Z direction, an angle formed by a bottom part of the 1A-th inclined surface and a bottom part of the 1B-th inclined surface is 90 degrees, a top side and a bottom side of the 2A-th inclined surface are parallel to each other and extend along the Y direction, and an angle formed by a bottom part of the 2A-th inclined surface and a bottom part of the 2B-th inclined surface is 90 degrees.

[19] The light beam expanding device according to [18], wherein at least one planar reflective member is provided between the light source and the first reflective mirror, at least one planar reflective member is provided between the first reflective mirror and the second reflective mirror, and one planar reflective member provided between the light source and the first reflective mirror serves also as one planar reflective member provided between the first reflective mirror and the second reflective mirror.

[20] An image display device including:

an image generating device;

a light guide unit on which light from the image generating device is incident, the light guide unit guiding and outputting light; and a first reflective mirror and a second reflective mirror, wherein the first reflective mirror and the second reflective mirror are disposed on an optical path between the image generating device and the light guide unit and each have a saw-tooth shape.

The present disclosure contains subject matter related to that disclosed in Japanese Priority Patent Application JP 2011-254853 filed in the Japan Patent Office on Nov. 22, 2011, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. An image display device, comprising:

an image generator;

a light guide; and a first reflective mirror and a second reflective mirror disposed on an optical path between the image generator and the light guide, wherein:

each of the first reflective mirror and the second reflective mirror comprises peaks where flat sections of a reflective layer meet and extend along linear paths;

the linear paths of the peaks of the first reflective mirror are non-parallel with the linear paths of the peaks of the second reflective mirror;

the flat sections of the first reflective mirror extend in planes parallel to a Z direction in three dimensional space, the Z direction being perpendicular to each of an X direction and a Y direction, and the Y direction being perpendicular to the X direction, and the first reflective mirror is configured and arranged such that:

a trajectory of light incident on the first reflective mirror from the image generator and a trajectory of light output from the first reflective mirror are parallel to each other when being projected onto a 1A-th virtual plane that is a virtual plane perpendicular to the Z direction, and the trajectory of the light incident on the first reflective mirror from the image generator and the trajectory of the light output from the first reflective mirror are symmetric with each other about the 1A-th virtual plane when being projected onto a 1B-th virtual plane that is a virtual plane perpendicular to the X direction; and the flat sections of the second reflective mirror extend in planes parallel to the Y direction, and the second reflective mirror is configured and arranged such that:

a trajectory of light incident on the second reflective mirror from the first reflective mirror and a trajectory of light output from the second reflective mirror are parallel to each other when being projected onto a 2A-th virtual plane that is a virtual plane perpendicular to the Y direction, and the trajectory of the light incident on the second reflective mirror from the first reflective mirror and the trajectory of the light output from the second reflective mirror are symmetric with each other about the 2A-th virtual plane when being projected onto a 2B-th virtual plane that is a virtual plane perpendicular to the X direction.

2. The image display device of claim 1, further comprising:

a planar reflective member disposed between the image generator and the first reflective mirror and also disposed between the first reflective mirror and the second reflective mirror.

3. The image display device of claim 1, wherein the image generator and first and second reflective mirrors are configured and arranged such that an optical path length of light that is output from a center of the image generator and is incident on the first reflective mirror is equal to an optical path length of light that is light originally output from the center of the image generator and is output from the first reflective mirror and is incident on the second reflective mirror to be output from the second reflective mirror and be incident on the light guide.

4. The image display device of claim 3, wherein a size, along the Y direction, of a light beam output from the image generator is equal to a size, along the Y direction, of a light beam incident on the light guide.

5. The image display device of claim 1, wherein a size, along the Z direction, of a light beam incident on the light guide is larger than a size, along the Z direction, of a light beam output from the image generator.

6. The image display device of claim 5, wherein a size, along the Z direction, of a light beam output from the light guide is equal to a size, along the Z direction, of the light beam output from the image generator.

7. The image display device of claim 1, wherein:
the image generator comprises an image forming device having a plurality of pixels arranged in a two-dimensional matrix manner, and a collimating optical system that turns light output from the pixels of the image forming device to collimated light; and
the image generator is configured and arranged such that light from the collimating optical system is incident on the first reflective mirror.

8. The image display device according to claim 1, wherein:
the image generator comprises a light source, a collimating optical system that turns light output from the light source to collimated light, a scanning unit that scans collimated light output from the collimating optical system, and a relay optical system that relays collimated light scanned by the scanning unit; and
the image generator is configured and arranged such that light from the relay optical system is incident on the first reflective mirror.

9. The image display device of claim 1, wherein the light guide comprises:
a light guide plate configured and arranged to output incident light after being propagated inside by total reflection,
a first deflector configured and arranged to deflect light incident on the light guide plate in such a manner that the light incident on the light guide plate is totally reflected inside the light guide plate, and
a second deflector configured and arranged to deflect light propagated inside the light guide plate by total reflection a plurality of times in order to output the light propagated inside the light guide plate by total reflection from the light guide plate.

10. The image display device according to claim 9, wherein the first deflector and the second deflector comprise diffraction grating elements.

11. The image display device according to claim 10, wherein the diffraction grating elements comprise reflective diffraction grating elements.

12. The image display device according to claim 11, wherein the reflective diffraction grating elements comprise reflective volume hologram diffraction gratings.

13. The image display device according to claim 10, wherein the diffraction grating elements comprise transmissive diffraction grating elements.

14. The image display device according to claim 10, wherein one of the diffraction grating elements comprises a reflective diffraction grating element and the other of the diffraction grating elements comprises a transmissive diffraction grating element.

15. The image display device according to claim 9, wherein the first deflector is configured and arranged to function as a reflective mirror, and the second deflector is configured and arranged to function as a semi-transmissive mirror.

* * * * *